(12) United States Patent
Maeomichi et al.

(10) Patent No.: US 7,769,824 B2
(45) Date of Patent: Aug. 3, 2010

(54) COMMUNICATION CONTROL METHOD, COMMUNICATION CONTROL APPARATUS, COMMUNICATION CONTROL PROGRAM AND RECORDING MEDIUM

(75) Inventors: Hiroyuki Maeomichi, Yokosuka (JP); Ryutaro Kawamura, Yokosuka (JP); Akihiro Tsutsui, Yokosuka (JP); Kouji Yata, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1294 days.

(21) Appl. No.: 10/554,672

(22) PCT Filed: May 7, 2004

(86) PCT No.: PCT/JP2004/006497

§ 371 (c)(1),
(2), (4) Date: Oct. 27, 2005

(87) PCT Pub. No.: WO2004/100469

PCT Pub. Date: Nov. 18, 2004

(65) Prior Publication Data

US 2007/0016903 A1    Jan. 18, 2007

(30) Foreign Application Priority Data

May 8, 2003    (JP)    ............................. 2003-130047

(51) Int. Cl.
*G06F 15/16*    (2006.01)
(52) U.S. Cl. ....................... 709/219; 709/228; 709/236; 709/250; 370/351
(58) Field of Classification Search ......... 709/217–219, 709/227–229, 238–239, 250; 370/351–356
See application file for complete search history.

(56) References Cited

U.S. PATENT DOCUMENTS

| 5,867,662 | A  | * | 2/1999 | Riggs ......................... 709/228 |
| 6,230,193 | B1 | * | 5/2001 | Arunkumar et al. ......... 709/218 |
| 6,377,992 | B1 | * | 4/2002 | Plaza Fernandez et al. .. 709/227 |
| 7,342,890 | B1 | * | 3/2008 | Ferguson ..................... 370/351 |

(Continued)

FOREIGN PATENT DOCUMENTS

JP    05-191474 A    7/1993

(Continued)

OTHER PUBLICATIONS

AT&T, Unix System V Released 4; Programmer's Guide: Streams, Jun. 1992.

(Continued)

*Primary Examiner*—Bharat N Barot
(74) *Attorney, Agent, or Firm*—Harness, Dickey & Pierce, P.L.C.

(57) ABSTRACT

A communication signal sent out by an application is transferred to a communication signal control unit, and then is controlled or processed by a communication signal control module. Then, the communication signal is sent out to a network after being sequentially passed to a next communication signal control module. A communication control adjustment module included in a communication control adjustment unit, based on request conditions from a user, determines an execution position of the communication signal control module used for the control of the communication flow. The communication signal control module and the communication control adjustment module can change their structure even during communication.

12 Claims, 53 Drawing Sheets

U.S. PATENT DOCUMENTS

| | | | |
|---|---|---|---|
| 7,366,101 B1 * | 4/2008 | Varier et al. | 370/241 |
| 7,500,015 B2 * | 3/2009 | Hiyama et al. | 709/238 |
| 7,620,713 B2 * | 11/2009 | Tokuhashi et al. | 709/219 |
| 7,647,388 B2 * | 1/2010 | Kato | 709/219 |
| 2002/0129123 A1 * | 9/2002 | Johnson et al. | 709/219 |
| 2002/0143981 A1 | 10/2002 | DeLima et al. | |
| 2003/0236861 A1 * | 12/2003 | Johnson et al. | 709/219 |

FOREIGN PATENT DOCUMENTS

| | | |
|---|---|---|
| JP | 11-275145 | 10/1999 |
| JP | 11-275169 A | 10/1999 |
| JP | 2000-115240 | 4/2000 |
| JP | 2000-312226 | 11/2000 |
| JP | 2000-316025 | 11/2000 |
| JP | 2002-374286 | 12/2002 |
| JP | 2003-209553 A | 7/2003 |

OTHER PUBLICATIONS

News Release, NTT, Feb. 27, 2002, "New Software framework that allows Internet appliances to cooperate dynamically with networks and far-end appliances".

"N*Vector: A Research Project for Advanced Network Services and Applications," by Akihiro Tsutsui, NTT Review, vol. 14, No. 2, pp. 34-43, Mar. 2002.

"Next-generation home network technology," by Ryuma Kakinuma, et al., NTT Technical Journal, vol. 14, No. 11, pp. 51-54, Nov. 2002.

Marshall, Alan, et al., "Dynamic Network Adaptation Techniques in an Open Network Environment," International Conference on IT and Communications at the Dawn of the New Millennium, AIT, Aug. 1, 2000, pp. 1-10.

Hussain, S. A., et al., "A Programmable Scheduling Paradigm in an Adaptive Open Network Environment," Proceedings of the IASTED International Symposium, Applied Informatics, Feb. 19, 2001, pp. 1-6.

Feridun, M., et al., "Distributed Management with Mobile Components," IBM Research Report, Session Twenty Three, Distributed Systems and Applications, Feb. 1, 1999, pp. 857-870, San Jose, United States.

Durham, D., et al., "The COPS (Common Open Policy Service) Protocol; rfc2748.txt," IEFT Standard, Internet Engineering Task Force, IEFT, Jan. 1, 2000, pp. 1-37.

* cited by examiner

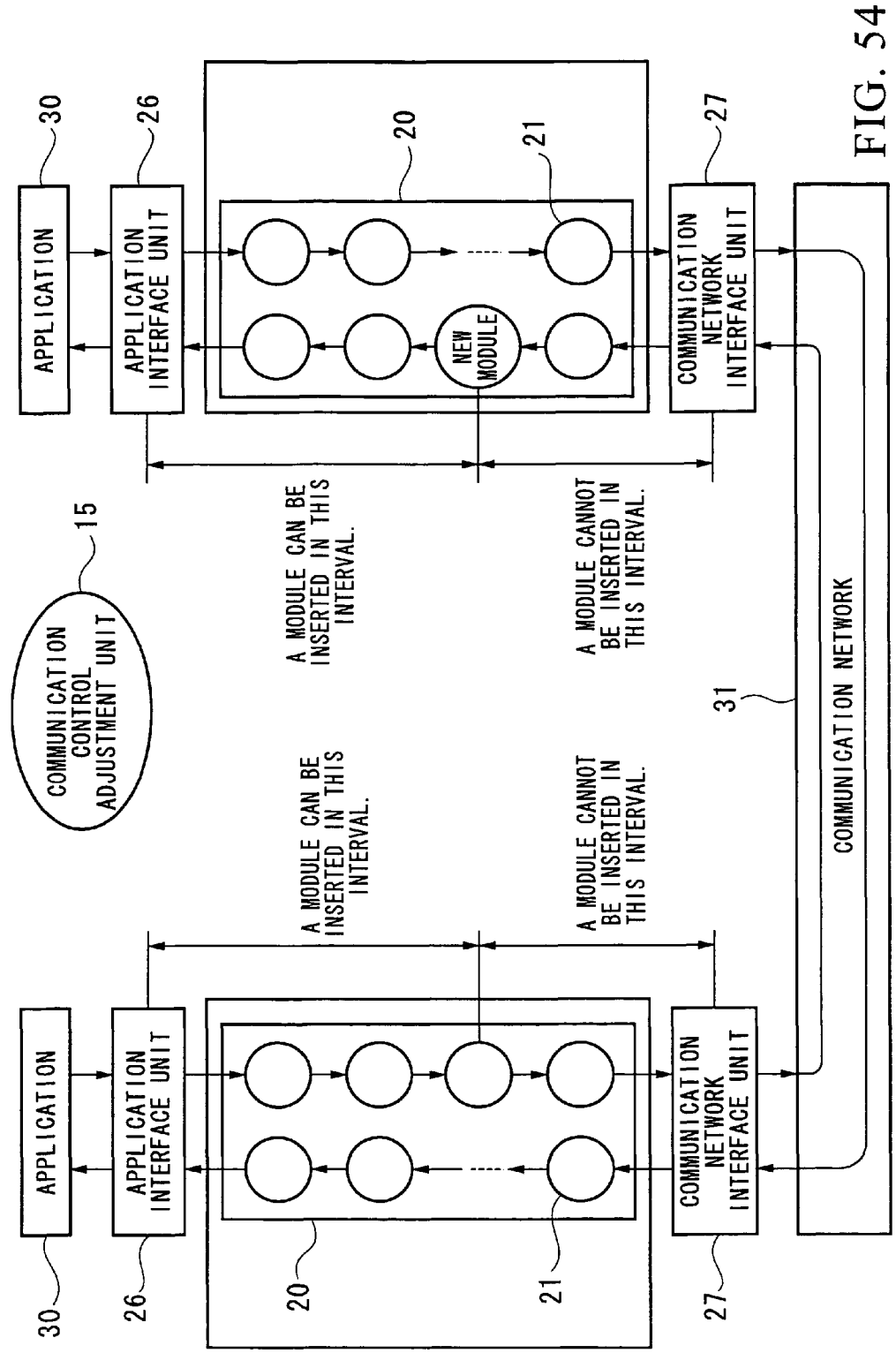

COMMUNICATION CONTROL METHOD, COMMUNICATION CONTROL APPARATUS, COMMUNICATION CONTROL PROGRAM AND RECORDING MEDIUM

PRIORITY CLAIM

Priority is claimed on Japanese Patent Application No. 2003-130047, filed May 8, 2003, the content of which is incorporated herein by reference

BACKGROUND OF THE INVENTION

1. Field of the Invention

The invention relates to a communication control method, a communication control apparatus, a communication control program and a recording medium for performing communication flow control by combining a software unit that controls communication flow.

2. Description of Related Art

As examples of a method for performing communication flow control by combining a software unit that controls communication flow, there are streams/XTI, and an active protocol stack method represented by Filter Streams function in Java (Trademark) language. See, for example, AT&T, Unix System V Release 4: Programmer's Guide: Streams, June 1992, ISBN 0130206601; NTT public release "Feb. 27, 2002"; Internet <http://www.ntt.co.jp/news/news02/0202/020227.html>; Tsutsui, "Advanced network utilization technique study project N*Vector", NTT R&D, Vol. 51, No. 2, pp. 76-85, 2002; and Kakinuma and Fujii, "Next generation home network technique", NTT technical journal, Vol. 14, No. 1, pp. 51-55, 2002.

According to the prior methods, the protocols and software units, which execute communication signal processing representative of a signal filter, are selectively combined. A communication signal sent out from an application is sequentially transferred to the software units, which controls the communication flow.

In the active protocol stack method of the prior art, since the software units for performing communication control are constructed only in a communication terminal, there is a problem that communication control can be performed only in the terminals. Because of this, for example, there is a problem that communication control for a mobile terminal having a low calculation capability cannot be carried out in a network device. In addition, there is a problem that software units cannot be constructed which are based on congestion information known only in a network.

Since the structure of software units is carried out only at the time when an application is activated and then cannot be changed during operation of the application, there is a problem that communication control cannot be actively altered depending on a change in a network or communication state or a request of a user.

A constituent software unit is limited to the one that is present beforehand in a communication terminal. Accordingly, there is a problem that software units, which may be possibly used, have to be owned all the time. When a new software unit appears, or software unit already available is changed, there is a problem that the software units should be installed for their use in the communication terminals by using some sorts of means.

Because it is not assumed that software units are developed by many unspecified developers, there is a problem that no function is existent for identifying who prepared a specified software unit and for verifying whether, after the preparation, a modification of the software unit has been made.

SUMMARY OF THE INVENTION

The invention was made considering the above circumstances. One of the objects of the invention is to provide a communication control method, a communication control apparatus, a communication control program and a recording medium, which places a communication signal control module for its operation not only in a communication terminal but also in an apparatus including a communication device in a communication network, and dynamically alters the communication signal control module according to communication conditions and environmental changes.

In order to solve the problems mentioned above, a communication control method in accordance with the invention is directed to controlling a communication flow by placing a module on a communication flow path for controlling communication flow towards the communication flow present through a network. The communication control method comprises after controlling or observation processing a signal of the communication flow by a communication signal control module placed on the communication flow path, transmitting the processed signal; monitoring information regarding the communication flow, based on requirement conditions about the communication flow provided by an application or an operator or automatically detected; composing a set of two kinds of modules of a communication signal control module for controlling the communication flow in order to meet the requirement conditions when the flow state does not meet the requirement conditions provided by the application or the operator, and a communication control adjustment module for placing or eliminating the communication signal control module on the communication flow path; and downloading the communication signal control module and the communication control adjustment module through a communication terminal and a communication device from a server in the network in which those modules are stored, and activating the downloaded communication signal control module and communication control adjustment module to realize control of the communication flow and satisfy the requirement conditions.

In the communication control method in accordance with the invention, the communication signal control module or the communication control adjustment module includes a digital signature in the communication signal control module or the communication control adjustment module, verifies the digital signature in the communication terminal and communication device, operates only the module about which identification of an author and nonexistence of module alteration are proved; and discards non-proved module or executes non-proved module after asking a manager his opinion.

The communication control method in accordance with the invention further comprises placing an application interface unit, a transmission frame processing unit, and a reception frame processing unit on the communication terminal; guaranteeing that no data exists in the communication signal control module between the application interface unit on the communication terminal on the transmission side and the transmission frame processing unit; guaranteeing that no data exists in the communication signal control module between the application interface unit on the communication terminal on the reception side and the reception frame processing unit; describing in a frame a chain number for identifying a set of communication signal control modules on the transmission side, by performing a frame assignment processing at the transmission frame processing unit; detecting a data boundary in which the set of the communication signal control modules on the transmission side has changed, by monitoring the chain number at the reception frame processing unit, to insert or eliminate the communication signal control modules on the reception side at the timing; and guaranteeing that communication data sent by a transmission application is transferred to a reception application in the same form to insert or eliminate the communication signal control module.

The communication control method in accordance with the invention further comprises requesting the communication signal control module on the communication terminal on the transmission side to immediately perform processing of data; suspending processing of the data for a sufficiently long period of time compared with a delay time of the communication network in communication and notifying the reception side of the timing guaranteeing that no data concerning communication exists in the communication signal control module on the transmission side, in the communication signal control module on the reception side or in communication network; detecting a data boundary at which a set of communication signal control modules on the transmission side has changed; and guaranteeing that communication data sent by a transmission application is transferred to a reception application in the same form to insert or eliminate the communication signal control module.

The communication control method in accordance with the invention further comprises counting a number of bytes of data sent by communication from the communication terminal on the transmission side; notifying the communication terminal on the reception side of the number of bytes about which a set of communication signal control modules on the reception side has changed; detecting a data boundary at which a set of communication signal control modules on the transmission side has changed; and guaranteeing that communication data sent by a transmission application is transferred to a reception application in the same form to insert or eliminate the communication signal control module.

The communication control method in accordance with the invention further comprises outputting on the communication network a specified byte sequence that an application does not use at all in communication or uses at a quite low probability, right after a set of communication signal control modules on the transmission side has changed; detecting a data boundary at which a set of communication signal control modules on the transmission side has changed; and guaranteeing that communication data sent by a transmission application is transferred to a reception application in the same form to insert or eliminate the communication signal control module.

In order to solve the problems mentioned above, the communication control apparatus in accordance with the invention is related to a communication control apparatus of controlling a communication flow by placing a module on a communication flow path for controlling communication flow towards the communication flow present through a network. The communication control apparatus comprise a communication signal control module placed on a communication flow path for inputting a signal of the communication flow and, after controlling or observation processing the input signal, transmitting the processed signal; a monitor unit for monitoring information regarding the communication flow based on requirement conditions about the communication flow provided by an application or an operator or automatically detected; a module composition unit composing a set of two kinds of modules of a communication signal control module for controlling the communication flow in order to meet the requirement conditions when the flow state monitored by the monitor unit does not meet the requirement conditions provided by the application or the operator, and a communication control adjustment module for placing or eliminating the communication signal control module on the communication flow path; and a module download unit for downloading the communication signal control module and the communication control adjustment module through a communication terminal and a communication device from a server in the network in which those modules are stored, and activating the downloaded communication signal control module and communication control adjustment module.

The communication control apparatus in accordance with the invention further comprises an application interface unit placed, a transmission frame processing unit placed and a reception frame processing unit, placed on the communication terminal; a first guarantee unit for guaranteeing that no data exists in the communication signal control module between the application interface unit on the communication terminal on the transmission side and the transmission frame processing unit; a second guarantee unit for guaranteeing that no data exists in the communication signal control module between the application interface unit on the communication terminal on the reception side and the reception frame processing unit; a chain number describing unit for describing a chain number in a frame to identify a set of communication signal control modules on the transmission side by performing a frame assignment processing at the communication terminal on the transmission side; a detection unit for detecting a boundary of data in which the set of communication signal control modules has varied by monitoring the chain number at the communication terminal on the reception side; and an insertion and elimination unit for inserting or eliminating the communication signal control modules by guaranteeing that communication data which a transmission application has sent is transferred to a reception application in the same form.

The communication control apparatus in accordance with the invention further comprises an application interface unit placed on the communication terminal on the transmission side for immediately requesting a data processing to the communication signal control module on the transmission side; a notification unit for suspending the data processing for a sufficiently long period of time compared with a delay time of a communication network in use and notifying the reception side of the timing; a guarantee unit for guaranteeing that no data regarding communication exists in the communication signal control module on the transmission side and in the communication signal control module on the reception side and in the communication network; and a detection unit for detecting a boundary of data in which a set of communication signal control modules has varied at the communication terminal on the transmission side; and an insertion and elimination unit for inserting or eliminating the communication signal control modules by guaranteeing that communication data which a transmission application has sent is transferred to a reception application in the same form.

The communication control apparatus in accordance with the invention further comprises a transmission counter processing unit placed on the communication terminal on the transmission side for counting a number of data bytes sent on communication; a notifying unit for notifying the communication terminal on the reception side of the number of data bytes about which a set of the communication signal control module on the transmission side has changed; a reception counter processing unit placed at the communication terminal on the reception side for detecting a data boundary in which a set of the communication signal control module on the transmission side has changed; and an insertion and elimination unit for inserting or eliminating the communication signal control modules by guaranteeing that communication data which a transmission application has sent is transferred to a reception application in the same form.

The communication control apparatus in accordance with the invention further comprises an output unit for outputting a predetermined sequence of bytes on the communication network immediately after a set of communication signal control modules on the transmission side has changed, the sequence of bytes being never used for communication by an application or having a sufficiently low probability in use; a transmission side delimiter synchronous processing unit placed on the communication terminal on the reception side for detecting a data boundary in which a set of the communication signal control module on the transmission side has changed; and an insertion and elimination unit for inserting or eliminating the communication signal control modules by guaranteeing that communication data which a transmission application has sent is transferred to a reception application in the same form.

In order to solve the aforementioned problems, the communication control program in accordance with the invention comprises after controlling or observation processing a signal of the communication flow by a communication signal control module placed on the communication flow path, transmitting the processed signal; monitoring information regarding the communication flow, based on requirement conditions about the communication flow provided by an application or an operator or automatically detected; composing a set of two kinds of modules of a communication signal control module for controlling the communication flow in order to meet the requirement conditions when the flow state does not meet the requirement conditions provided by the application or the operator, and a communication control adjustment module for placing or eliminating the communication signal control module on the communication flow path; and downloading the communication signal control module and the communication control adjustment module through a communication terminal and a communication device from a server in the network in which those modules are stored, and activating the downloaded communication signal control module and communication control adjustment module.

The communication control program in accordance with the invention further comprises guaranteeing that no data exists in the communication signal control module between the application interface unit placed on the communication terminal on the transmission side and the transmission frame processing unit; guaranteeing that no data exists in the communication signal control module between the application interface unit placed on the communication terminal on the reception side and the reception frame processing unit; describing in a frame a chain number for identifying a set of communication signal control modules on the transmission side, by performing a frame assignment processing on the transmission side; detecting a data boundary in which the set of the communication signal control modules on the transmission side has changed, by monitoring the chain number on the reception side; and guaranteeing that communication data sent by a transmission application is transferred to a reception application in the same form to insert or eliminate the communication signal control module.

The communication control program in accordance with the invention further comprises requesting the communication signal control module on the communication terminal on the transmission side to immediately perform processing of data; suspending processing of the data for a sufficiently long period of time compared with a delay time of the communication network in communication and notifying the reception side of the timing; guaranteeing that no data concerning communication exists in the communication signal control module on the transmission side, in the communication signal control module on the reception side, or in communication network; detecting a data boundary at which a set of communication signal control modules on the transmission side has changed; and guaranteeing that communication data sent by a transmission application is transferred to a reception application in the same form to insert or eliminate the communication signal control module.

The communication control program in accordance with the invention further comprises counting a number of bytes of data sent by communication from the communication terminal on the transmission side; notifying the communication terminal on the reception side of the number of bytes about which a set of communication signal control modules on the reception side has changed; detecting a data boundary at which a set of communication signal control modules on the transmission side has changed; and guaranteeing that communication data sent by a transmission application is transferred to a reception application in the same form to insert or eliminate the communication signal control module.

The communication control program in accordance with the invention further comprises outputting on the communication network a specified byte sequence that an application does not use at all in communication or uses at a quite low probability, right after a set of communication signal control modules on the reception side has changed; detecting a data boundary at which a set of communication signal control modules on the transmission side has changed; and guaranteeing that communication data sent by a transmission application is transferred to a reception application in the same form to insert or eliminate the communication signal control module.

Furthermore, so as to solve the problems mentioned above, the invention is directed to a recording medium for recording a communication control program. The recording medium comprises after controlling or observation processing a signal of the communication flow by a communication signal control module placed on the communication flow path, transmitting the processed signal; monitoring information regarding the communication flow, based on requirement conditions about the communication flow provided by an application or an operator or automatically detected; composing a set of two kinds of modules of a communication signal control module for controlling the communication flow in order to meet the requirement conditions when the flow state does not meet the requirement conditions provided by the application or the operator, and a communication control adjustment module for placing or eliminating the communication signal control module on the communication flow path; and downloading the communication signal control module and the communication control adjustment module through a communication terminal and a communication device from a server in the network in which those modules are stored, and activating the downloaded communication signal control module and communication control adjustment module.

According to the invention, after controlling or observation processing a signal of the communication flow by a communication signal control module placed on the communication flow path, the processed signal is transmitted. Information regarding the communication flow is monitored based on requirement conditions about the communication flow provided by an application or an operator or automatically detected. A set of two kinds of modules is composed of a communication signal control module for controlling the communication flow in order to meet the requirement conditions when the flow state does not meet the requirement conditions provided by the application or the operator, and a communication control adjustment module for placing or eliminating the communication signal control module on the communication flow path. The communication signal control module and the communication control adjustment module are downloaded into a communication terminal and a communication device from a server in the network in which those modules are stored, and the downloaded communication signal control module and communication control adjustment module are activated to realize control of the communication flow and satisfy the requirement conditions.

Accordingly, the communication signal control module can be placed not only in a communication terminal but also in a communication device in a network. In addition, the communication signal control module can be operated and further dynamically changed depending on a variation of communication conditions or environmental situations.

BRIEF DESCRIPTION OF THE DRAWINGS

FIG. 54 is a conceptual diagram for illustrating a place (a second example) in which a module can be inserted in accordance with a framing method.

DETAILED DESCRIPTION OF THE INVENTION

The embodiments in accordance with the invention will be described below referring to the figures.

A. Structure of a First Embodiment

Figure 1:
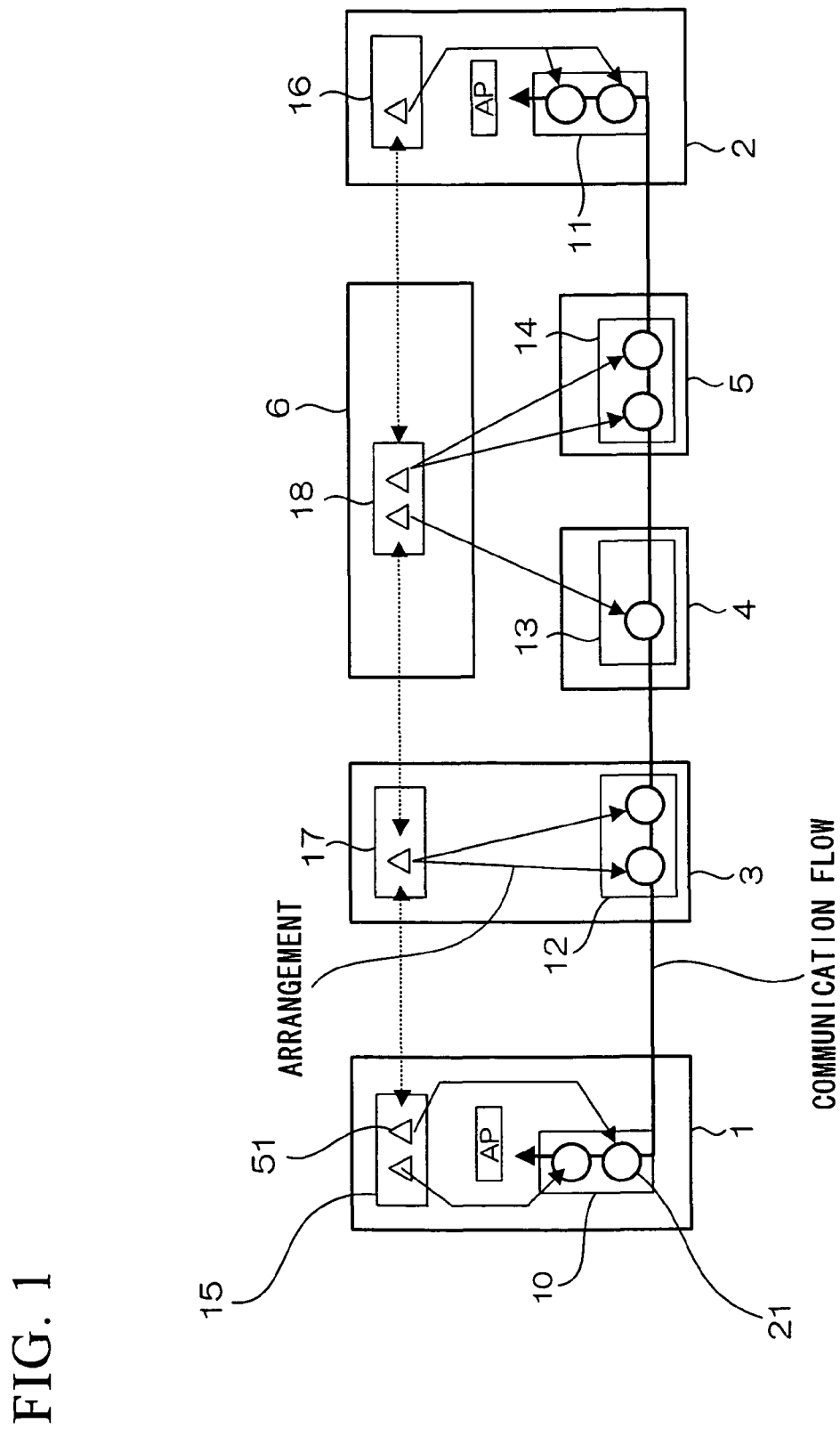
FIG. 1 is a block diagram showing an overall structure of an embodiment in accordance with the invention.

FIG. 1 is a block diagram showing an overall structure of an embodiment in accordance with the invention. In FIG. 1, according to communication terminals 1 and 2 and communication devices 3, 4, and 5, a communication flow is established between applications that are operating in the opposite communication terminals 1 and 2. The communication flow is a logical representation of a transfer path for communication signals that are transmitted and received by the applications. For example, the communication flow is realized by an IP network.

The communication terminal 1 includes a communication signal control unit 10 and a communication control adjustment unit 15, while the communication terminal 2 includes a communication signal control unit 11 and a communication control adjustment unit 16. The communication device 3 contains a communication signal control unit 12 and a communication control adjustment unit 17, the communication device 4 includes a communication signal control unit 13, and the communication device 5 includes a communication signal control unit 14. However, as shown in the figure, there can exits a communication network management device 6 that includes only a communication control adjustment unit 18, and the communication devices 4 and 5 that contain only the communication signal control unit 13 and 14, respectively.

All of the communication devices and the communication terminals that constitute a communication flow do not necessarily have to have a structure of the present invention. Even if there is an intermediate device does not have a structure of the preset invention, the present invention can work partially.

A communication signal sent by the application is transferred to the communication signal control unit 10 and 11, which in turn is transferred to a communication signal control module 21 in the communication signal control unit 10 and 11. The communication signal control module 21 receives a communication signal as an input, which is controlled or processed through an observation. After the processed signal is conveyed to a communication signal control module positioned next, or, when the module is the last one in device, is sent out to a network.

As examples of the communication signal control module 21 cited are encryption, compression, communication quality control, shaping (smoothing of information flow), polishing (forming a fixed band for information flow), synchronous control, filtering, and image encoding and conversion.

In the communication devices 3, 4 and 5 for relay, a communication signal for communication flow is selectively extracted that is a controlled variable from a network. The communication signal, as described above, is controlled through the communication signal control module 21 in control units 12, 13, and 14.

On the other hand, the communication control adjustment units 15, 16 and 18 have a function by which the communication signal control module 21 can be placed on the path of the communication flow. A communication control adjustment module 51 included in the communication control adjustment units 15, 16, 17 and 18 owns functions through which the communication signal control module 21 used for controlling the communication flow can be selected and execution positions for the modules can be determined, depending on the request conditions or conditions of classification of the applications now in use.

The execution position for the communication signal control module 21 can be selected according to the situation. For example, as represented by a portable terminal, when the communication control adjustment module 51 decides or detects that calculation ability of the communication terminal is poor for an execution of a desired communication signal control module, execution of the communication signal control module 21 can be made in place of the communication terminal in a communication device of the front stage of the communication terminal The communication control adjustment units 15, 16, 17 and 18 and the communication control adjustment module 51 can be carried out distributively on a plurality of devices on a path of the communication flow. Mutual communication can be performed among the distributed modules. For example, the communication control adjustment module 51 that controls the communication signal control module 21 for measuring the quality of communication in the communication network transfers the quality information to the communication control adjustment modules working at the communication terminals 1 and 2, the results of which are used, for example, for compression processing of the communication signal.

On the other hand, as shown in the figure, the communication control adjustment units 15, 16, 17 and 18 does not function distributively as a plurality of devices, but can be operated centrally as a single device.

The communication control adjustment module 51, as with the communication signal control module 21, can vary dynamically with regard to its combination. The communication control adjustment units 15, 16, 17 and 18 and the communication signal control units 10, 11, 12, 13, and 14 are introduced into the devices in which the applications can operate before the applications start to communicate. In the meantime, the communication signal control module 21 and the communication control adjustment module 51, which work inside them, can download and start up the applications, independent of start-up of them. That is, it is possible to modify a method of placing all the modules beforehand prior to the applications, a method of placing some modules suitably after the applications and communication thereof are established, and a module structure during communication.

In this way, a structure is adopted in which the communication signal control module 21 is placed dynamically on the path of the communication flow, which provides control of communication flow with higher degree of freedom.

Figure 2:
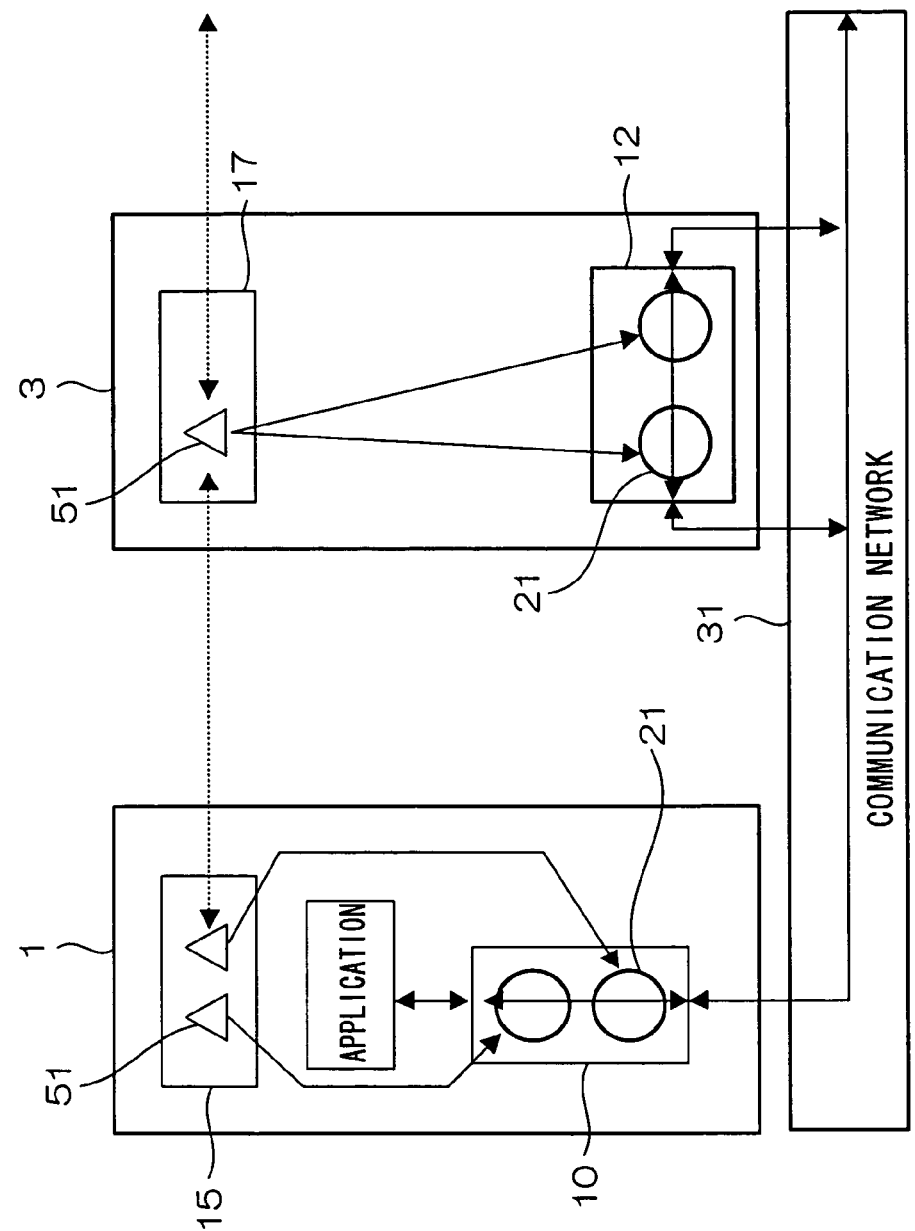
FIG. 2 is a block diagram comparing a structure of a communication terminal 1 with that of a communication device.

FIG. 2 is a block diagram comparing a structure of the communication terminal 1 with that of the communication device 3. In the communication terminal 1 and the communication device 3, there is no difference in structure between the communication control adjustment units 15 and 17, while there is a slight difference between the communication signal control units 10 and 12. At the communication terminal 1, the communication signal of communication flow is transmitted and received to and from the application on one hand, and the network on the other side. At the communication device 3, only the communication flow is selected and extracted that is controlled by the communication control adjustment units 17 among the communication signals that has arrived at the communication device to be fed to the communication signal control units 12, the result of which in turn is sent out to the communication network once again.

Since the difference in structure between the communication signal control units 10 and 12 is nominal, embodiments derived from the structure of the communication terminal 1 are mainly explained. However, a similar structure can be applicable to the communication device 3.

A communication network 31 in the figure has a function of transferring signals between the communication terminal 1 and the communication device 3. For example, an IP network is cited that is used in the Internet.

A configuration (namely, protocol layer) for receiving data at a boundary among the communication signal control units 10 and 12 and the communication network 31 differs according to an interface offered by an OS (Operating System) of the communication channel to be used and devices to be loaded. A typical configuration is a method defined by socket abstraction.

It is assumed that among the communication control adjustment unit 15 and 17, the communication signal control units 10 and 12, and a module server, communication can be possible by some method (for example, the Internet) the apparatus employs.

Figure 3:
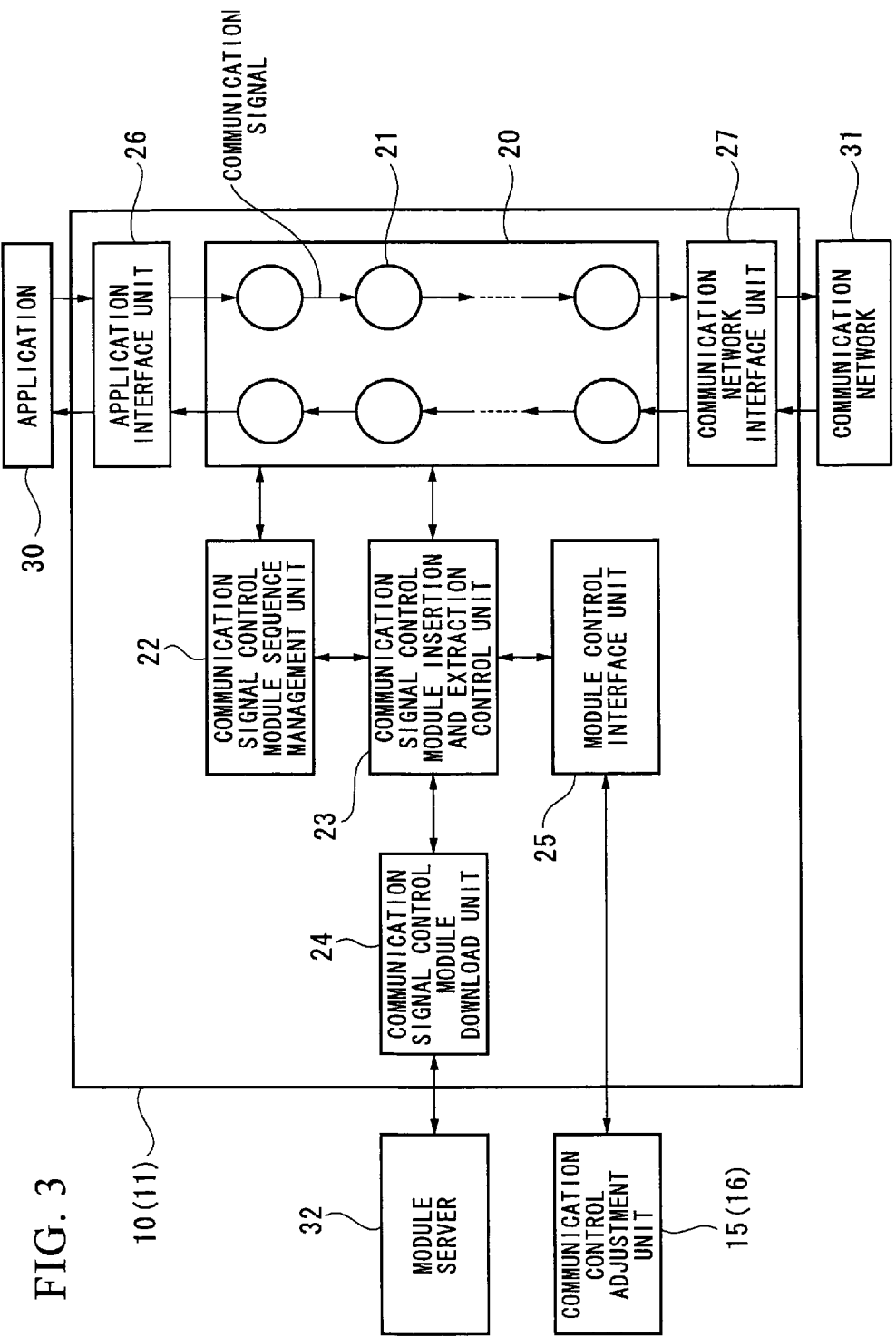
FIG. 3 is a block diagram showing a structure of communication signal control units 10 and 11 in communication terminals 1 and 2 of a first embodiment in accordance with the invention.

FIG. 3 is a block diagram showing a structure of the communication signal control units 10 and 11 in communication terminals 1 and 2, and shows a first embodiment in accordance with the invention. In FIG. 3, the communication signal control units 10 (or 11) includes a communication signal control module insertion unit 20, a communication signal control module 21, a communication signal control module sequence management unit 22, a communication signal control module insertion and extraction control unit 23, a communication signal control module download unit 24, a module control interface unit 25, an application interface unit 26, and a communication network interface unit 27.

The application interface unit 26 has a function that enables a communication signal to be sent to and be received from the application 30. The signal received from the application is conveyed to the first communication signal control module 21 in the communication signal control module insertion unit 20. Meanwhile, with regard to the opposite communication flow, the communication signal that has undergone complete processing at the final stage of the first communication signal control module 21 is transferred to the application 30.

The communication signal control module insertion unit 20 is a functional unit that has the ability to place the communication signal control module 21. In the unit, in the opposite direction with respect to the dual directional communication flow, linkage of the communication signal control module 21 is constituted. For example, as in a case where communication starts, when the communication signal control module 21 is absent, a communication signal from the application interface unit 26 is transferred directly to the communication network interface unit 27, and on the contrary, a communication signal from the communication network interface unit 27 is conveyed directly to the application interface unit 26.

The communication signal control module 21, as mentioned above, receives information flow as an input, and controls and observes the information flow. When the communication signal control module 21 corresponds to the next communication signal control module 21 on the above linkage or the last stage of the communication signal control module 21, the communication signal control module 21 sends out the processed communication signal to the communication network interface unit 27.

The communication network interface unit 27 receives the processed communication signal at the communication signal control module 21, and sends it out to the communication network 31. With respect to a communication signal in the opposite direction the communication terminal is supposed to receive, the communication signal from the communication network 31 is transmitted to the communication signal control module 21.

The communication signal control module sequence management unit 22 always retains, as information, module names for the communication signal control module 21 formed in two linkages and linkage connection states about them, in the communication signal control module insertion unit 20.

The module control interface unit 25 has a function that enables communication with the communication control adjustment unit 15, and receives a structural change (for example, start-up of a new communication signal control module) in the communication signal control module 21 requested by the communication control adjustment unit 15 or 16 and reports the results.

The communication signal control module download unit 24 starts up to download, from the module server 32 through the network, the communication signal control module 21, which is required to be activated by the instructions via the module control interface unit 25.

The communication signal control module insertion and extraction control unit 23 changes a structure in the communication signal control module 21 that received a command via the module control interface unit 25. When a new module is added, according to the designation of a module name to be added and a position in a module linkage, the communication signal control module insertion and extraction control unit 23 extracts the designated module from the communication signal control module download unit 24, and, assigning the communication signal control module insertion unit 20, inserts the communication signal control module 21 into a predetermined position. In contrast, when the communication signal control module 21 is removed, the designated communication signal control module 21 is drawn out from the inside of the communication signal control module insertion unit 20, in which the linkage is maintained by newly connecting the front stage and the rear stage of the drawn module.

The module server 32 can be realized using the well-known Web server, the FTP server, the LDAP server, and the WebDAV server.

Figure 4:
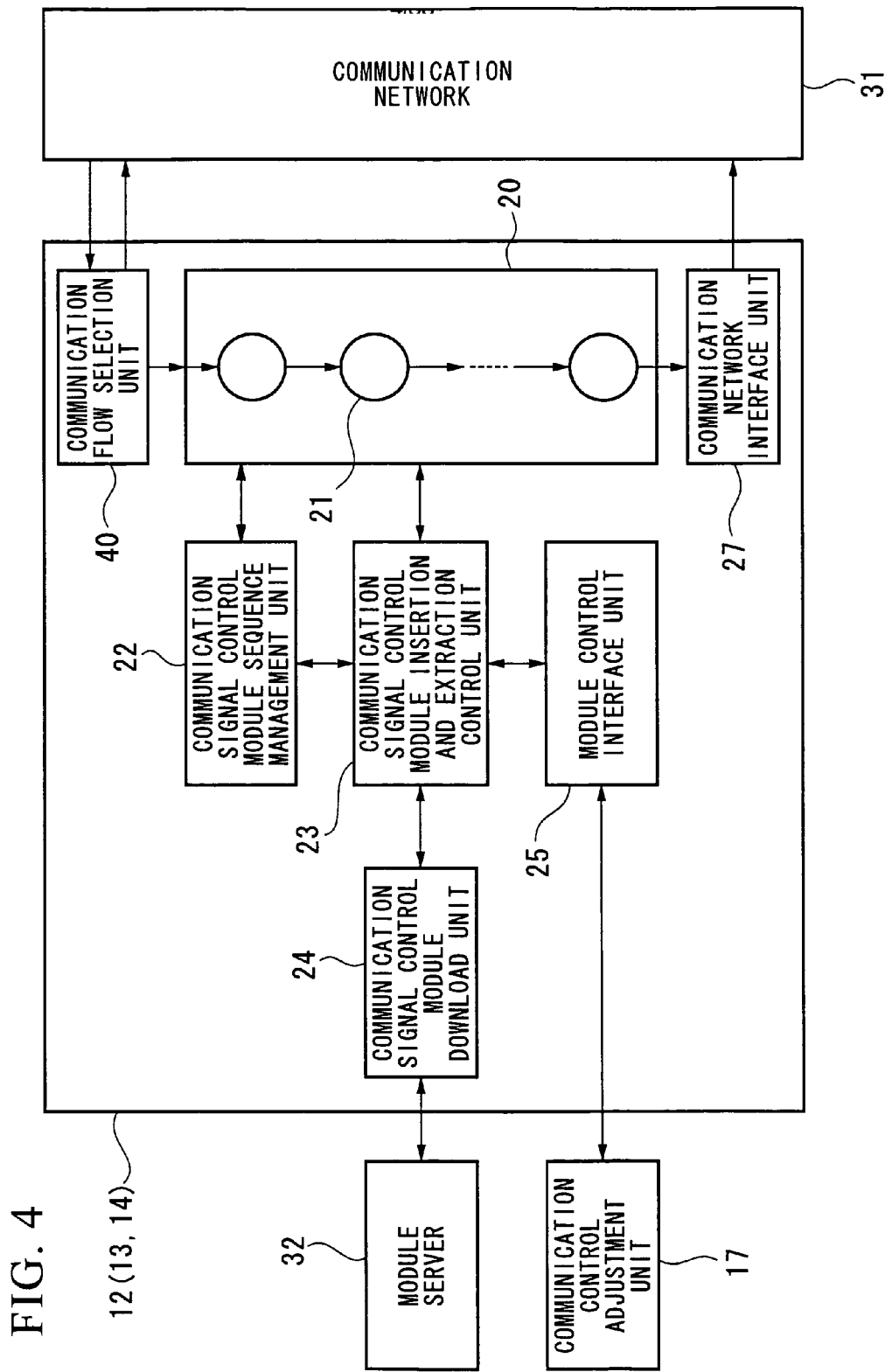
FIG. 4 is a block diagram showing communication signal control units 12, 13 and 14 of communication devices 3, 4 and 5, respectively.

FIG. 4 is a block diagram showing the communication signal control units 12, 13 and 14 of the communication devices 3, 4 and 5, respectively. The figure differs from the communication terminals 1 and 2 above in that the figure contains a communication flow selection unit 40. The communication flow selection unit 40 selects only the communication signals belonging to the communication flow t controlled by the designated communication signal control module 21, from the communication signals the communication devices received, and conveys the selected communication signals to the uppermost stage of the designated communication signal control module 21. The unprocessed communication signals are transferred once again to the communication network 31.

The communication signals to be processed are, as explained above with the communication terminals 1 and 2, are processed by the linkage of the communication signal control module 21. The communication signals after being processed via the communication network interface unit 27 are transmitted once again to the communication network 31.

In the figure, the direction of the communication flow, different from that of the communication terminals 1 and 2, is symmetrical, owing to which the direction of the communication flow is shown in one direction.

Figure 5:
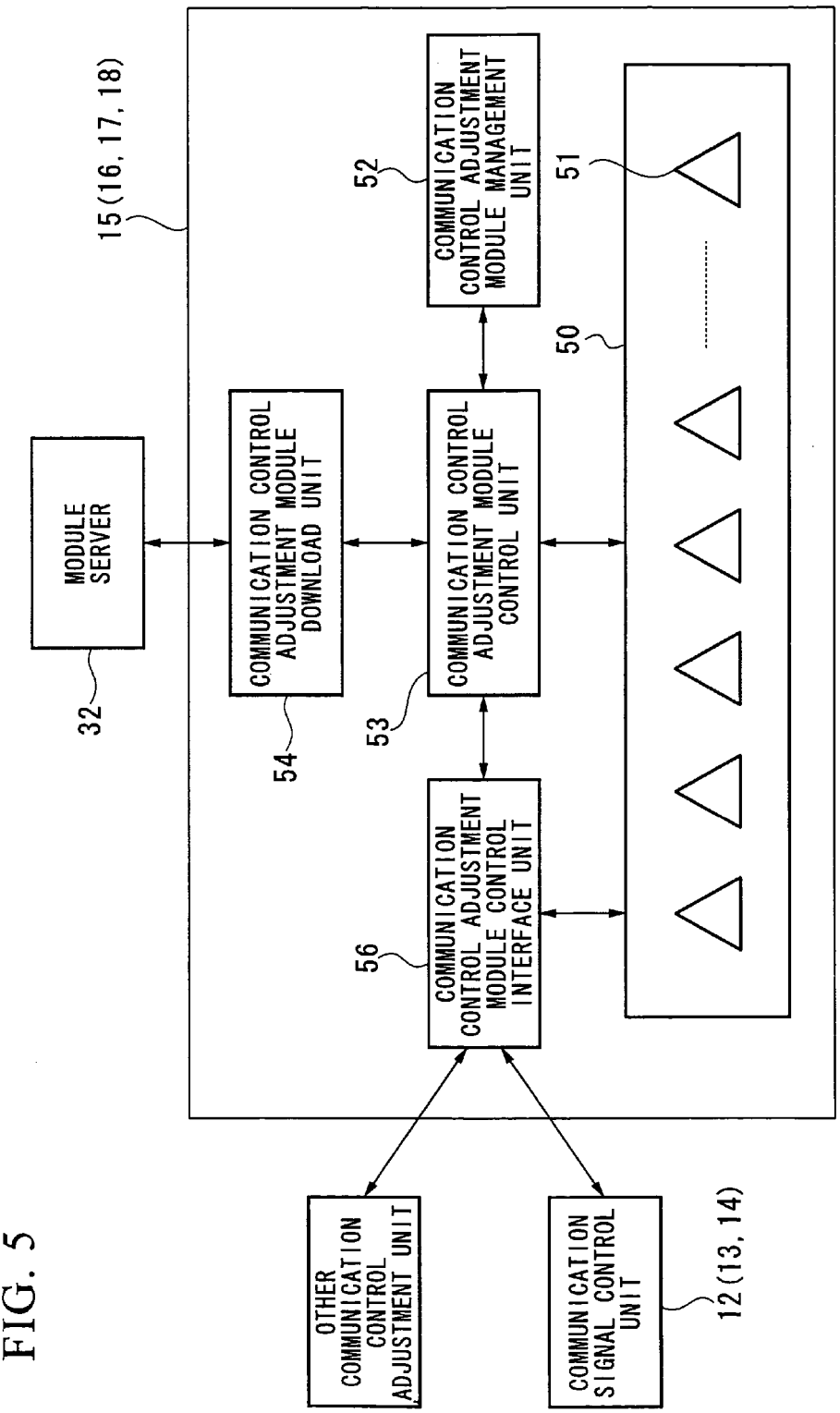
FIG. 5 is a block diagram showing communication control adjustment units 15-18.

FIG. 5 is a block diagram showing the communication control adjustment units 15-18. In the figure, the communication control adjustment units 15-18 includes a communication control adjustment module insertion unit 50, a communication control adjustment module 51, a communication control adjustment module management unit 52, a communication control adjustment module control unit 53, a communication control adjustment module download unit 54, and a communication control adjustment module control interface unit 56.

The communication control adjustment module insertion unit 50 is a functional part in which the communication control adjustment module 51 is inserted. The communication control adjustment module 51 includes an algorithm for performing the selection and arrangement of the communication signal control module so that the requirement conditions (for example, on quality) on the communication flow can be met. According to the algorithm, the communication control adjustment module 51 monitors information (for example, obtaining the state information via a communication network management system or from the communication terminal) regarding a communication flow based on the requirement conditions (for example, a communication bandwidth, delay, and necessity of secrecy about communication information) on the communication flow, where the requirement conditions are given by an operator from a GUI or file that the communication control adjustment module displays on a console, or given from an application through communication with the application by the communication control adjustment module, or calculated (*1) based on an algorithm contained in a module. When the state of the flow does not satisfy the requirement conditions, the communication control adjustment module 51 decides means (*2) for meeting the requirements, and places on or removes from a communication flow path the communication signal control module that conducts communication flow control for realizing the means.

(*1) Example of Algorithm

In a case in which an application for communication is a TV meeting application (for example, Net Meeting), for example, requirement conditions on a communication bandwidth and delay necessary for a comfortable use can be calculated based on an algorithm (knowledge and information) inside of the communication control adjustment module.

(*2) Example of Means for Meeting Requirements

In a video image transmission application that needs a communication bandwidth of 500 kbps, for example, when information loss (packet loss) occurs due to congestion in a communication network and the image blurs, it is decided that the communication signal control module for setting packet priority higher is inserted into the communication terminal on the transmission side. Since a method for setting packet priority higher is related to a system of the network, there can be a plurality of methods. One typical method is the one for assigning a priority identification field in a header of a packet (for example, IP).

The communication control adjustment module 51 communicates with another communication control adjustment module working in another device via the communication control adjustment module control interface unit 56 when need arises, for example, to notify the results of the communication flow state observed. According to a situation (*3), the communication control adjustment module 51 works another communication control adjustment module on its own or on a different device, and in contrast, deletes unnecessary communication control adjustment modules.

(*3) Example of Working Another Communication Control Adjustment Module

The communication control adjustment module, for example, contains a table that relates an identifier of the communication control adjustment module with a situation of the terminal or network such as a use rate of communication bandwidth and a CPU load of the terminal. Then, the communication control adjustment module consecutively compares the table with the situation observed. When the situation observed satisfies the table, a communication control adjustment module that corresponds to the situation is activated.

In addition, there is another method for working a communication control adjustment module: When the communication control adjustment module opens a port for receiving a command from a user application, the communication control adjustment module is worked newly based on a designation of the communication control adjustment module contained by the command.

The communication control adjustment module management unit 52 controls the name of the communication control adjustment module 51 working therein. The communication control adjustment module download unit 54 starts up to download, from the module server 32 via the network, the communication control adjustment module 51 that should be newly activated by a designation through the communication control adjustment module control interface unit 56.

The communication control adjustment module control interface unit 56 provides communication with another communication control adjustment module in another device that is operated by the communication control adjustment module 51 and, and communication with the communication signal control units 12-14. The communication control adjustment module control unit 53 newly starts up the designated communication control adjustment unit therein, or deletes the designated communication control adjustment module, based on a request from the communication control adjustment module 51 or other requests.

An "arrangement method" of the communication control adjustment module 51 and the communication signal control module 21 will be explained below. As described above, the communication control adjustment module 51 and the communication signal control module 21 are placed on the communication path for their operation.

A typical example of layout procedures for the communication control adjustment module 51 is as follows. One of the communication control adjustment modules 51, activated first by some method (for example, a method in which a user activates using an exclusive application for activation, or a method using an application that detects when an application for a controlled system begins to be used and activates a module suitable for the detection), identifies another communication control adjustment module 51 necessary for concurrent operation thereof and decides a place for activation, orders the communication control adjustment units 15-18 that is supposed to be activated via the communication control adjustment module control interface unit 56, and downloads the communication control adjustment module 51 for its start up. The newly started-up communication control adjustment module 51 may activate still another communication control adjustment module 51. In this way, the method is one example of activation in which a communication control adjustment module 51 firstly activated starts up, as a chain reaction, another communication control adjustment module 51 on the communication path.

One example of layout procedure for the communication signal control module 21 is, as described above, that the communication control adjustment module 51 activated on the communication path decides an allocation place of the communication signal control module 21, and downloads a desired communication signal control module via the module control interface unit for its activation.

Figure 6:
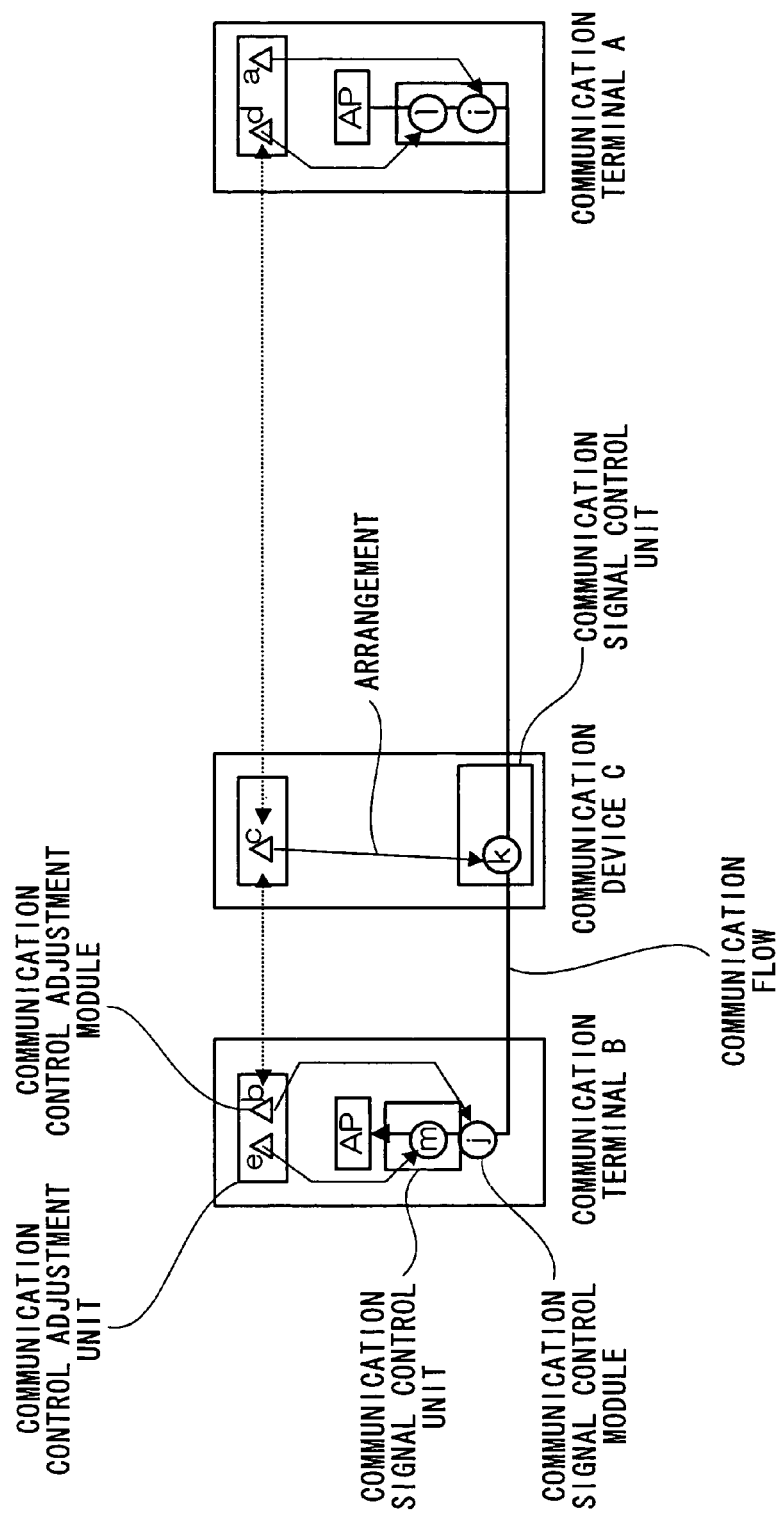
FIG. 6 is a block diagram explaining an example of arrangement for a communication control adjustment module and a communication signal control module.

FIG. 6 is a block diagram explaining an example of arrangement for a communication control adjustment module and a communication signal control module. In the figure, a communication terminal A and a communication terminal B are connected via a communication device C midway. According to the method described above, a communication control adjustment module a is activated in the communication terminal A.

The communication control adjustment module a judges the necessity of secrecy for the communication, and decides that a communication signal control module is used for encryption. The judgment of the necessity of secrecy can be made, for example, based on data stored in the communication control adjustment module a as to whether or not an unreliable network section is passed when the communication terminal B as a communication destination is connected to an address for a network and the network.

The communication control adjustment module a decides the communication terminal B as a place for executing decryption, and prompts activation of the communication control adjustment module b that adjusts the decryption in the communication terminal B and then activates the module. As a method of judging a place for executing decryption, for example, it is obvious that the encryption of this case can be effectively performed at a place closer to the terminal, which can be judged by the communication control adjustment module a.

The communication control adjustment module a starts up a communication signal control module i that performs encryption in the communication terminal A, while the communication control adjustment module b activates a communication signal control module j that carries out encryption in the communication terminal B. At this time, encrypting information between the communication terminals A and B is executed.

When the communication control adjustment modules a and b decide that the composite processing at the communication terminal B is not appropriate (for example, when the communication terminal B is a portable device having relatively low calculation abilities), the communication control adjustment modules a and b may select the communication terminal C as a substitute place for executing decryption. In this case, a communication signal control module k is activated that carries out decryption in the communication terminal C, and then is used. In this way, in order to decide a location of a module according to the situation, an algorithm is included in the communication control adjustment module.

In the above situation, when congestion has occurred that has reduced a communication bandwidth between the communication terminals A and B, the communication control adjustment module may decide that a communication signal control module should be added which performs "compression." The occurrence of congestion in communication networks is detected by the fact that the communication control adjustment module refers to data showing communication quality in the communication terminal, or that the communication signal control module for measuring communication quality is inserted beforehand.

In this case, the communication control adjustment modules d and e activate the communication signal control module l and m, respectively, for executing compression and expansion, which leads to compression of the communication signal. At this time, a point that should be noted is that there may be a interrelationship in an "order" for arranging in the communication flow between the communication signal control module (in this example, the communication signal control module i and j for executing encryption and decryption) already in use and the communication signal control module to be newly activated For example, there is a series of events: compression (l)→encryption (i)→decryption (j)→expansion (m), which operates normally. However, when the arrangement compression (l)→encryption (i)→expansion (m)→decryption (j) is made, there occurs a problem at expansion (m) that an encrypted communication signal cannot be expanded. In this way, some of the communication signal control modules have interrelationship with respect to a layout order. Information for an appropriate layout regarding the interrelationship is included in the communication control adjustment module.

B. Second Embodiment

Figure 7:
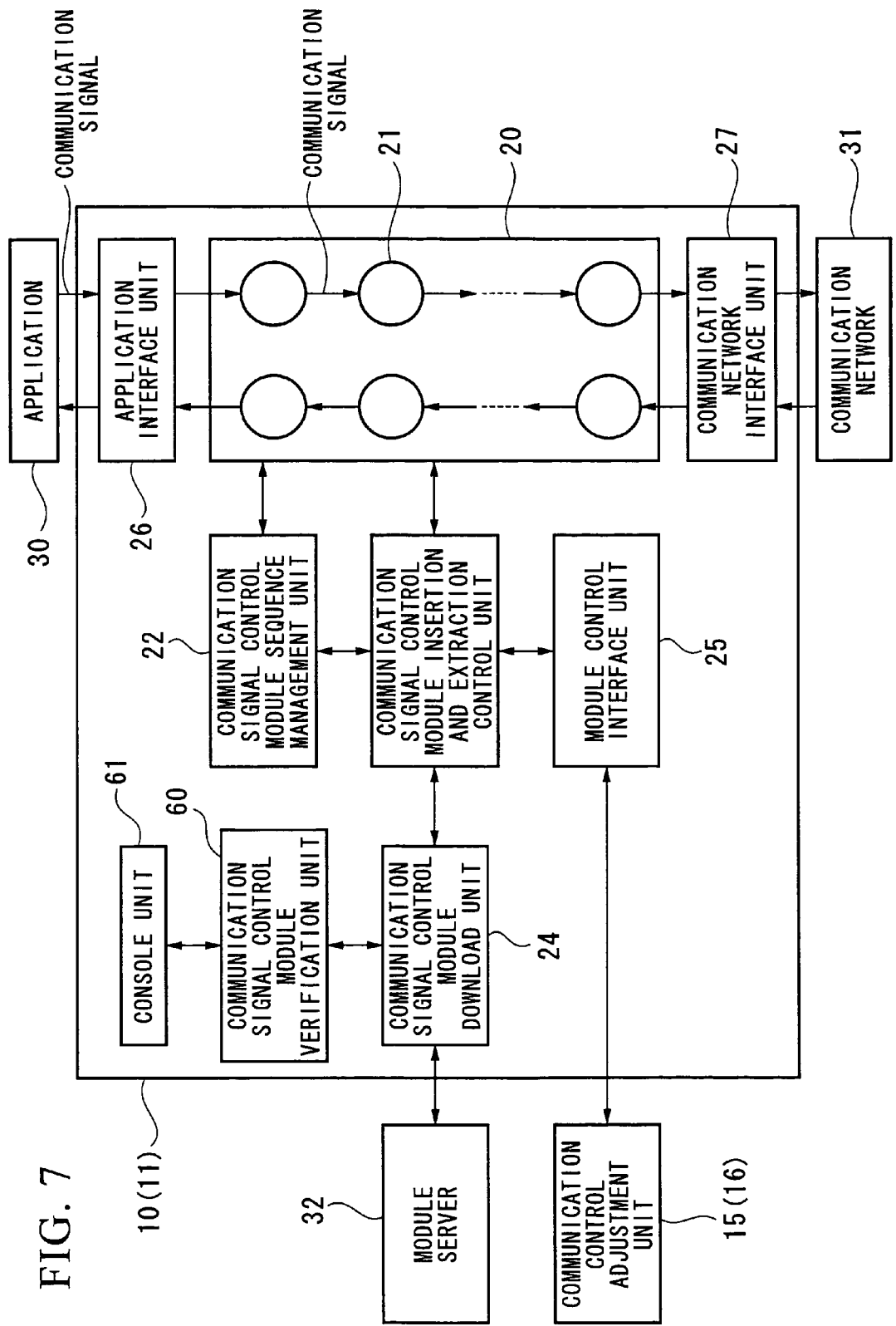
FIG. 7 is a block diagram showing a structure for a communication signal control unit of a second embodiment in accordance with the invention.
Figure 8:
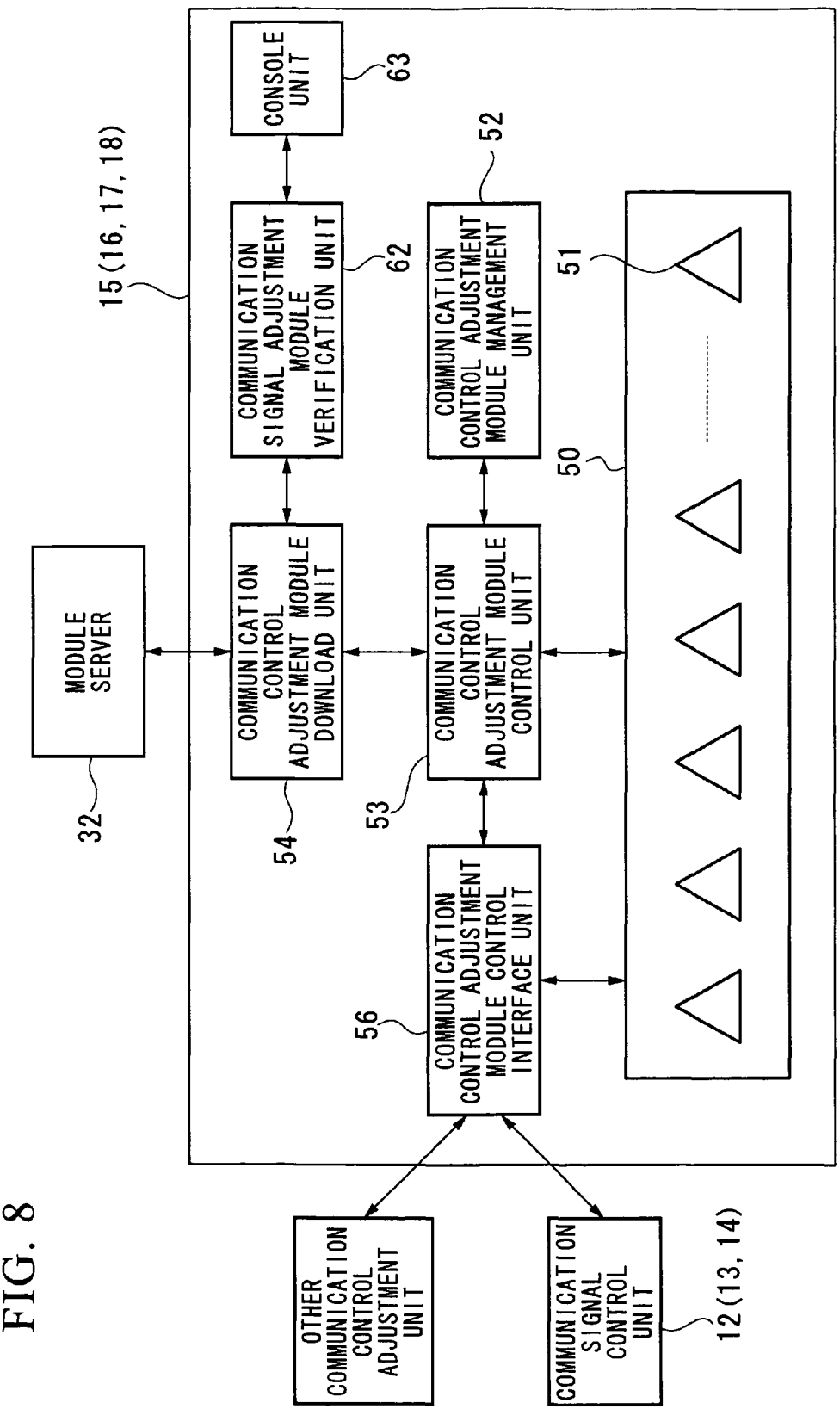
FIG. 8 is a block diagram showing a structure for a communication control adjustment unit of a second embodiment in accordance with the invention.

A second embodiment in accordance with the invention will be described below. FIG. 7 is a block diagram showing a structure for a communication signal control unit of a second embodiment in accordance with the invention. FIG. 8 is a block diagram showing a structure for a communication control adjustment unit of a second embodiment in accordance with the invention.

The difference between the second embodiment and the first embodiment explained above is as follows. The first embodiment executes without examining a module downloaded from the module server 32, while the second embodiment includes a communication signal control module verification unit 60 and a communication control adjustment module verification unit 62 in the communication devices 10 and 16 that verify whether or not the module is activated.

In the structure of the second embodiment, the communication signal control module and the communication control adjustment module contain digital signature in their modules, respectively. The digital signature contains detection of a module modification, and identification (for example, public key certificate) of a module maker.

The communication signal control module verification unit 60 and the communication control adjustment module verification unit 62 verify the digital signature contained in the module for which activation is sought and downloading is carried out, and operates the modules only that are verified as having no identification of the maker and module modification. With regard to non-proved modules, abandonment or verified information via a console unit 61 and 63 is provided to a manager. Based on the information, the manager decides whether or not execution is possible, the result of which is input via the console units 61, 63 for execution or abandonment.

According to the function, the possibility is avoided that modules having low reliability, or modules modified by someone, or modules having a risk in activation are activated.

C. Explanation of Common Matter in Embodiments 3-6

C-1. Discharge Request

A discharge request is supplied to the communication signal control module 21 in a form of a data structure. A signal "1" is written into a discharge flag region 203 in the data structure 200.

C-2. Explanation of Communication Signal Control Module

Figure 9:
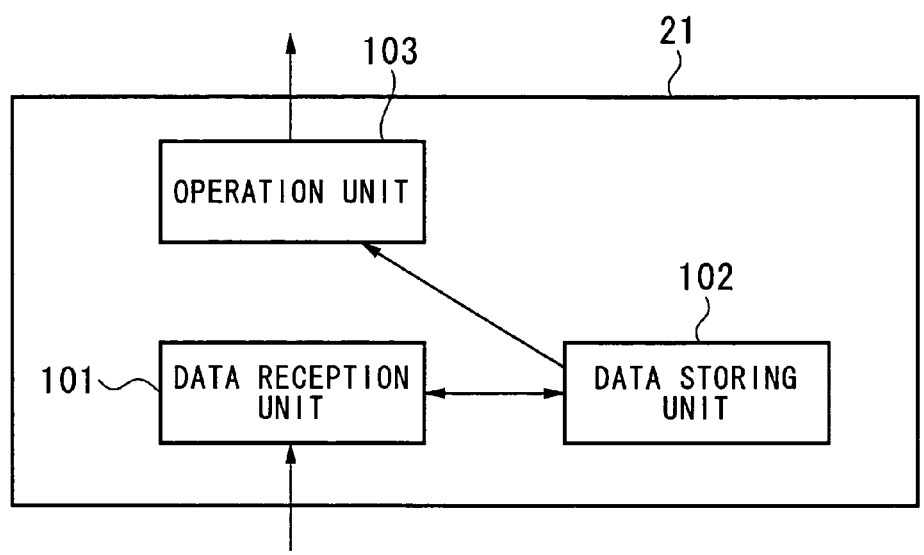
FIG. 9 is a conceptual diagram showing a structure of a communication signal control module 21.

FIG. 9 is a conceptual diagram showing a structure of a communication signal control module 21. The communication signal control module 21 has a structure shown in FIG. 9. When a data reception unit 101 receives a data structure 200, the data structure 200 is stored in a data storing unit 102 that is a first-in first-out buffer. An operation unit 103, constituted as a multithread program, can work in parallel to other communication signal control modules and communication applications. The operation unit 103 has received the data structure 200 stored in the data storing unit 102 and performs protocol operation processing on the data structure 200, which is then transferred to the data reception unit 101 in the next communication signal control module. When a discharge request is received, the data stored in the data storing unit 102 is processed immediately. After this, the received discharge request as it is is sent out to a next communication signal control module.

C-3. Explanation of Communication Network Interface Unit

Figure 10:
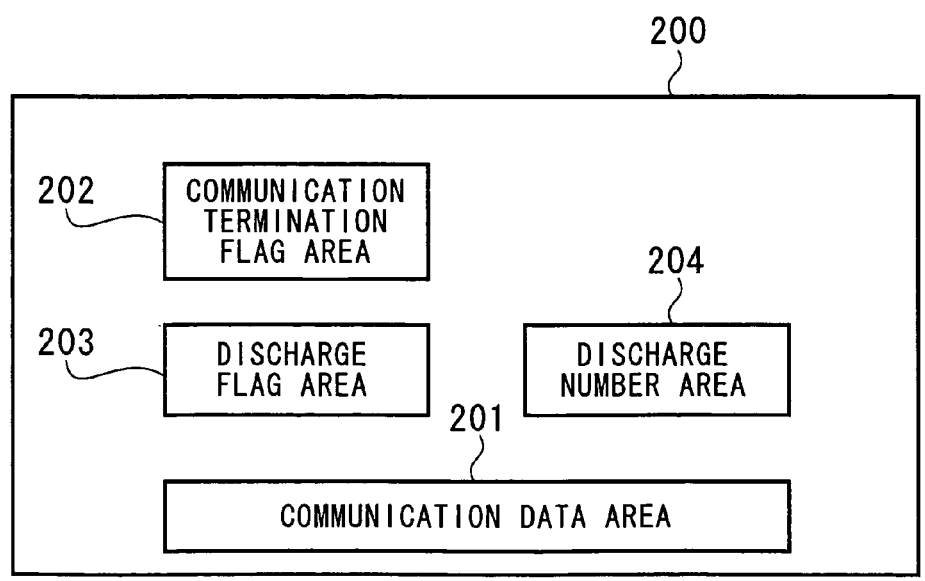
FIG. 10 is a conceptual diagram showing a data structure 200.

FIG. 10 is a conceptual diagram showing a data structure 200. The communication network interface unit 27 has the function to send out to a communication network 31 the data held in a communication data region 201 in the data structure 200, transmitted by an adjacent communication signal control module 21. When data is transmitted from the communication network 31, the above data is, in turn, assigned to the communication data region 201 in the data structure 200, by which a signal "0" is written into a discharge flag area 203 and a discharge number area 204. When a termination of communication is detected, a signal "1" is written into a communication termination flag area 202; otherwise a signal "0" is written, which transmits the data to the communication signal control module 21.

C-4. Discharge Request Transmission Processing

Since a discharge request transmission processing is a function that can be executed in several processing units mentioned later, the processing is described here together.

Figure 11:
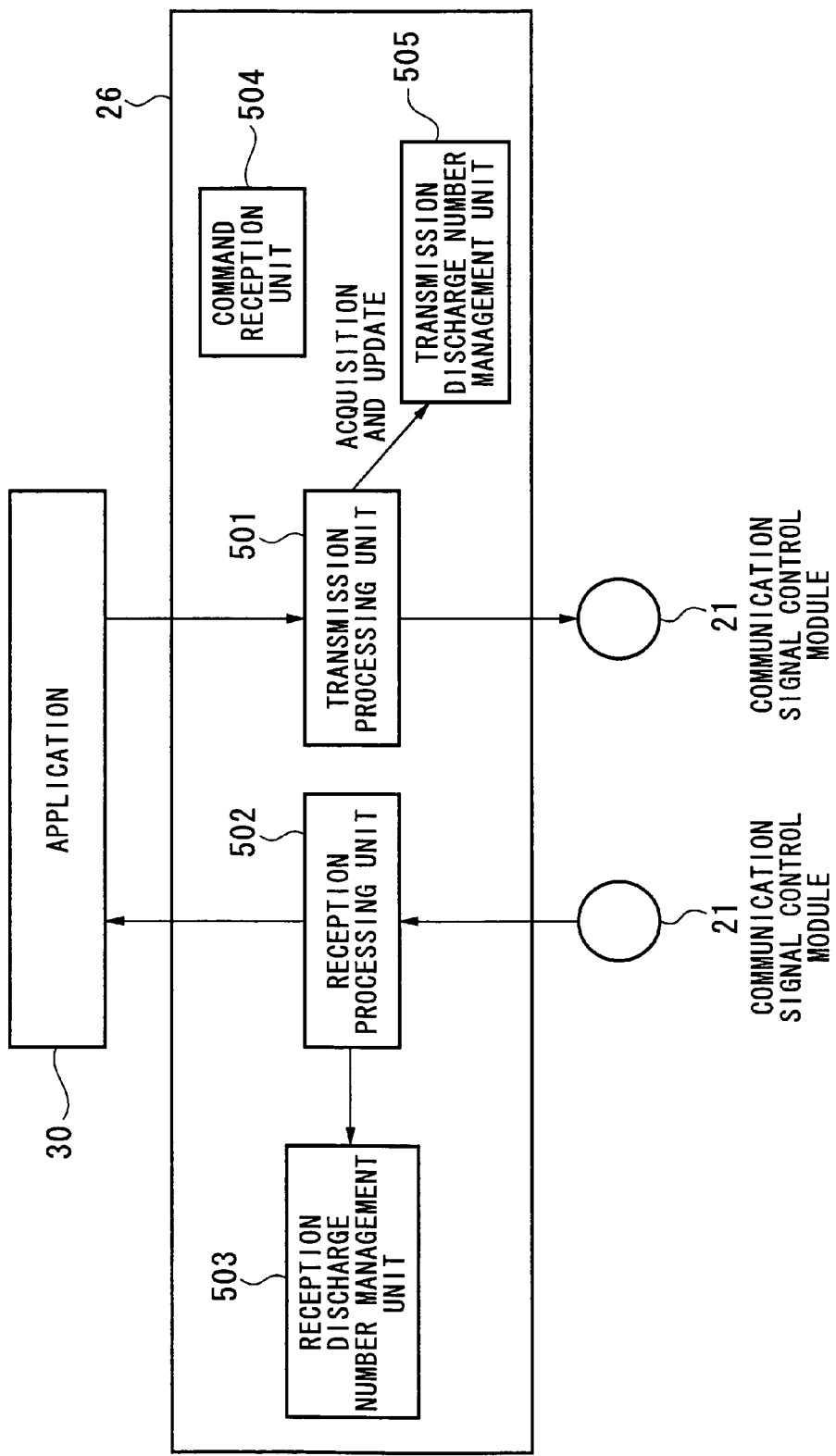
FIG. 11 is a block diagram showing a structure of an application interface unit 26.

Processing units that can perform the discharge request transmission processing are the application interface unit 26, a reception frame processing unit 700 (described later), a reception counter processing unit 900, and the reception delimiter processing unit 940. The application interface unit 26 is shown in FIG. 11.

The procedure of the discharge request transmission processing will be explained below.

(S1) The data structure 200 is made. The numerical values written in a transmission discharge number management unit 505 (shown in FIG. 11) are written into the discharge number region 204 in the data structure 200, and a signal "1" is written into the discharge flag region 203.

(S2) The data structure 200 is transferred to the communication signal control module 21 that is connected thereto.

(S3) Later, the numerical values written in a transmission discharge number management unit 505 (shown in FIG. 11) are replaced by a larger number by "1."

(S4) The numerical values written in by the procedure S1 are returned to a requesting unit.

C-5. Waiting Command

A waiting command is a function that some processing units described later can execute, the waiting command is described together here. The processing units for carrying out the waiting command are the application interface unit 26, a transmission frame processing unit 600 (described later), a transmission counter processing unit 800 (described later), and a transmission delimiter processing unit 920 (described later).

Figure 12:
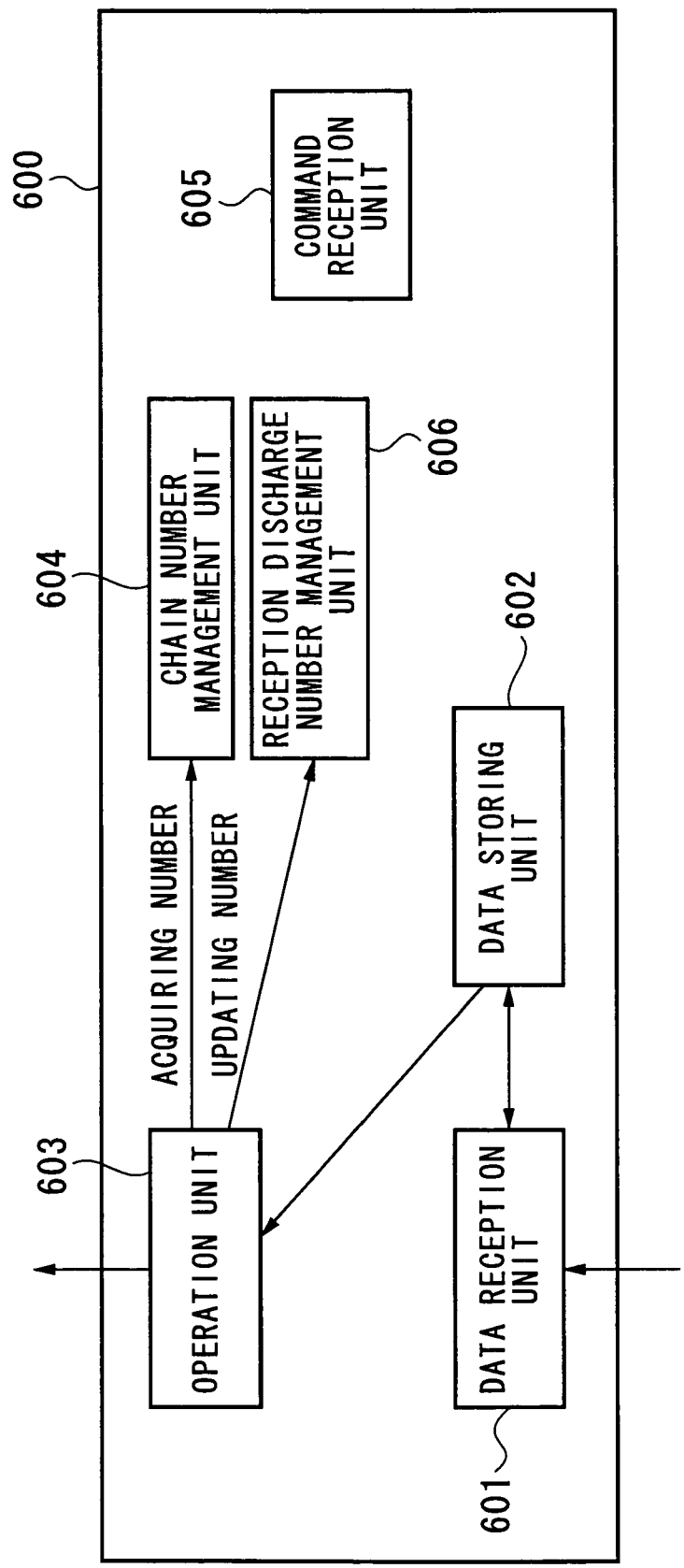
FIG. 12 is a block diagram showing a structure of a transmission frame processing unit 600.

FIG. 12 is a block diagram showing a structure of the transmission frame processing unit 600. The waiting command includes one integer value, which is transferred to a command reception unit 605 as shown in FIG. 12. When the command reception unit 605 receives the waiting command, till a value held by a reception discharge number management unit 606 as shown in FIG. 12 becomes equal with the parameter, no response to the "waiting command" is returned. However, by returning a response of the waiting command, an "arrival notice" can be carried out.

This means that the processing unit has performed the processing of "the data structure in which the same value as the one designated by the integer value parameter is written into a discharge number region C-6. Application Interface Unit When the application interface unit 26 receives data from the communication application 30, a signal processing unit 501 shown in FIG. 11 processes the data. The signal processing unit 501 assigns the communication data region 201 in the data structure 200, and writes a signal "0" into the communication termination flag region 202, the discharge flag region 203, and the discharge number region 204, respectively, which are transferred to the communication signal control module 21. When the termination of the communication from the application, the data structure 200 is formed in which the signal "1" is written into the communication termination flag region 202 in the transmission processing unit 501, which is transferred to the communication signal control module 21.

In contrast, when the application interface unit 26 receives the data structure 200 from the communication signal control module 21, the process is conducted in a reception processing unit 502 shown in FIG. 11, which conveys to the application 30 the data of the communication data region 201 in the data structure 200. When the discharge flag region 203 in the data structure 200 is the signal "1", a discharge number is acquired to write into the reception discharge number management unit 503. When the data structure 200 is received where a signal "1" is written in the communication termination flag region 202, a communication termination is notified of the application 30.

A command reception unit 504 of the application interface unit 26 receives a "stop and discharge execution request", a "processing resumption request", and a "waiting command". When the command reception unit 504 receives the "stop and discharge execution request", the transmission processing unit 501 suspends the movement mentioned above till the reception unit receives the processing resumption request.

Then, the discharge request transmission processing mentioned above is performed.

When the "processing resumption request" is received, the transmission processing unit 501, which has been suspended based on the above suspension and discharge execution request, begins to resume the movement thereof.

When the "waiting command" has been received, the processing of the "waiting command is carried out.

D. Third Embodiment

A third embodiment in accordance with the invention will be described below.

Figure 13:
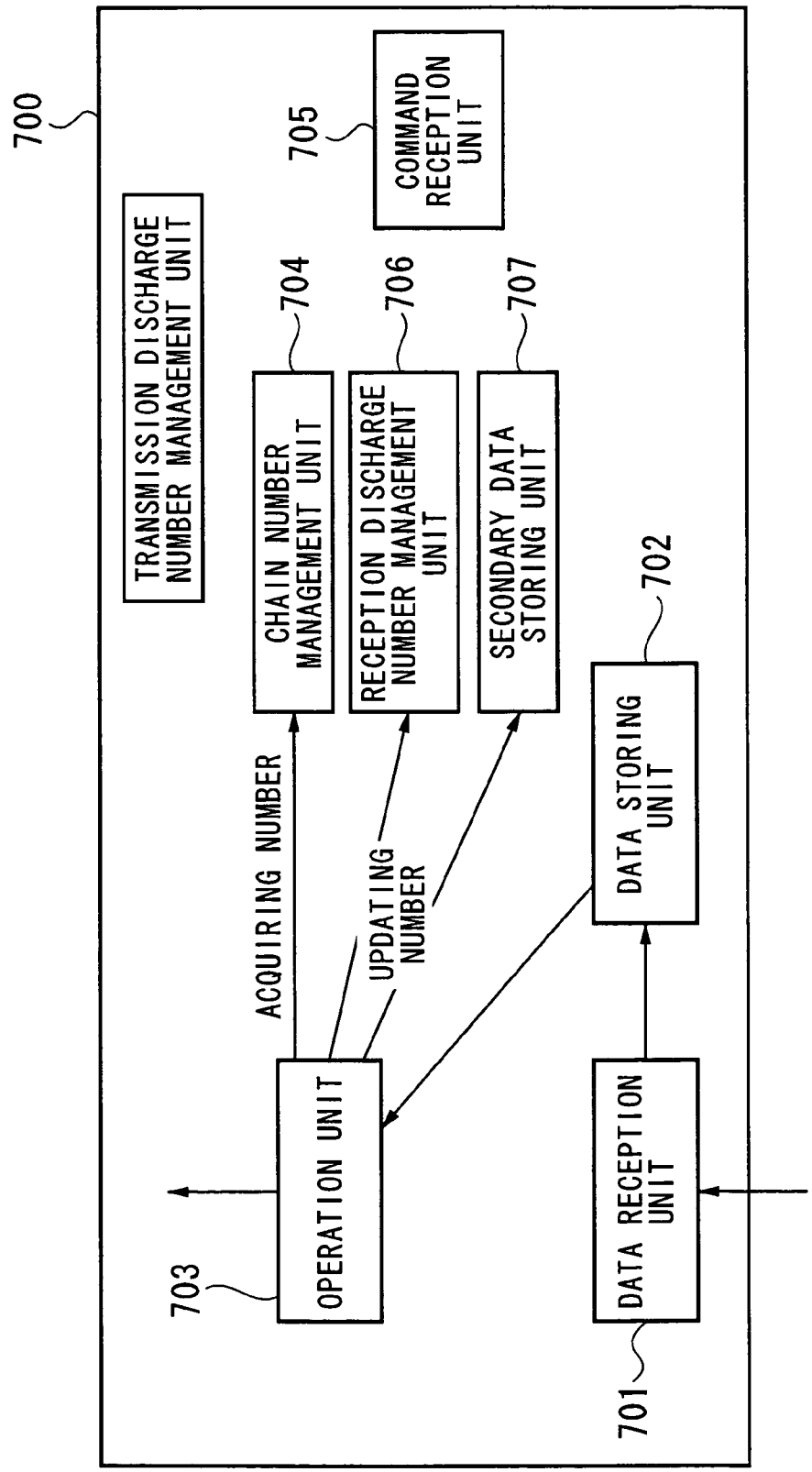
FIG. 13 is a block diagram showing a structure of a reception frame processing unit 700.

In the third embodiment, the transmission frame processing unit 600 shown in FIG. 12, at the terminal on the flow transmission side, is placed in front of the communication network interface unit 27 with regard to the data flow, while the reception frame processing unit 700 shown in FIG. 13, at the terminal on the flow reception side, is inserted before the communication network interface unit 27. Due to this, between the application interface unit 26 at the terminal on the transmission side and the transmission frame processing unit 600, and between the application interface unit 26 at the terminal on the reception side and the reception frame processing unit 700, a new communication signal control module can be added.

In FIGS. 25-52, in order to make room for maximum insertion, the transmission frame processing unit 600 and the reception frame processing unit 700 are inserted at the lowest stage. The insertion of the transmission frame processing unit 600 and the reception frame processing unit 700 are usually inserted one by one, but even if two or more are inserted, they function properly.

D-1. Explanation of Chain Number

A chain number is something like a type of structure of a transmission side chain and is the one that is increased one by one every time the structure of a transmission side chain changes. The number is managed by the chain number management unit 604 in the transmission frame processing unit 600. When the transmission frame processing unit 600 is placed, a signal "0" is applied.

D-2. Explanation of Transmission Frame Processing Unit 600

Figure 14:
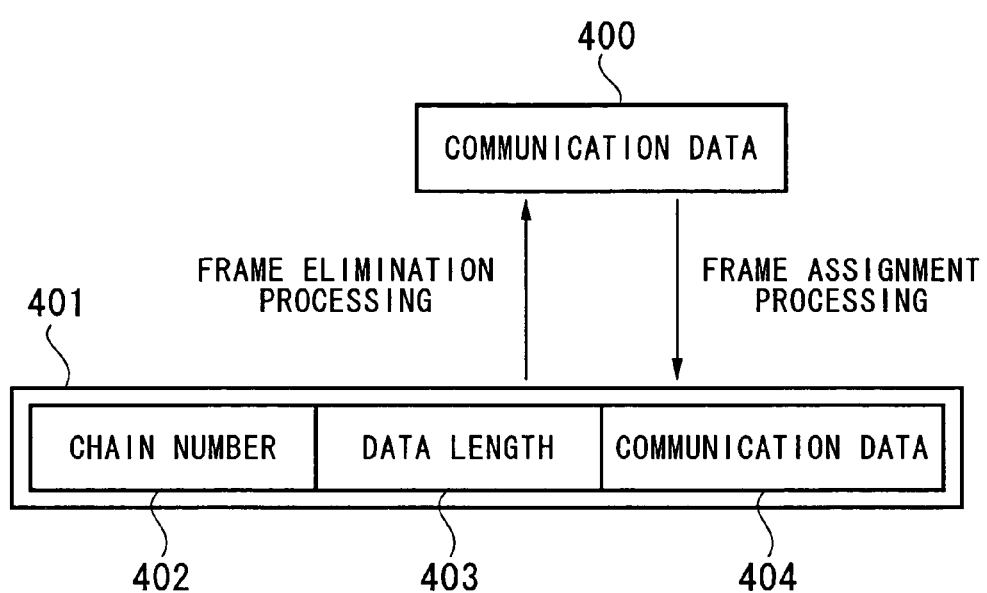
FIG. 14 is a conceptual diagram explaining a frame assignment processing.

The transmission frame processing unit 600 is one kind of the communication signal control module 21, and in operation unit 103, performs a frame application processing shown in FIG. 14, having a structure shown in FIG. 12. The transmission frame processing unit 600 receives the data structure 200 from a data storing unit 602, and assigns a communication data 400 included therein to communication data 404 in a framed communication data 401. The length of the communication data 404 is written into a data length 403. An operation unit 603 acquires a chain number held by the chain number control unit 604 and writes in the chain number 402.

In this way, the framed communication data is formed, which is set at the data structure 200 to be passed to the next processing unit. When the operation unit 603 processes the discharge flag region 203 having a signal "1" in the data structure 200, the number of the discharge number region 204 is notified to the reception discharge number management unit 606 and has a function for holding a latest discharge number.

The command reception unit 605 receives "waiting commands." When having received a "waiting command," the command reception unit 605 processes the "waiting command."

D-3. Reception Frame Processing Unit

FIG. 13 is a block diagram showing a structure of a reception frame processing unit 700.

FIG. 14 is a conceptual diagram explaining a frame assignment processing.

The reception frame processing unit 700 having a structure shown in FIG. 13 is one kind of the communication signal control module 21, and in the operation unit 103, performs a frame elimination processing shown in FIG. 14. The reception frame processing unit 700 receives the data structure 200 from a data storing unit 702 to assign the communication data 404 included therein to the portion of the communication data 404 of the framed communication data 401. The length of the communication data 404 is written into the data length 403. An operation unit 703 obtains a chain number held in a chain number management unit 704 to write into the chain number 402. In this way, the framed communication data is formed, and after being set in the data structure 200, is conveyed to a next processing unit.

The operation unit 703 carries out the discharge flag area having a signal "1" at the data structure 200, and notifies a reception discharge number management unit 706 of the number of the discharge number region 204 to have a function for holding the latest discharge number.

When the value of the chain number 402 in the course of the frame elimination processing is different from that of the present chain number, the operation unit 703 suspends the processing thereof to acquire a function for executing discharge.

A command reception unit 705 receives "waiting commands", and "process resumption requests." After having received a "waiting command," the command reception unit 705 performs the process of the "waiting command." After having received a "process resumption request," the command reception unit 705 resumes the operation of the operation unit 703.

D-4. Data Boundary Detection of TCP and Secondary Data Storing Unit

There is a protocol such as TCP/IP in which order of communication data is guaranteed without packet loss, but a boundary an application has written in is lost. Where the protocol is used in a lower layer, it is not guaranteed that all of the framed communication data 401 shown in FIG. 14 will be sent as one unit to the receiving side, and the front portion of the framed communication data 401 may arrive. Under the circumstances since a frame elimination processing cannot be performed, the operation unit 703 temporarily stores data into a secondary data storing unit 707 in the reception frame processing unit 700, and after all of the framed communication data 401 has arrived, executes a frame elimination processing.

D-5 Processing in a Case where a Packet that Should Have Been Processed Before Change in Chain Structure has Arrived after Change in Chain Structure Caused by Order Reversal of UDP Where a protocol, which has packet loss such as UDP/IP and does not guarantee order of packets arrival, is used in a lower layer, there is a possibility that a packet that should have been processed before change in chain structure has arrived after change in chain structure. The occurrence of this phenomenon can be detected by comparing a chain number in the above frame with the chain number 402 the chain number management unit 704 of the reception frame processing unit 700 has received last.

In a case where a reception is made in a normal packet order, the number of the chain number 402 allocated to the frame received is the same as or greater than that which is controlled by the chain number management unit 704 of the reception frame processing unit 700. When this condition is not satisfied, it is understood that the order of the packets is changed.

Since the chain number 402 of the frame consists of limited bit number (n), the chain number 402 returns to a signal "0" after having reached the maximum values ($m=2^n-1$). Considering this point, threshold value k is introduced. Even if the chain number 402 applied to a frame received is smaller than a number managed by the chain number management unit 704 of the reception frame processing unit 700, when the chain number 402 is smaller by at least k, it is decided that a normal arrival order is kept, which can cope with the overflow of the digits of the chain number 402.

When the phenomenon of packet order reversal occurs before or after on the timing of a change in chain structure, the packets received at the reception frame processing unit 700 are discarded. Because an application of UDP/IP is described on the assumption that packets in a network are discarded, the discarding does not affect the operation of the application. It is only the reception frame processing unit 700 that is related to detection and processing of UDP order reversal, and no other parts are related.

D-6. Changeover Procedure

D-6-1. Module Insertion

Figure 15:
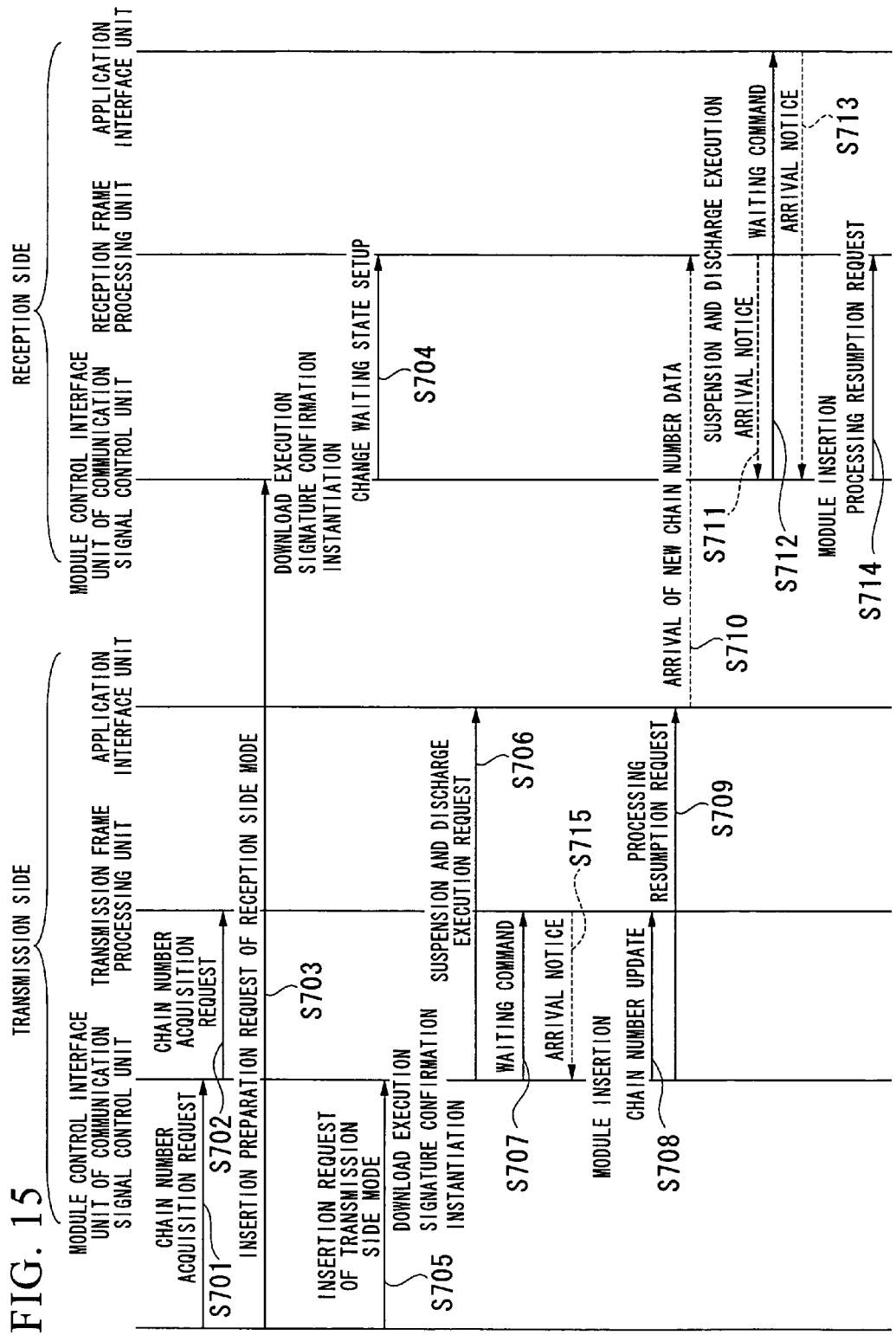
FIG. 15 is a sequential diagram showing procedures for inserting modules of a third embodiment in accordance with the invention.

FIG. 15 is a sequential diagram showing procedures for inserting modules.

FIGS. 25-52 are conceptual diagrams for illustrating functional examples of a module insertion.

Figure 53:
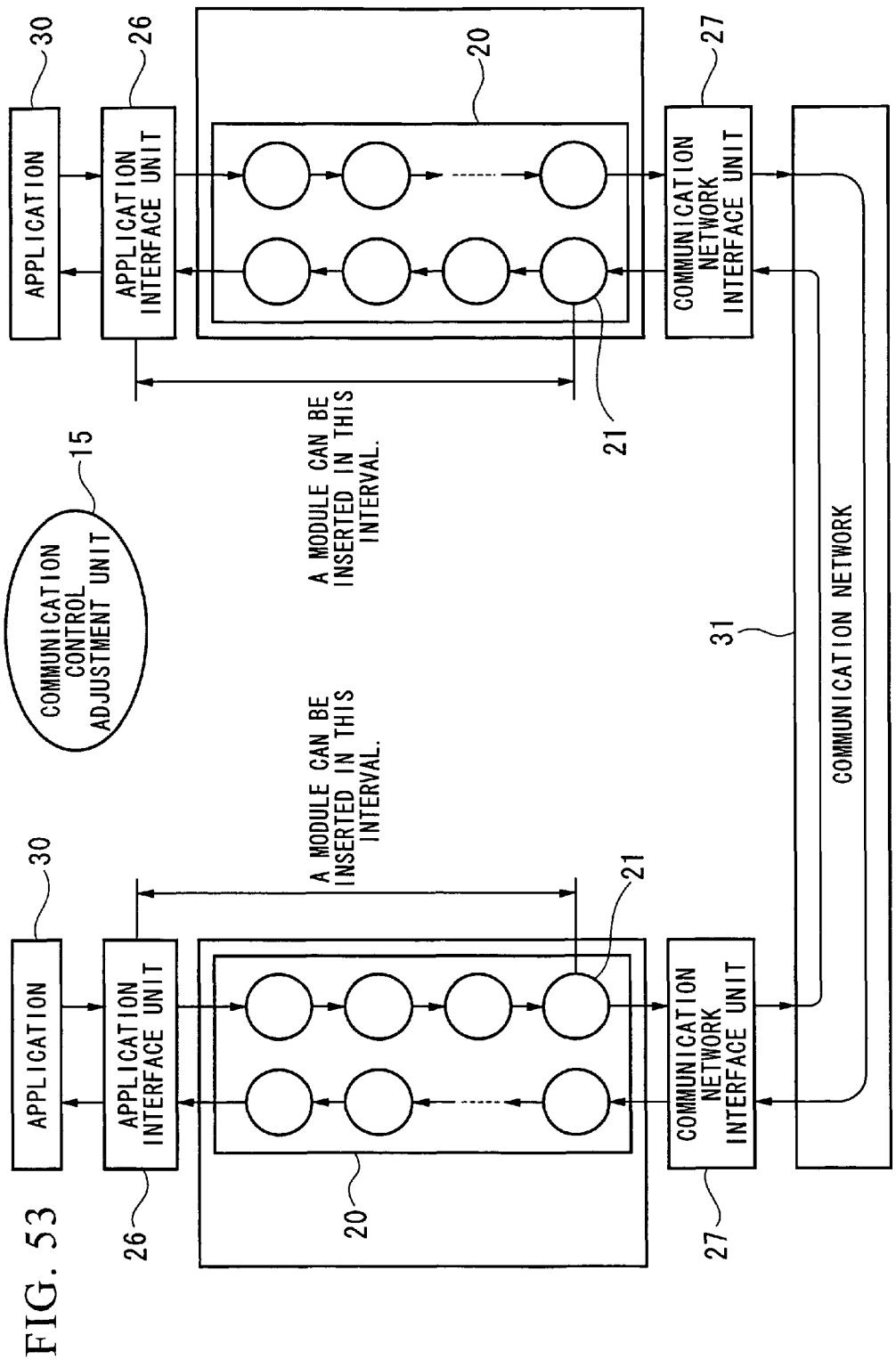
FIG. 53 is a conceptual diagram for illustrating a place (a first example) in which a module can be inserted in accordance with a framing method.

FIGS. 53 and 54 are conceptual diagrams for illustrating places (a first example and a second example) for inserting modules in accordance with a framing method.

Figure 25:
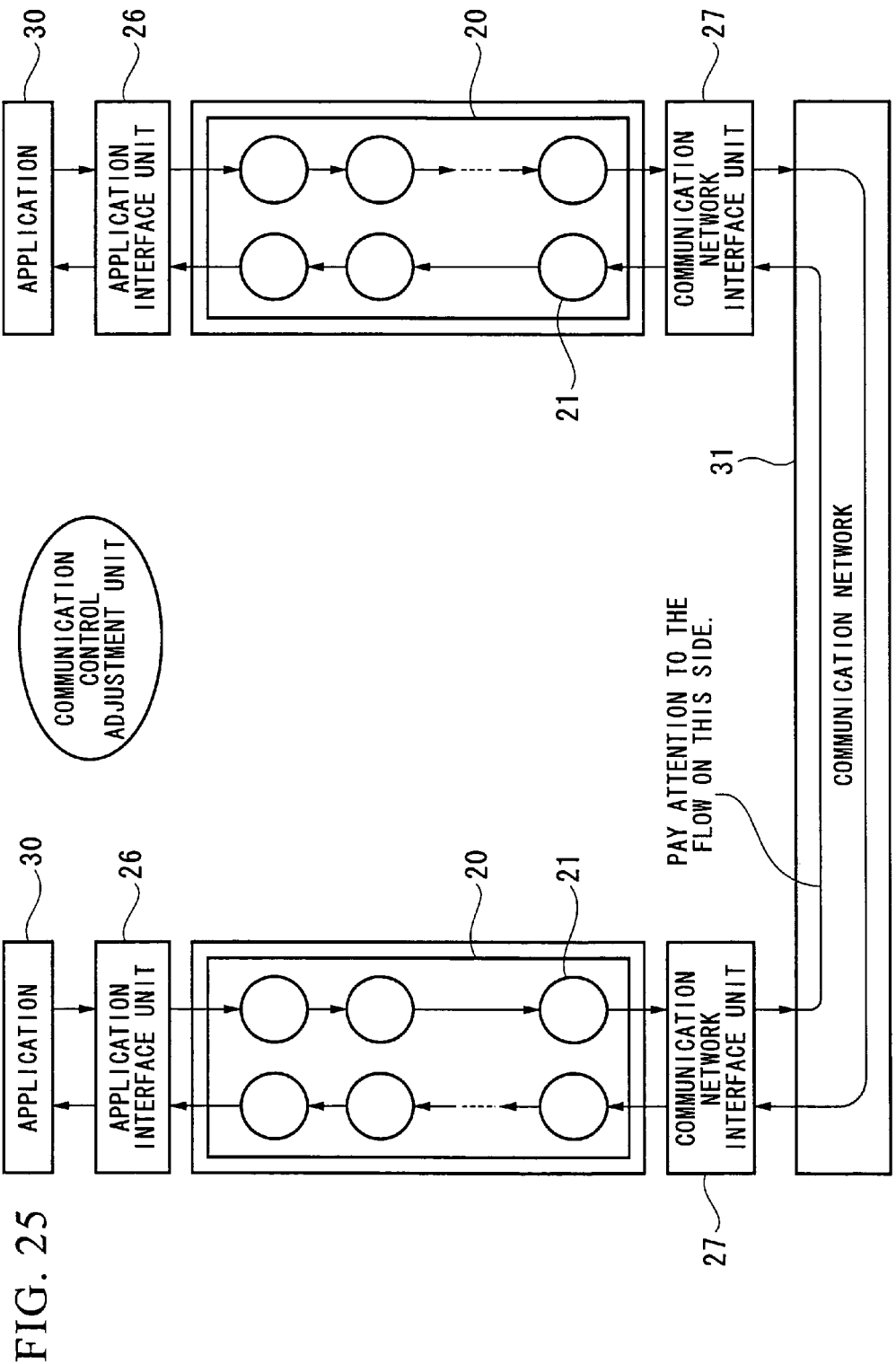
FIGS. 25-52 are conceptual diagrams for illustrating functional examples of a module insertion in accordance with a framing method.
Figure 26:
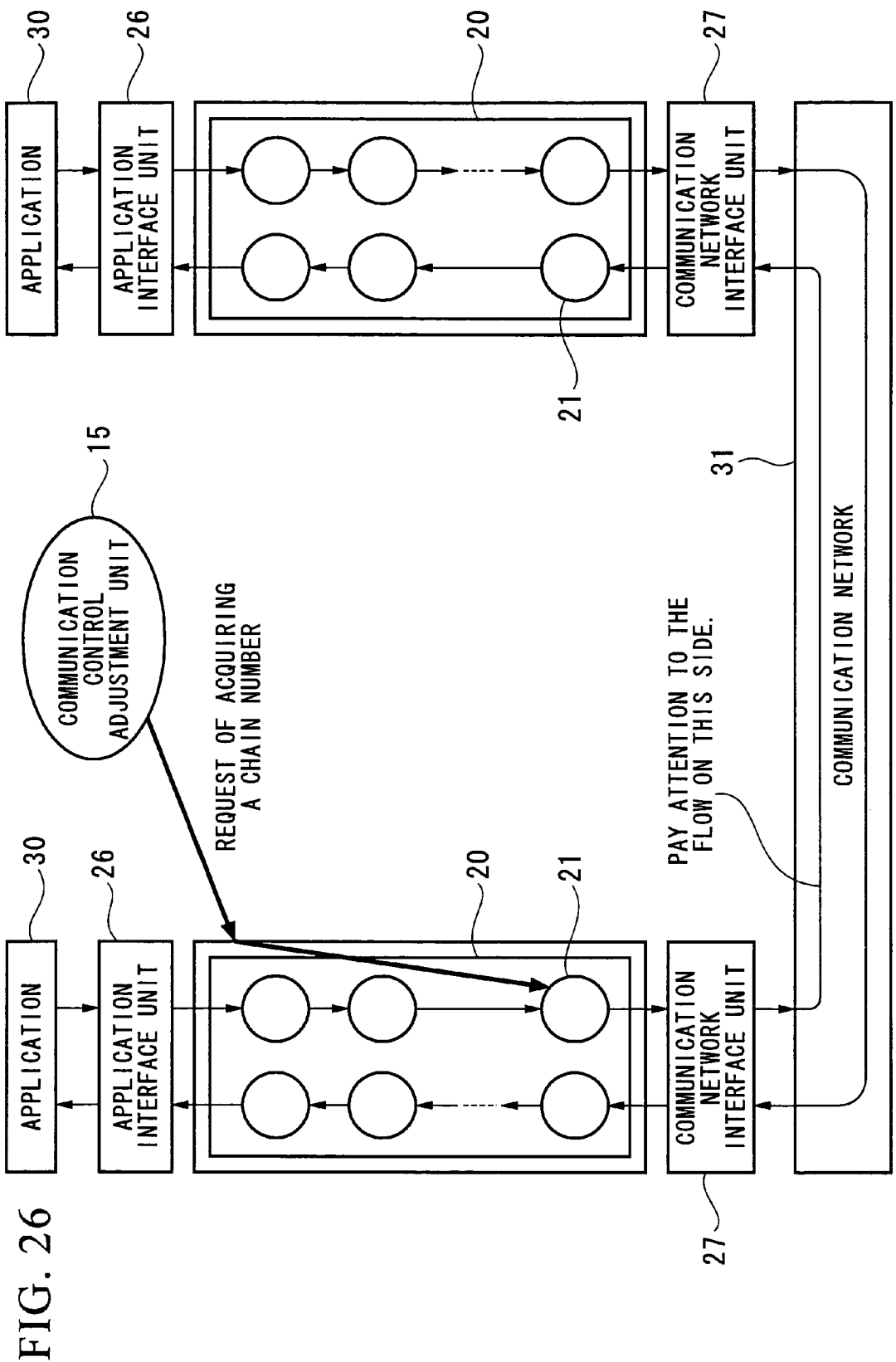

The communication control adjustment unit 15 delivers a request of acquiring a chain number (a chain number acquiring request) signal to the communication signal control unit 10 (refer to S 701, and FIGS. 25 and 26). When receiving the request, (the module control interface unit 25 of) the communication signal control unit 10 sends out the chain number acquiring request to the transmission frame processing unit 600 (refer to S 702 and FIG. 26).

The request is processed at the command reception unit 605 in the transmission frame processing unit 600 to return to the communication signal control unit 10 a number managed by the chain number management unit 604. The communication signal control unit 10 returns the number to the communication control adjustment unit 15.

Figure 27:
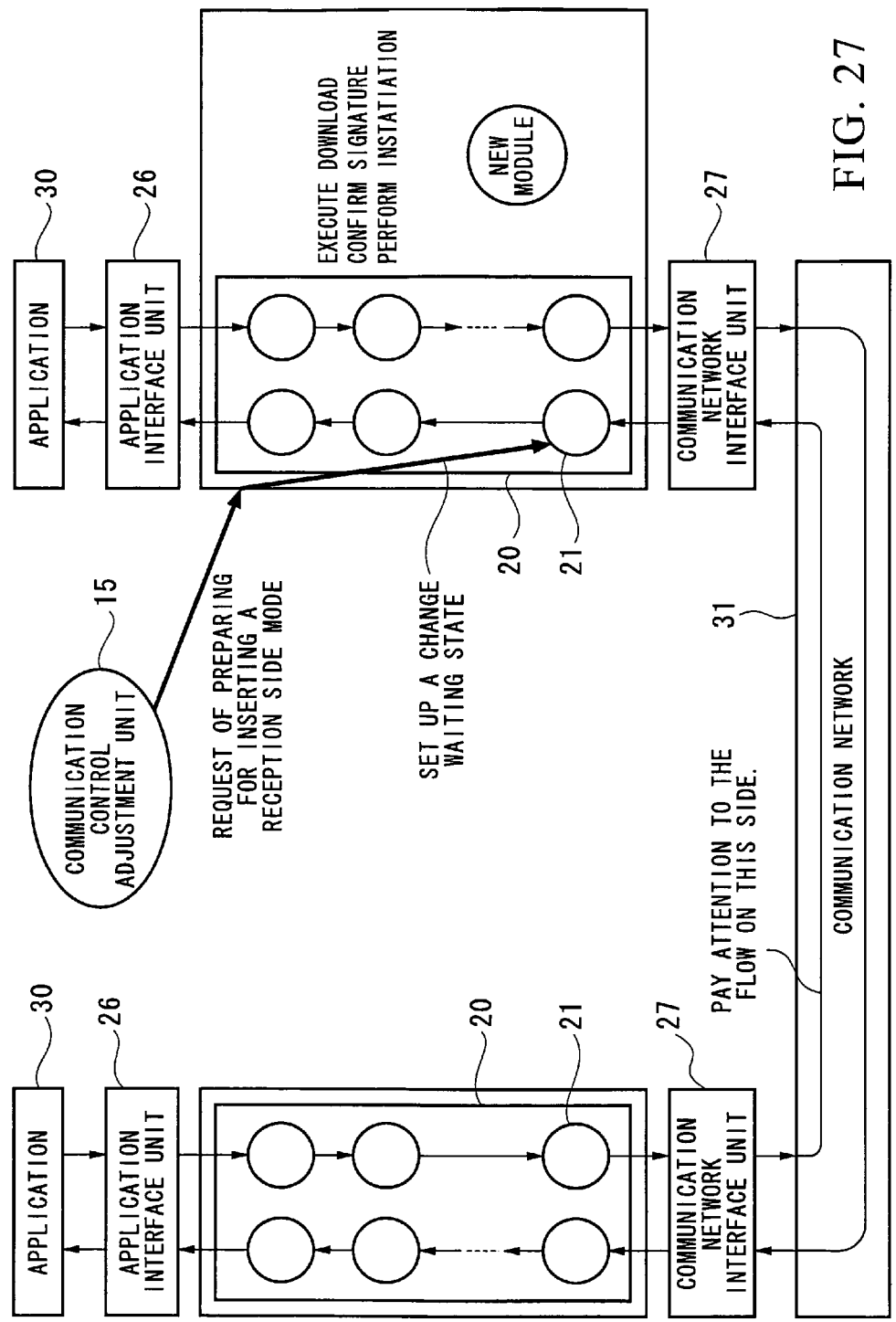

Next, the communication control adjustment unit 15 delivers "an insertion preparation request of transmission side mode" to (the module control interface unit 25 of) the communication signal control unit 10 (refer to S 703 and FIG. 27). The request includes a module identifier and at least one initial parameter. The initial parameter is used in modular instantiation and is for changing behaviors of the operation unit in the communication signal control module 21. The kinds of the initial parameters depend on the kind of the communication signal control module 21. Some communication signal control modules 21 do not have an initial parameter.

The module control interface unit 25 of the communication signal control unit 10, which has received the request on the receiving side, will do the next operation. At the communication signal control module download unit 24, modules are downloaded from the module server 32 via a network.

At the communication signal control module verification unit 60, the digital signature included in the module is verified to confirm safety. When safety cannot be confirmed, the processing is suspended (only when the digital signature is verified).

Furthermore, modular instantiation is performed to substantiate the communication signal control module 21 (procedure E).

The communication signal control unit 10 performs "a change waiting state setup" at the reception frame processing unit 700 (refer to S 704 and FIG. 27).

Figure 28:
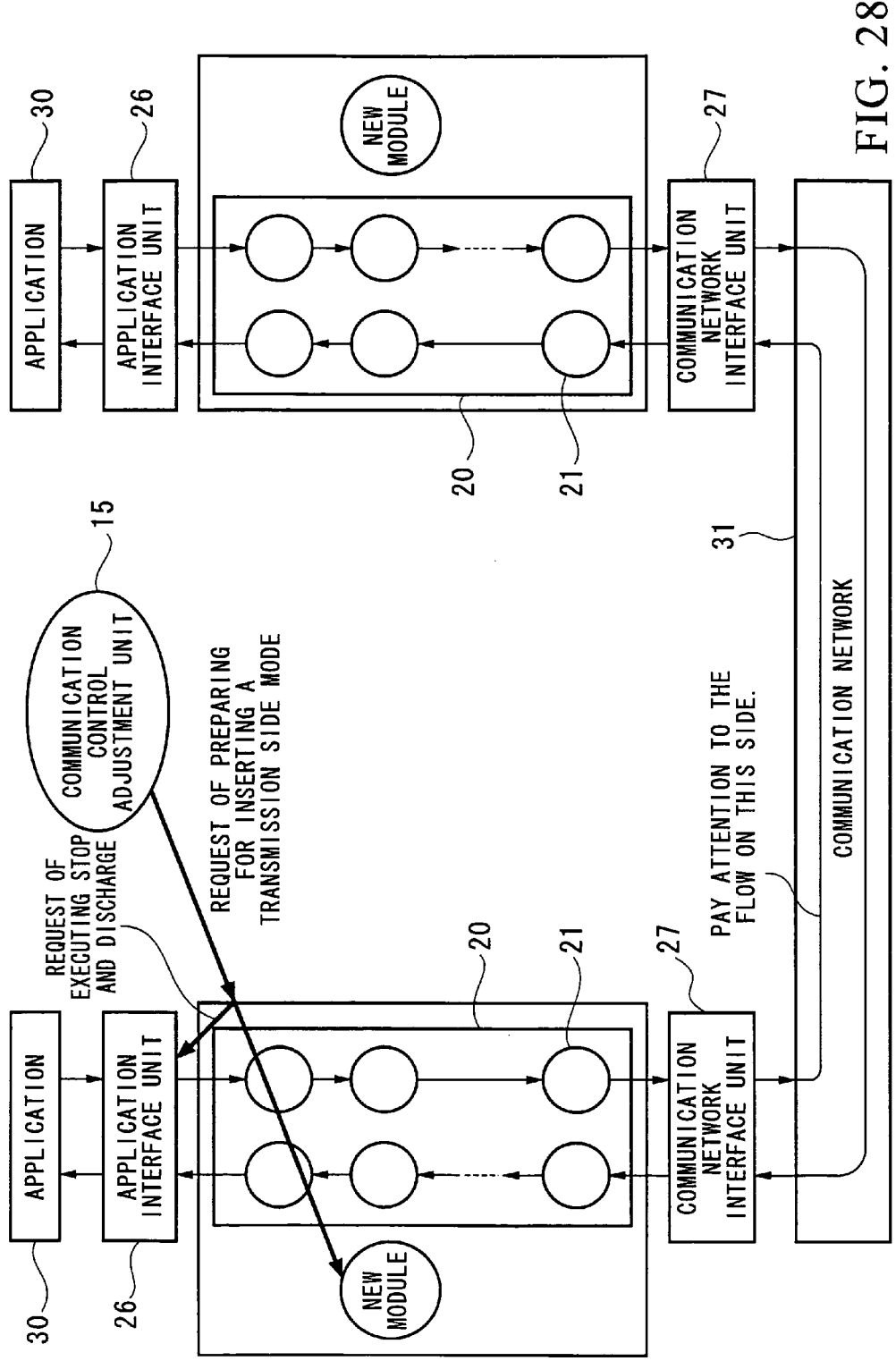

The communication control adjustment unit 15 sends out "the insertion request of reception side mode" to the communication signal control unit 10 (refer to S 705 and FIG. 28).

The module control interface unit 25 of the communication signal control unit 11 on the receiving side performs the next operation in response to the request. At the communication signal control module download unit 24, a module is downloaded from the modular server 32 via a network. Then, at the communication signal control module verification unit 60, the digital signature included in the module is verified to confirm safety. When safety cannot be confirmed, the processing is suspended (only in the second embodiment). Modular instantiation is performed to substantiate the communication signal control module 21 (procedure A).

Figure 29:
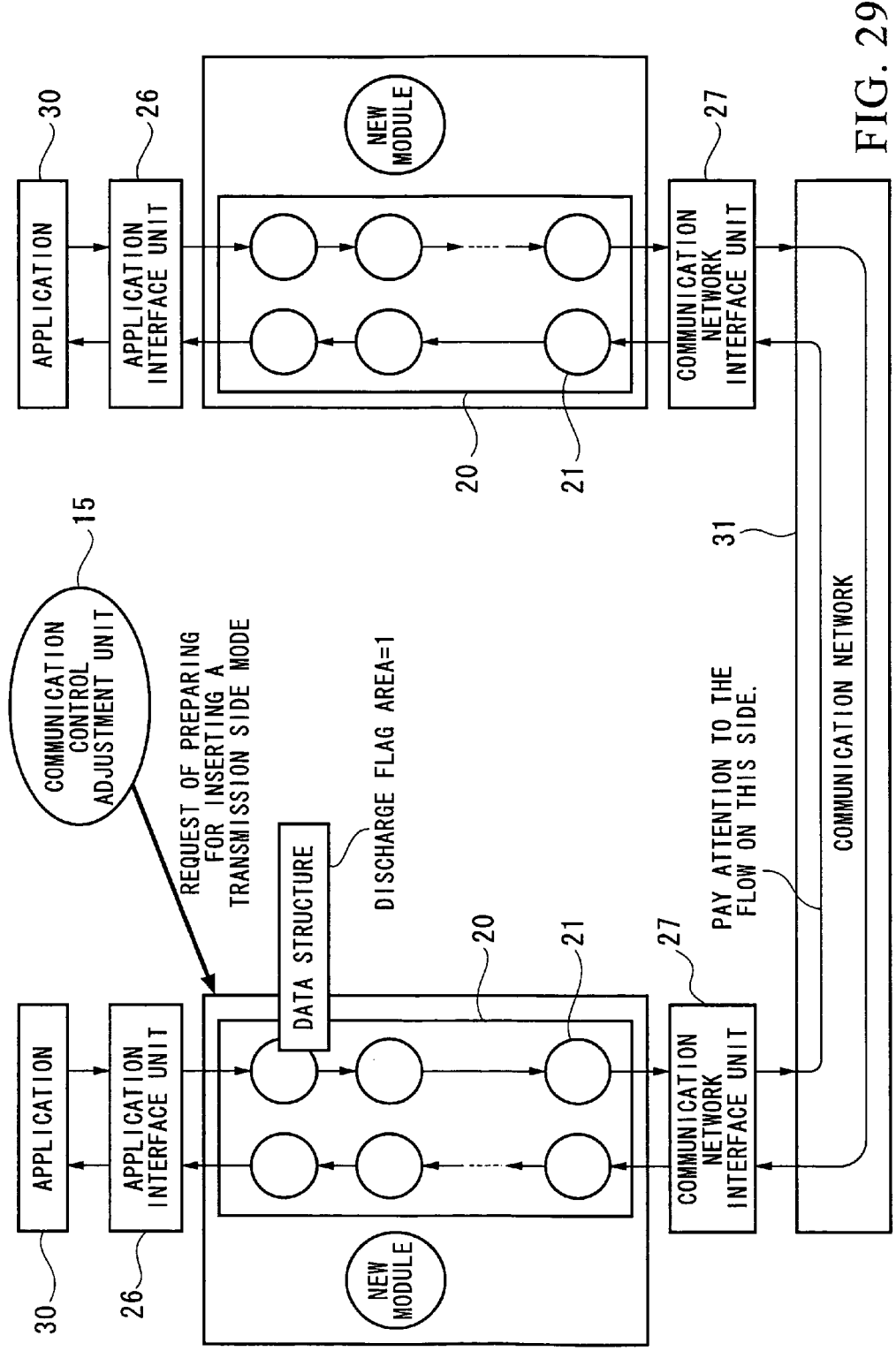
Figure 30:
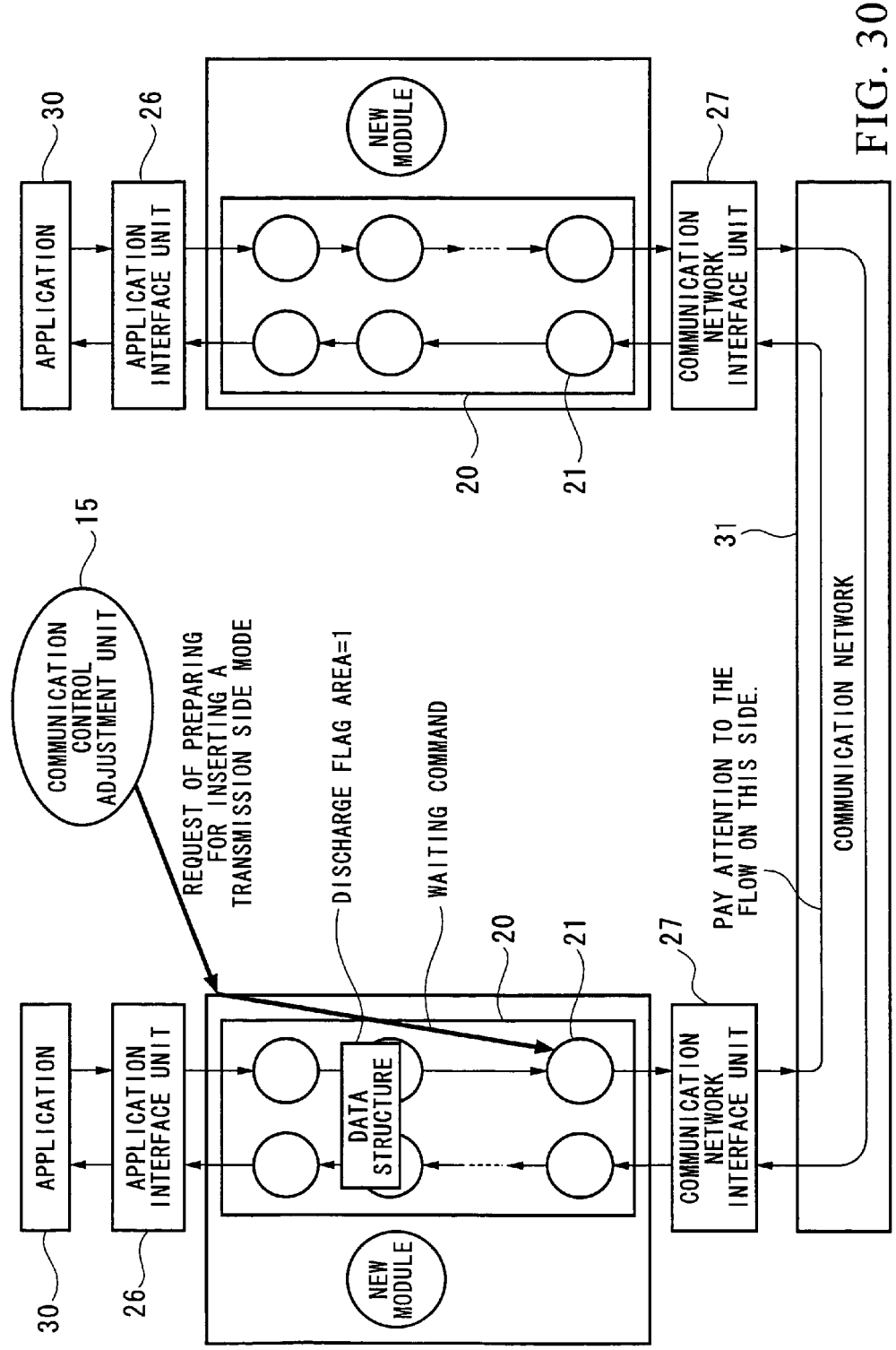
Figure 31:
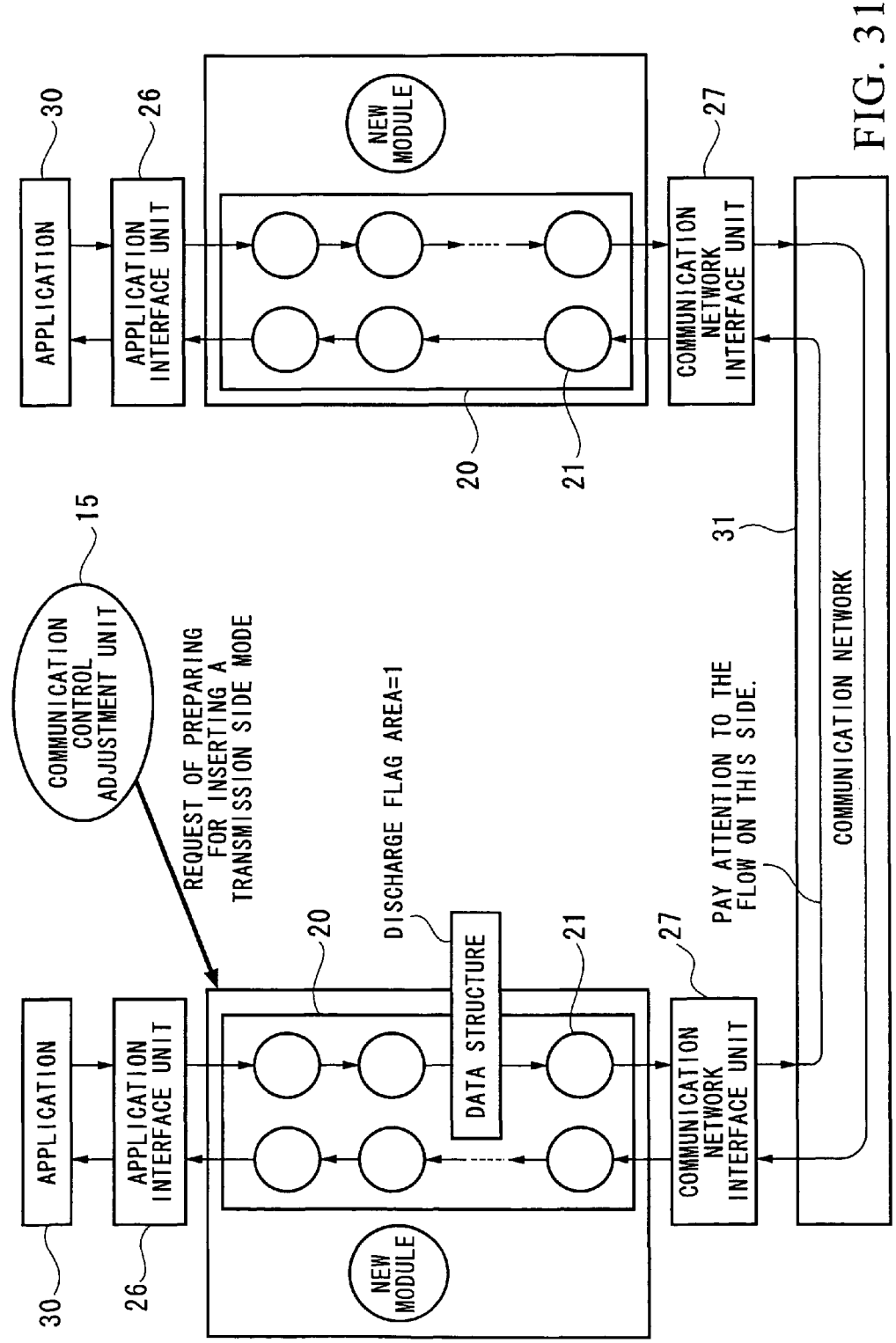

The communication signal control unit 10 delivers "a suspension and discharge execution request" to the application interface unit 26 (refer to S 706, and FIGS. 28 and 29). According to the request, the application interface unit 26 temporarily suspends the data processing (procedure B), and performs the aforementioned discharge request deliverance processing.

The communication signal control unit 10 sends out "a waiting command" to the transmission frame processing unit 600 (refer to S 707, and FIGS. 30 and 31) to transfer "a value of the discharge number management unit" returned from the application interface unit 26.

Figure 32:
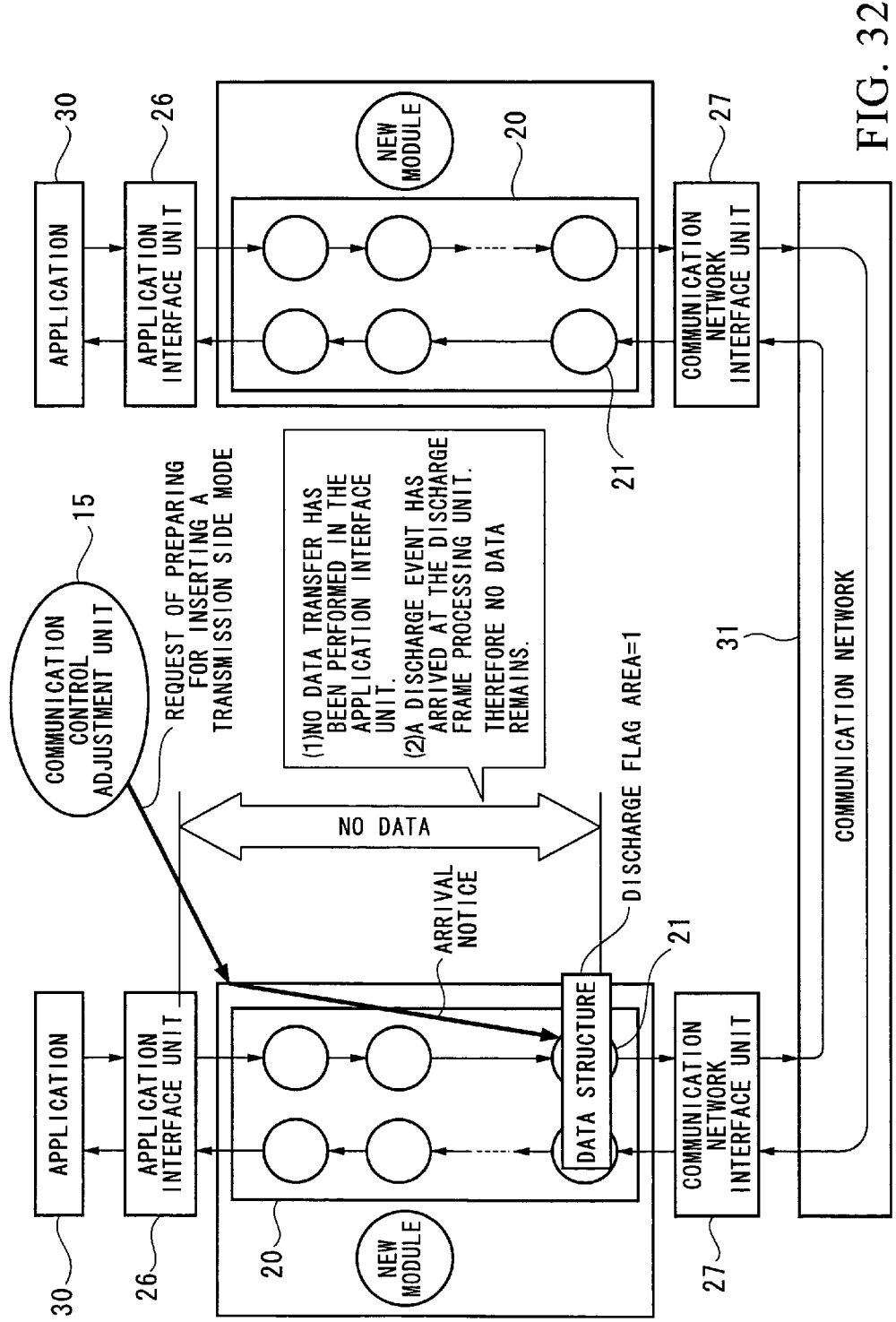

The transmission frame processing unit 600, in processing the data structure 200 having the reception discharge number management unit 606 storing the delivered value thereof, notifies a timing to the communication signal control unit 10 (refer to S 715 and FIG. 32). It is guaranteed that at this stage, there exists no data structure 200 being processed between the application interface unit 26 and the transmission frame processing unit 600.

Figure 33:
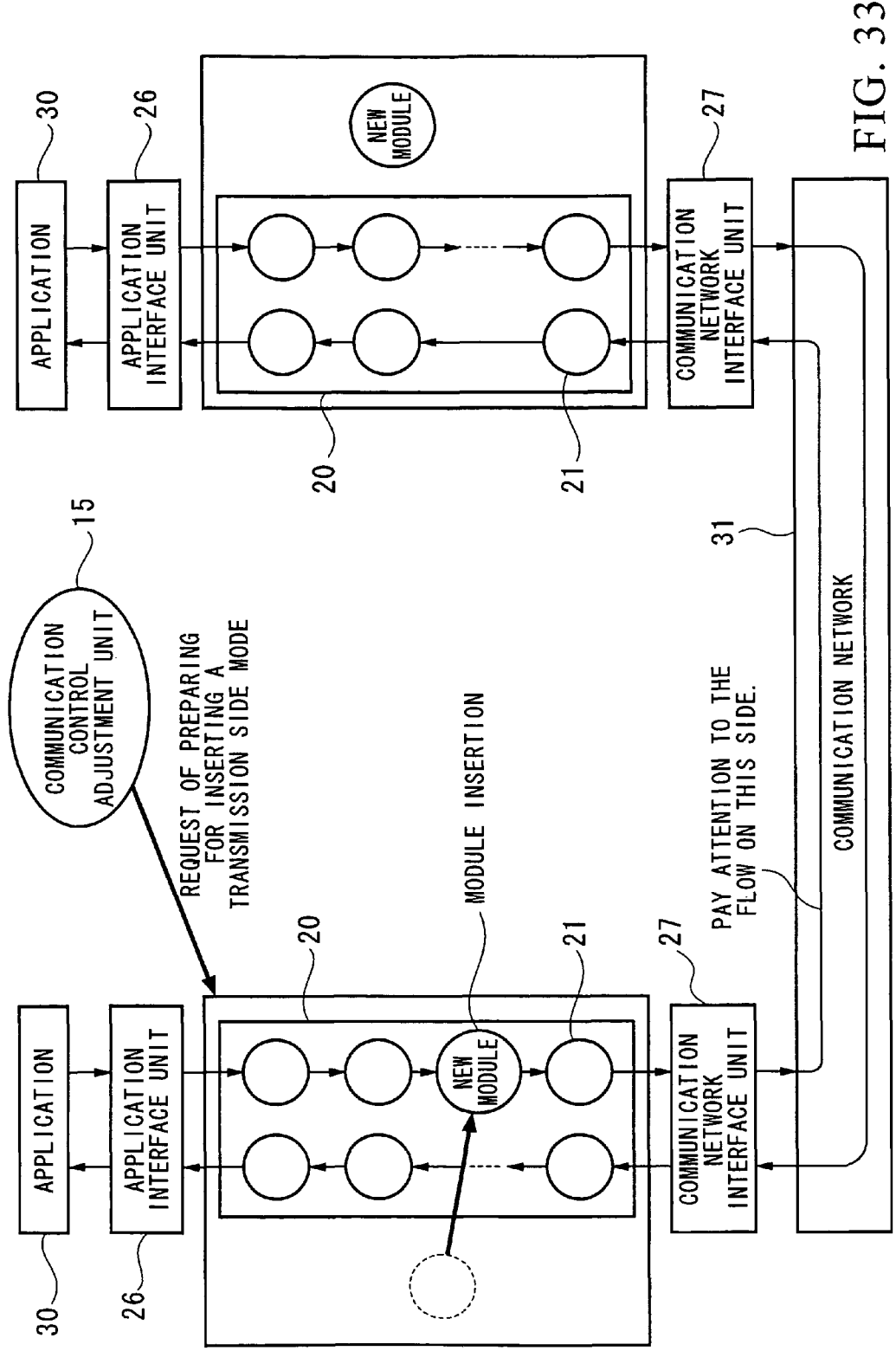
Figure 34:
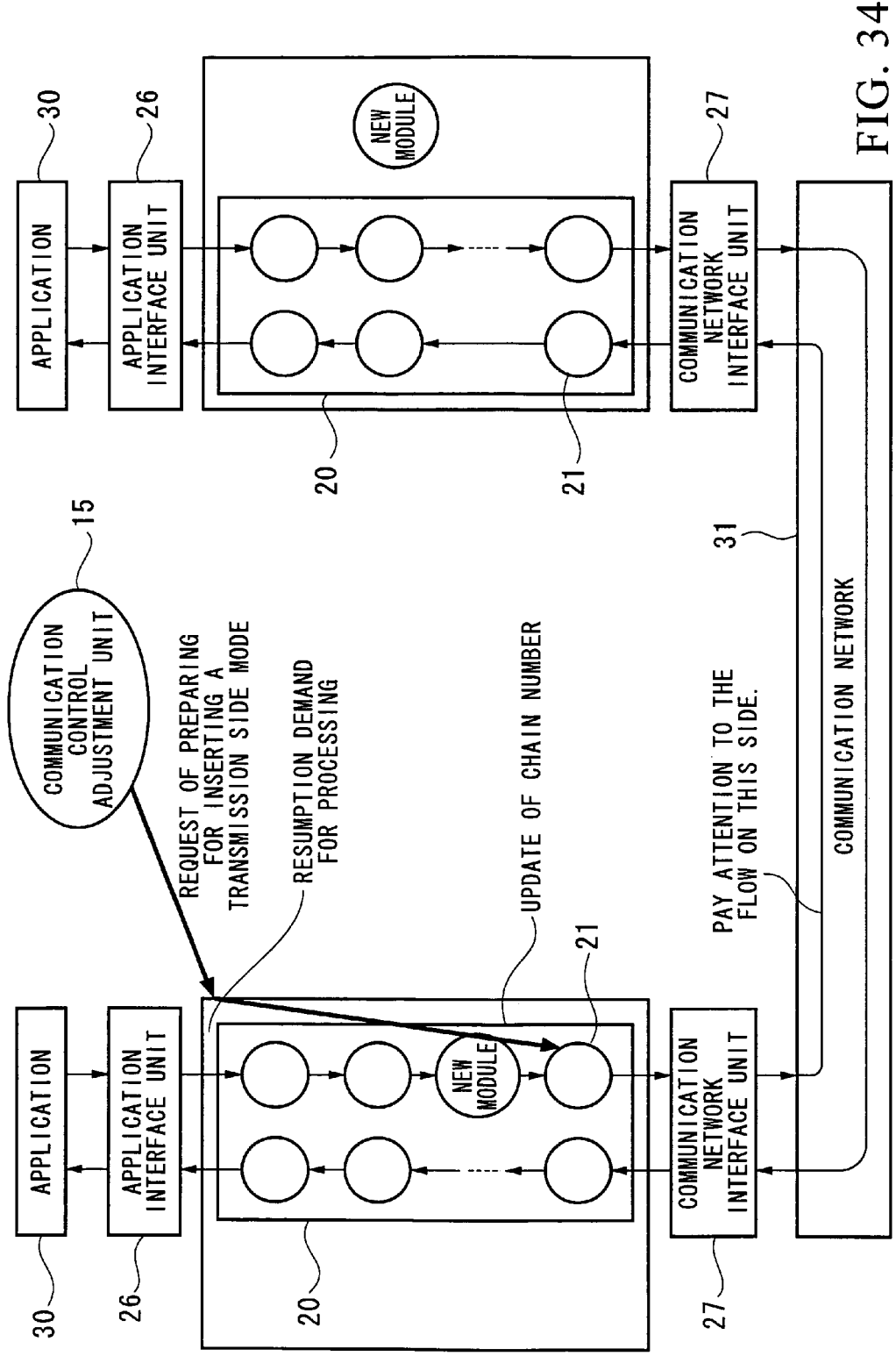

The communication signal control unit 10 incorporates into a sequence of the transmission module the communication signal control module 21 made in the above procedure A (refer to FIG. 33). Since it is guaranteed that there is no data structure 200 under process between the application interface unit 26 and the transmission frame processing unit 600, the communication signal control module 21 on the transmitting side in no way performs the data processing during recombination.

In addition, the communication signal control unit 10 requires the transmission frame processing unit 600 to increase the chain number by "1" (refer to S 708 and FIG. 34), which is done to show on the data that the chain structure on the transmission side has changed.

One of the following procedures can also be executed. By executing the procedure, in an application that sends data once in a while, a procedure for inserting a module can be promptly completed.

Where data has not arrived at the transmission frame processing unit 600 at a designated time, the transmission frame processing unit 600 performs frame assignment processing to the 0 byte data to transfer to the communication signal control module 21.

The transmission frame processing unit 600 performs frame assignment processing to the 0 byte data immediately, and passes the data to the communication signal control module 21.

Figure 35:
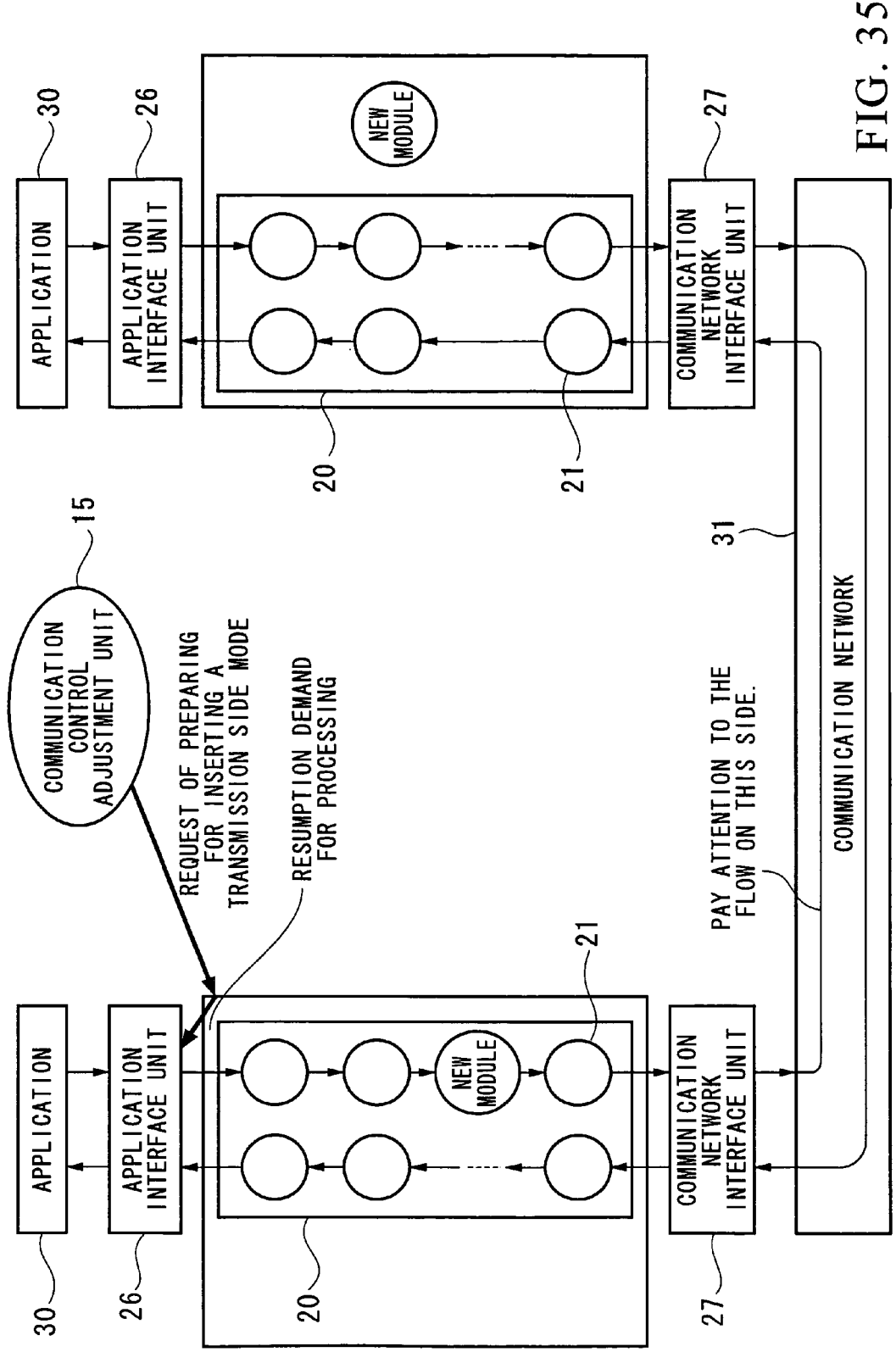
Figure 36:
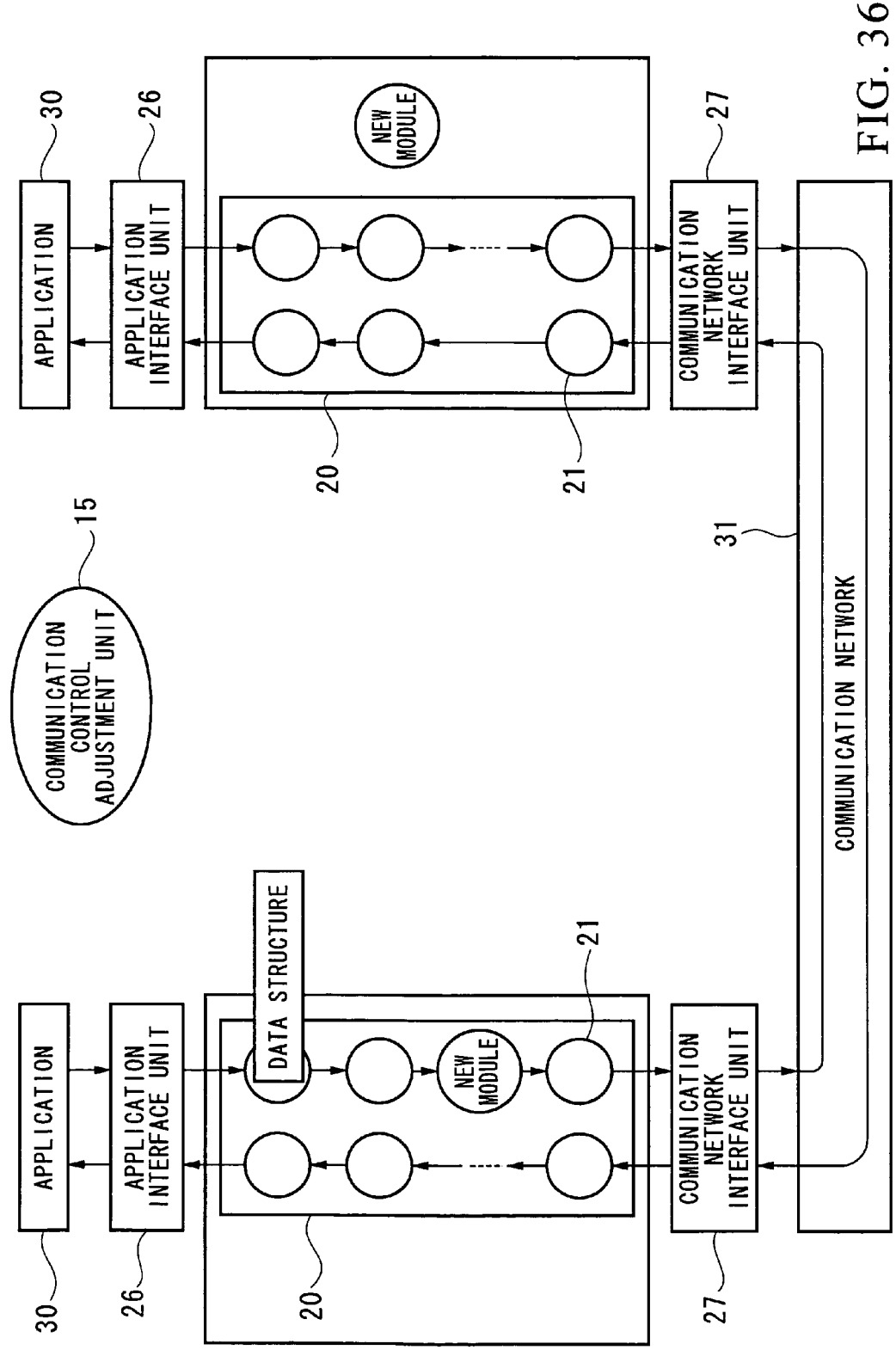
Figure 37:
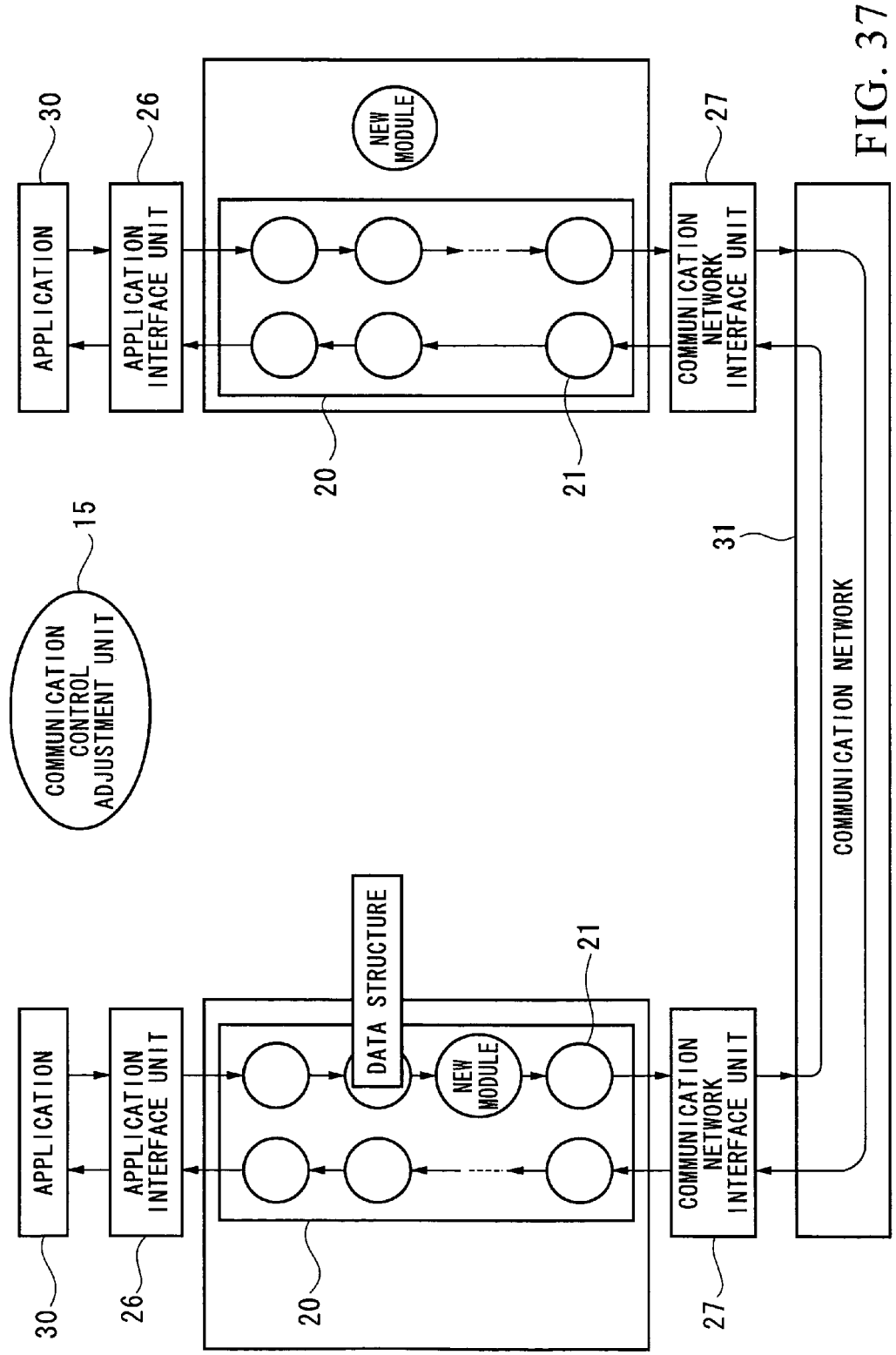
Figure 38:
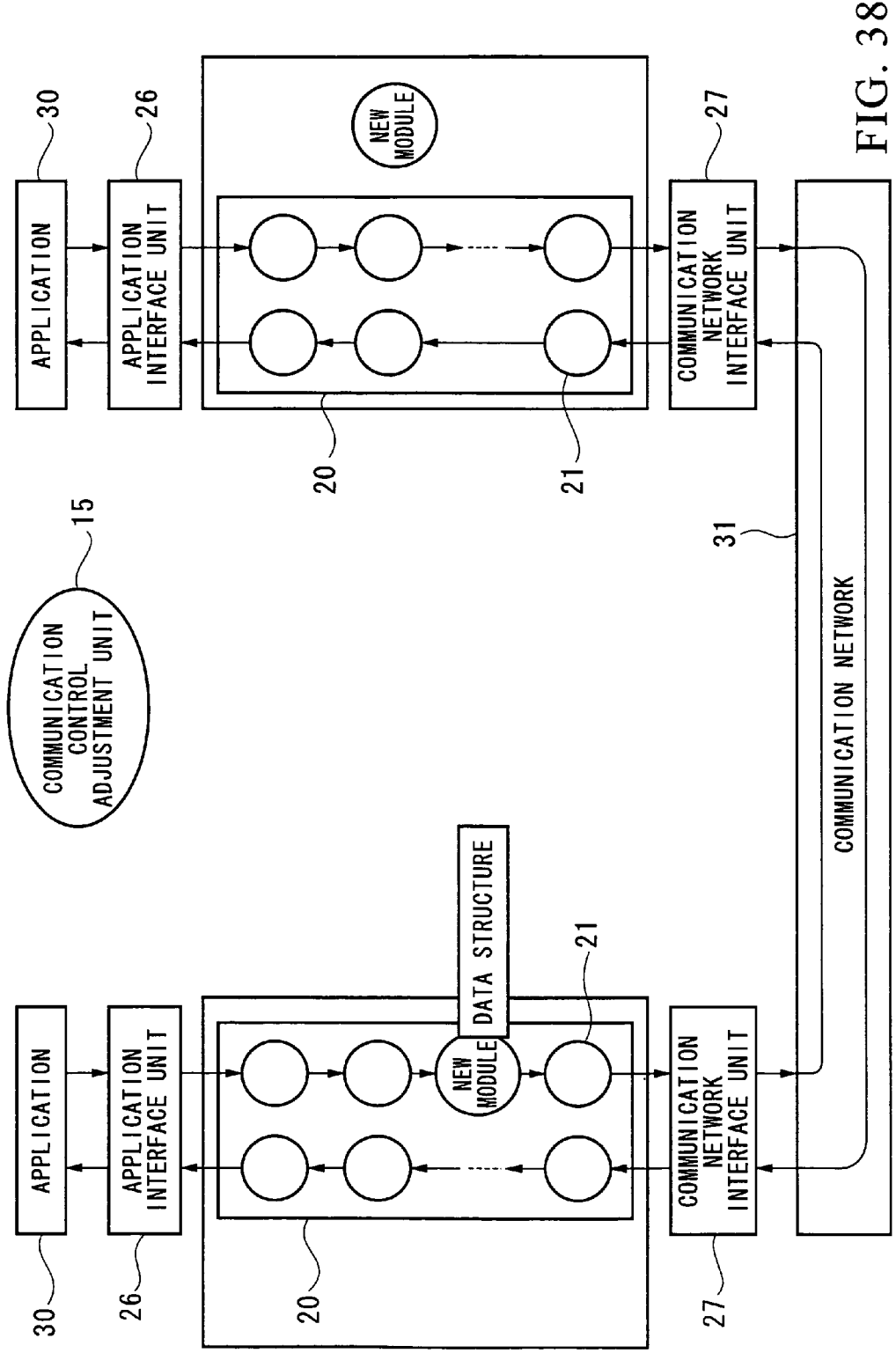
Figure 39:
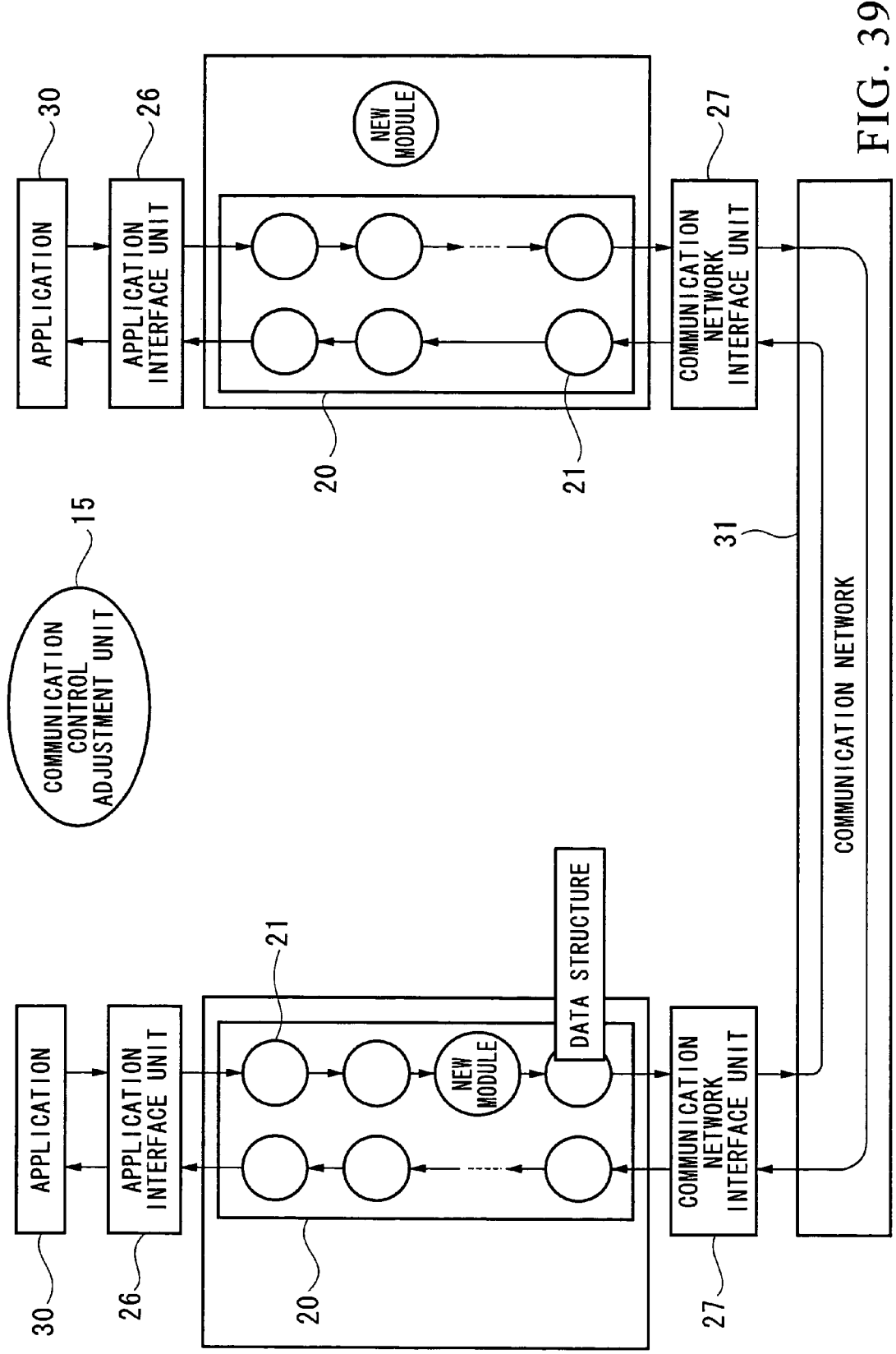
Figure 40:
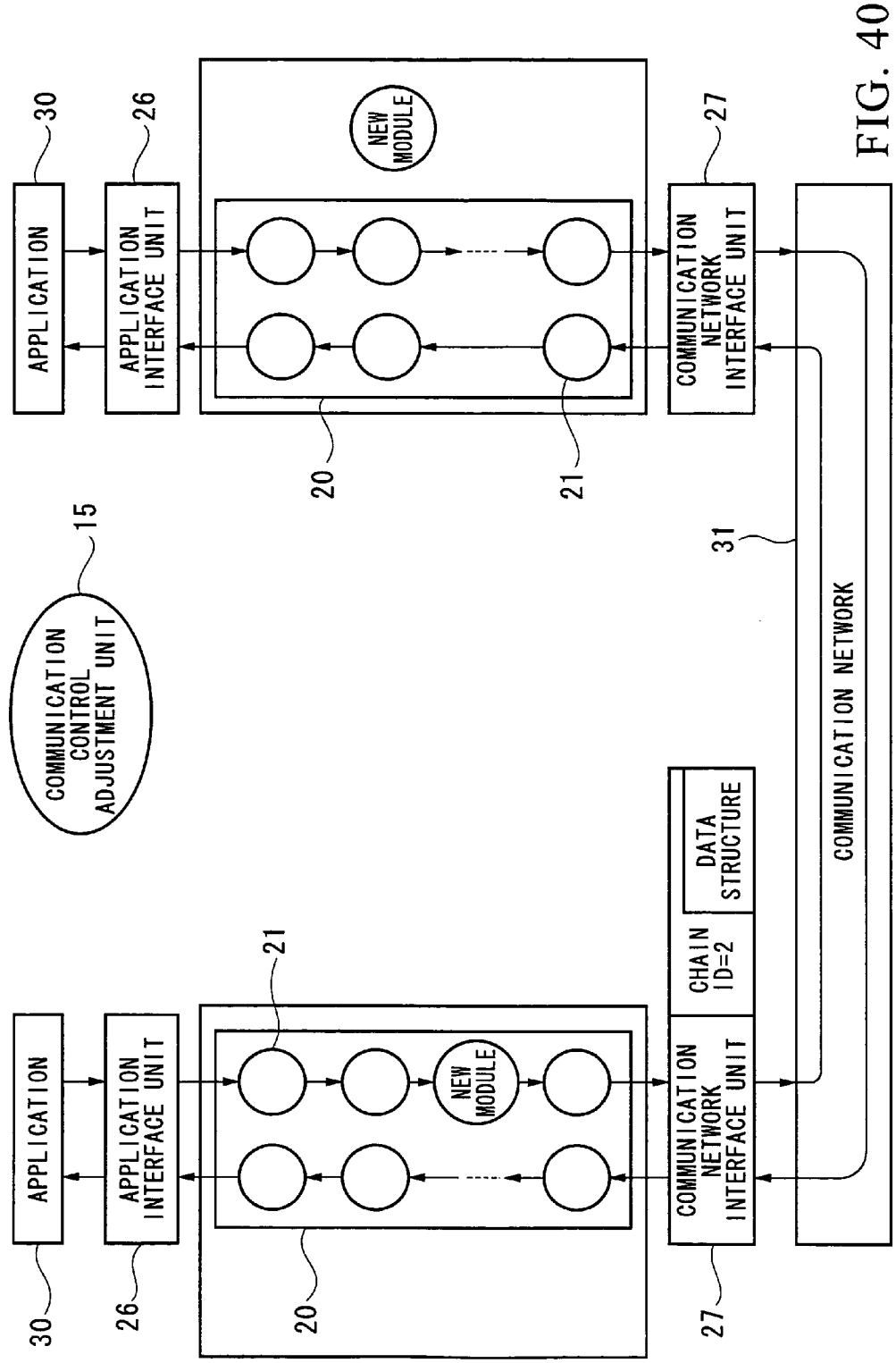
Figure 41:
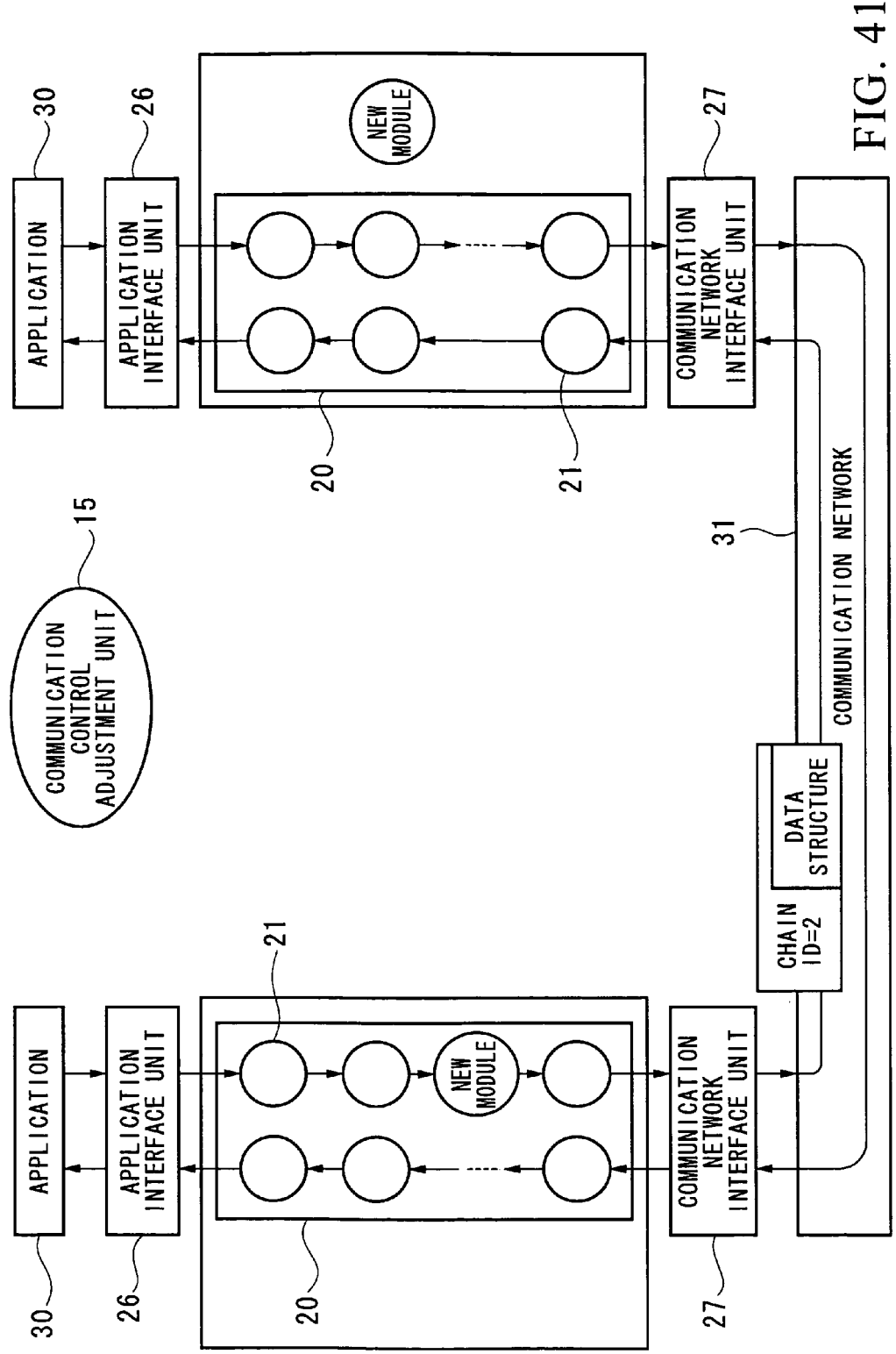
Figure 42:
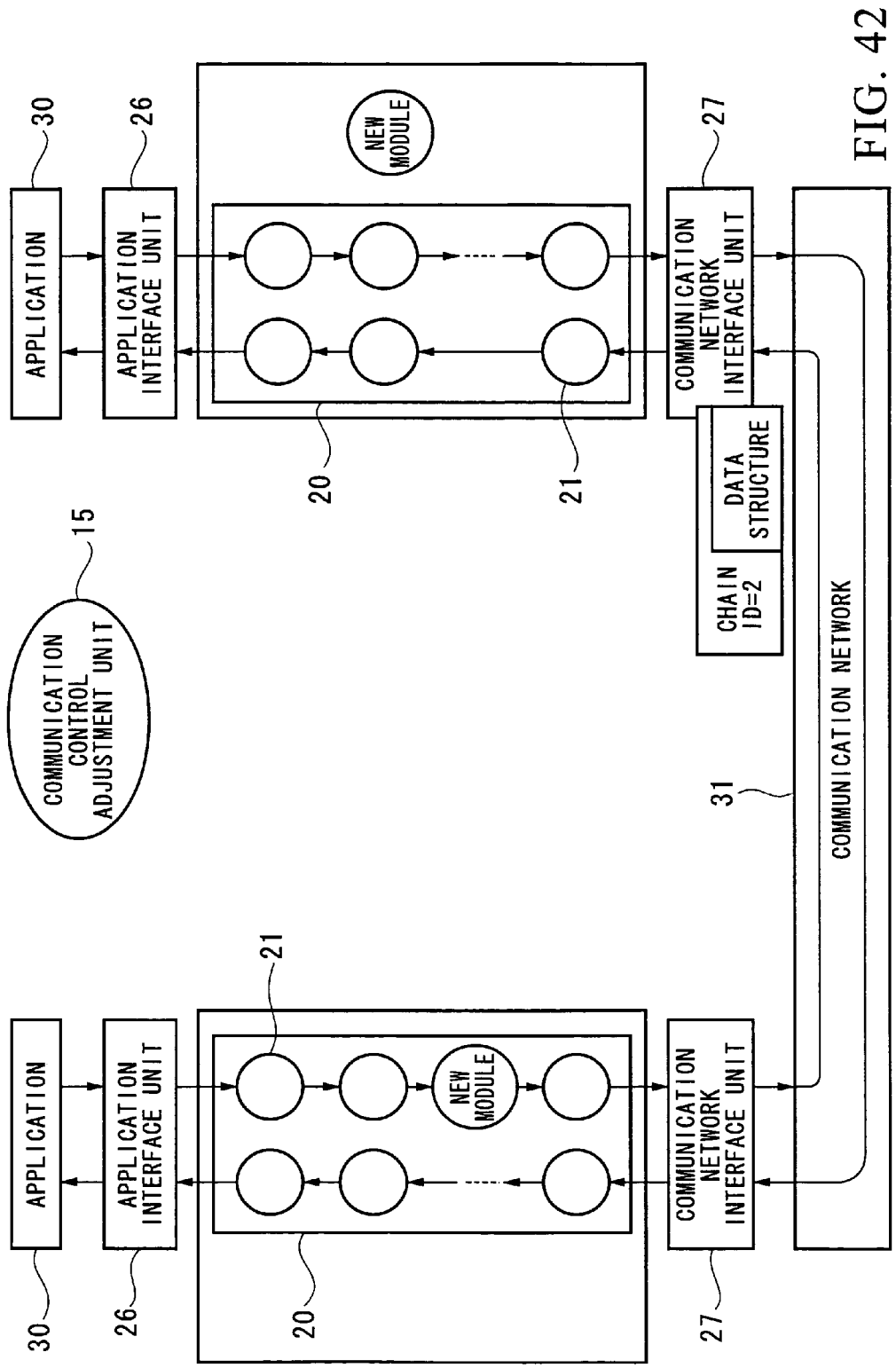

The communication signal control unit 10 sends out a processing resumption request to the application interface unit 26 (refer to S709 and FIG. 35). According to this, the application interface unit 26 resumes the data processing suspended in the above procedure B. Then, when the data begins to be processed, a new chain number is written into the data which has arrived at the transmission frame processing unit 600.

At S 710, when the data having the new chain number has arrived at the reception frame processing unit 700 on the receiving side, the reception frame processing unit 700 temporarily suspends the data processing of itself, and performs the discharge request transmission processing (described above) (refer to the procedure C, and FIGS. 36-42).

Figure 43:
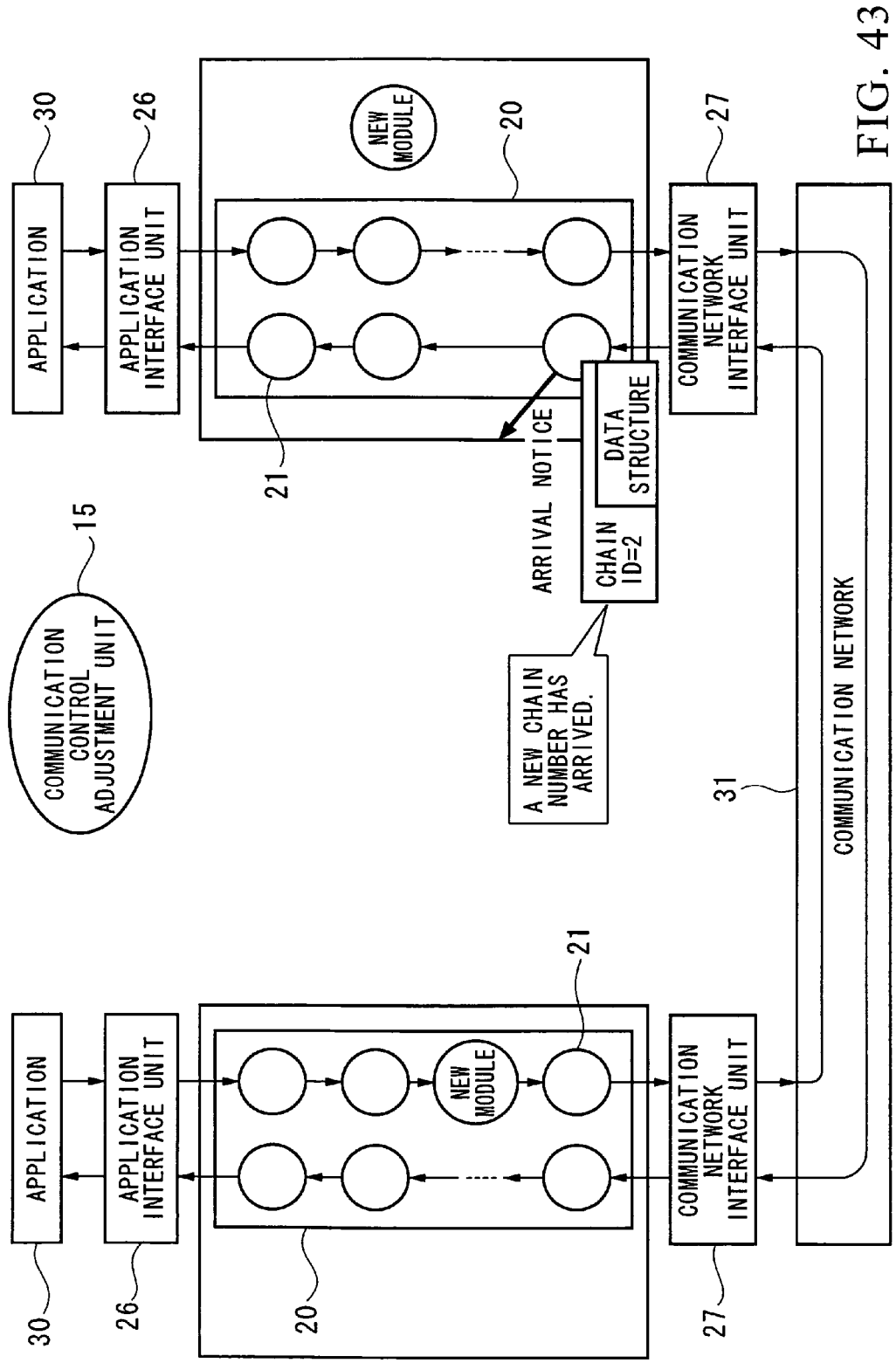
Figure 44:
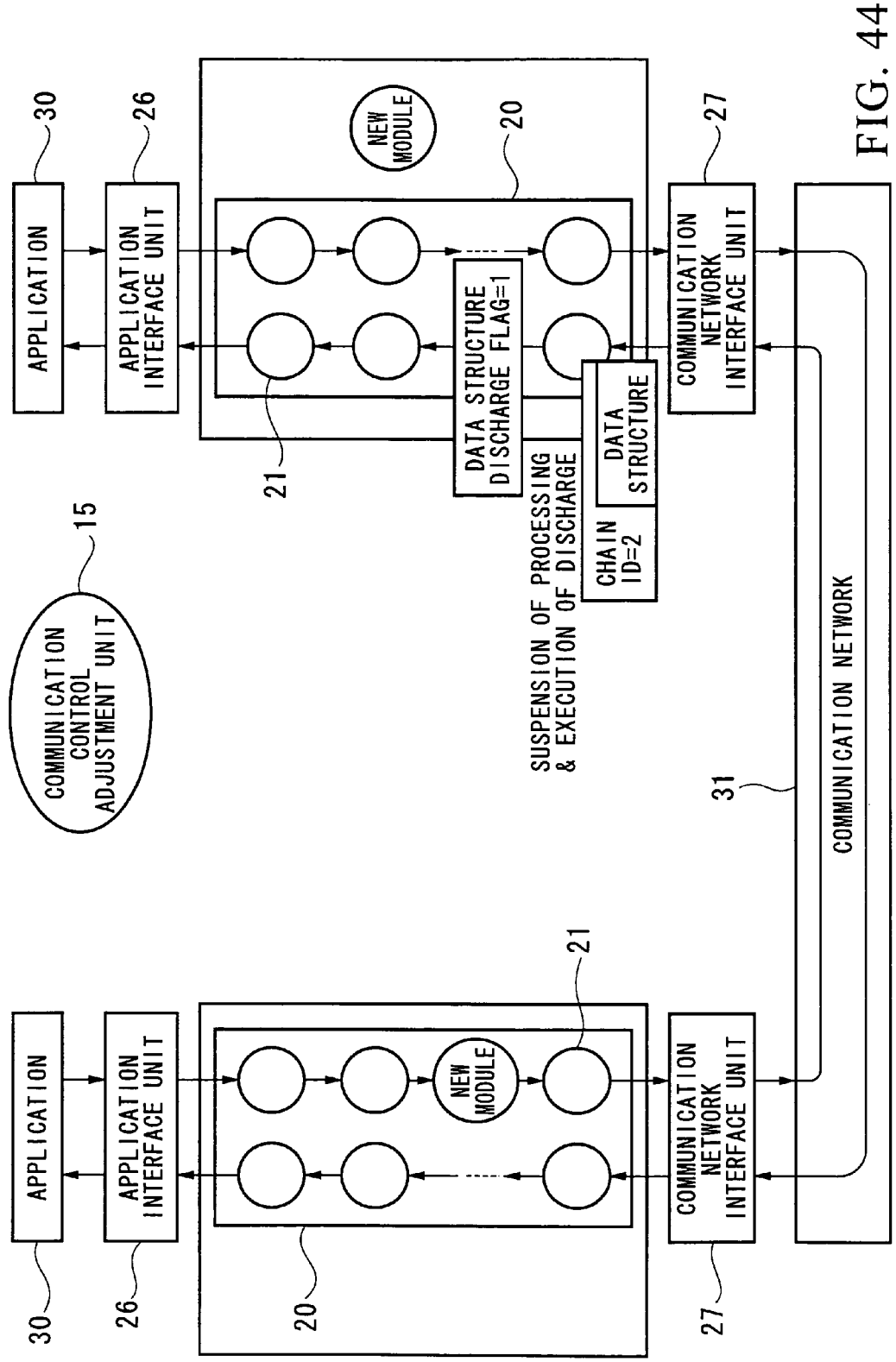
Figure 45:
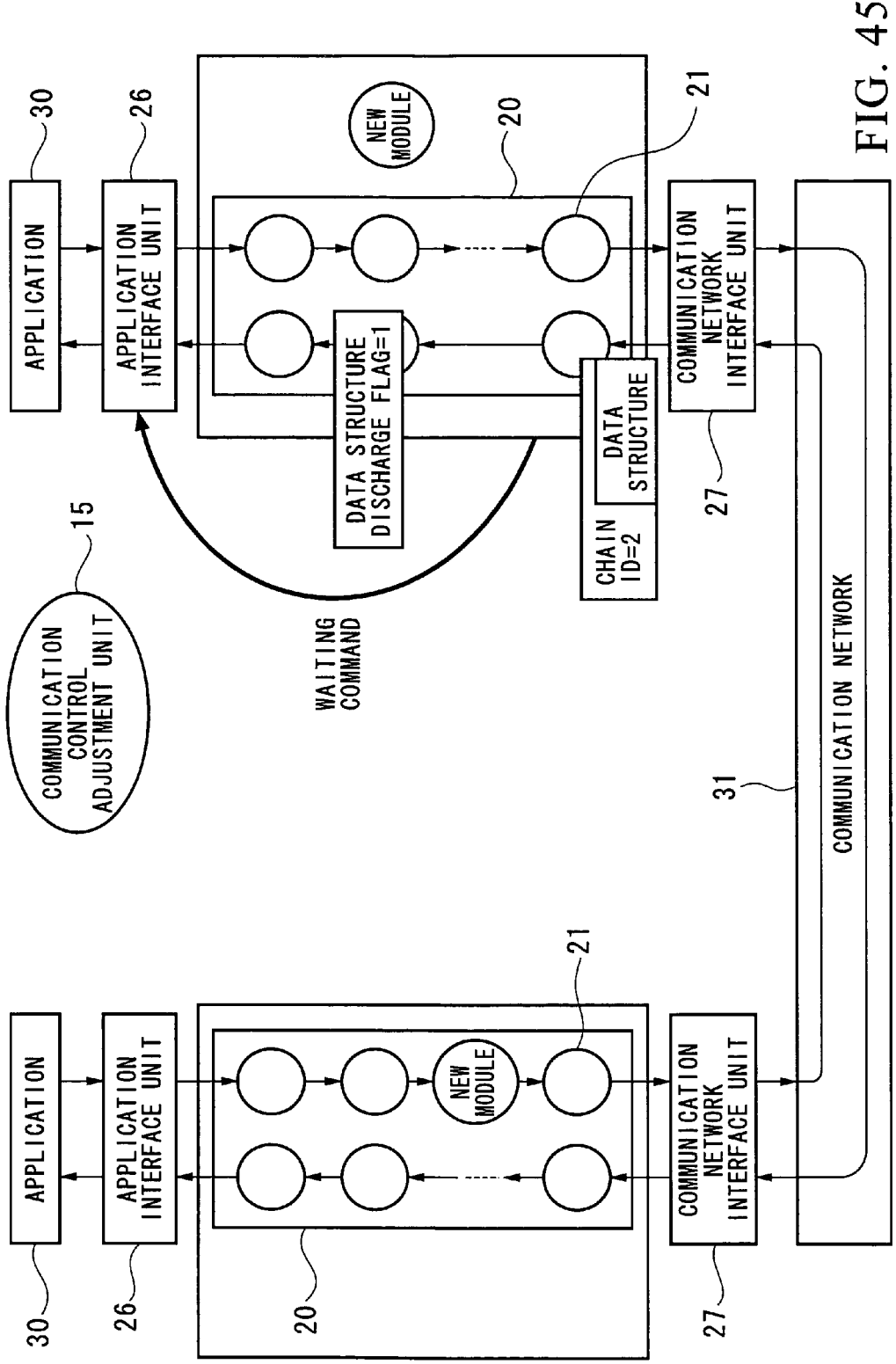
Figure 46:
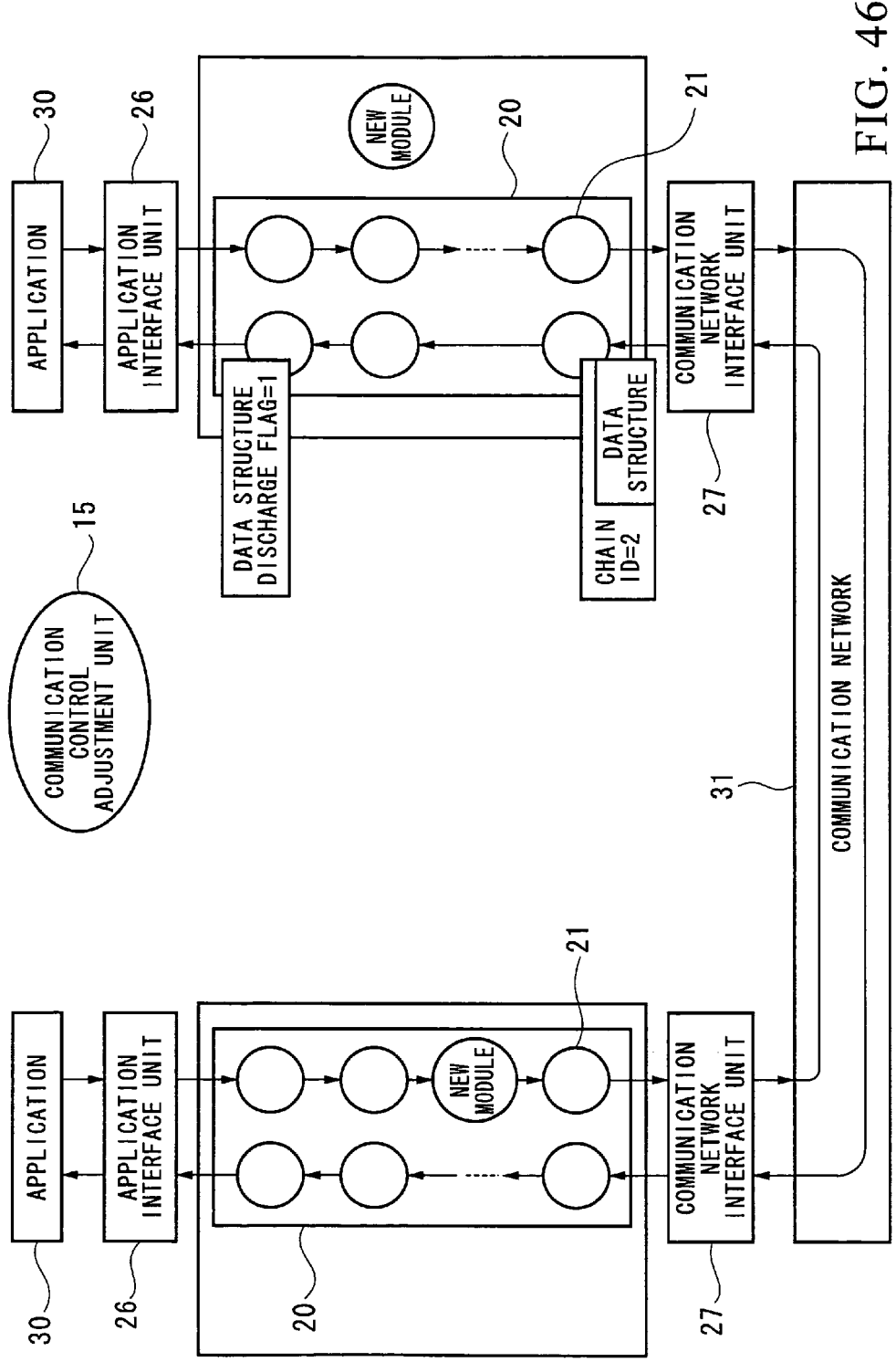
Figure 47:
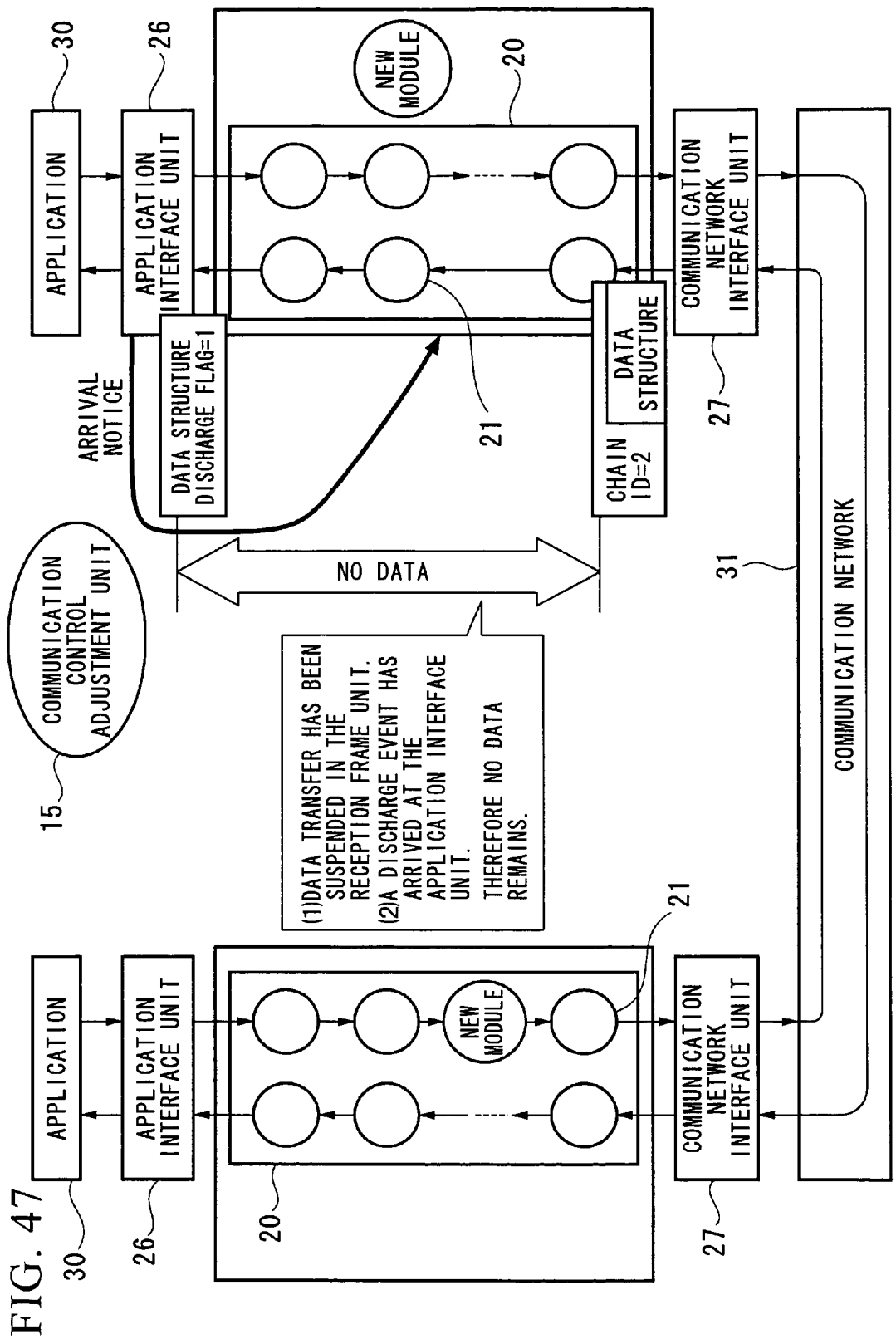

The reception frame processing unit 700 gives an arrival notice to the communication signal control unit 11 (refer to S 711, and FIGS. 43 and 44). At this time, the discharge number of the data structure sent out in the procedure C is also given (procedure D). Based on the arrival notice, the communication signal control unit 11 delivers a waiting command to the application interface unit 26 (refer to S 712, and FIGS. 45 and 46), and so is the discharge number received at the procedure D. When the application interface unit 26 performs the processing of the data structure 200 having the discharge number delivered, the arrival notice is given to the communication signal control unit 11 (refer to S 712 and FIG. 47).

It is guaranteed that at this stage, there exists no data structure 200 being processed in the communication signal control module 21 between the application interface unit 26 and the reception frame processing unit 700 on the reception side of reception side terminal.

Figure 48:
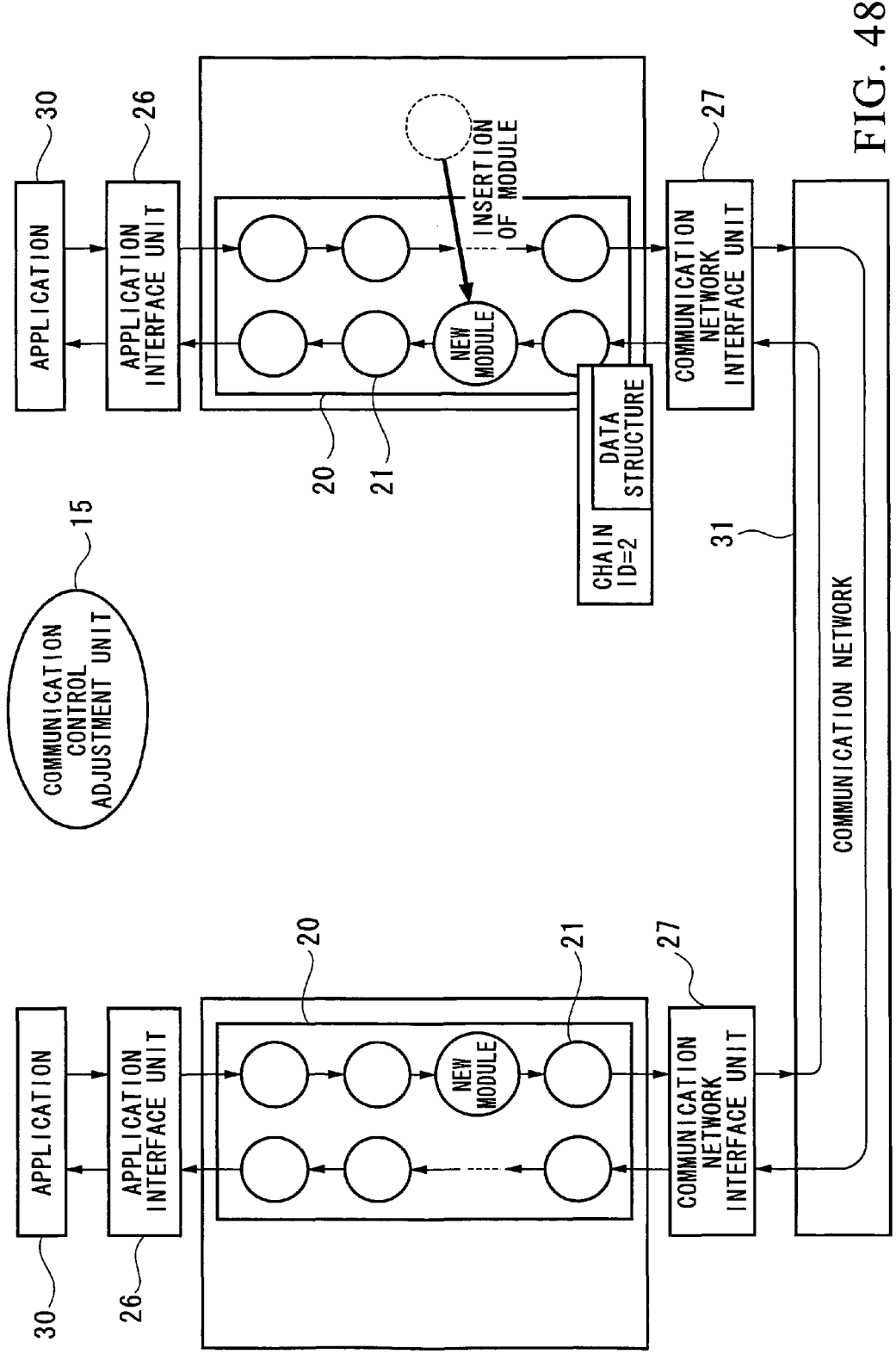
Figure 49:
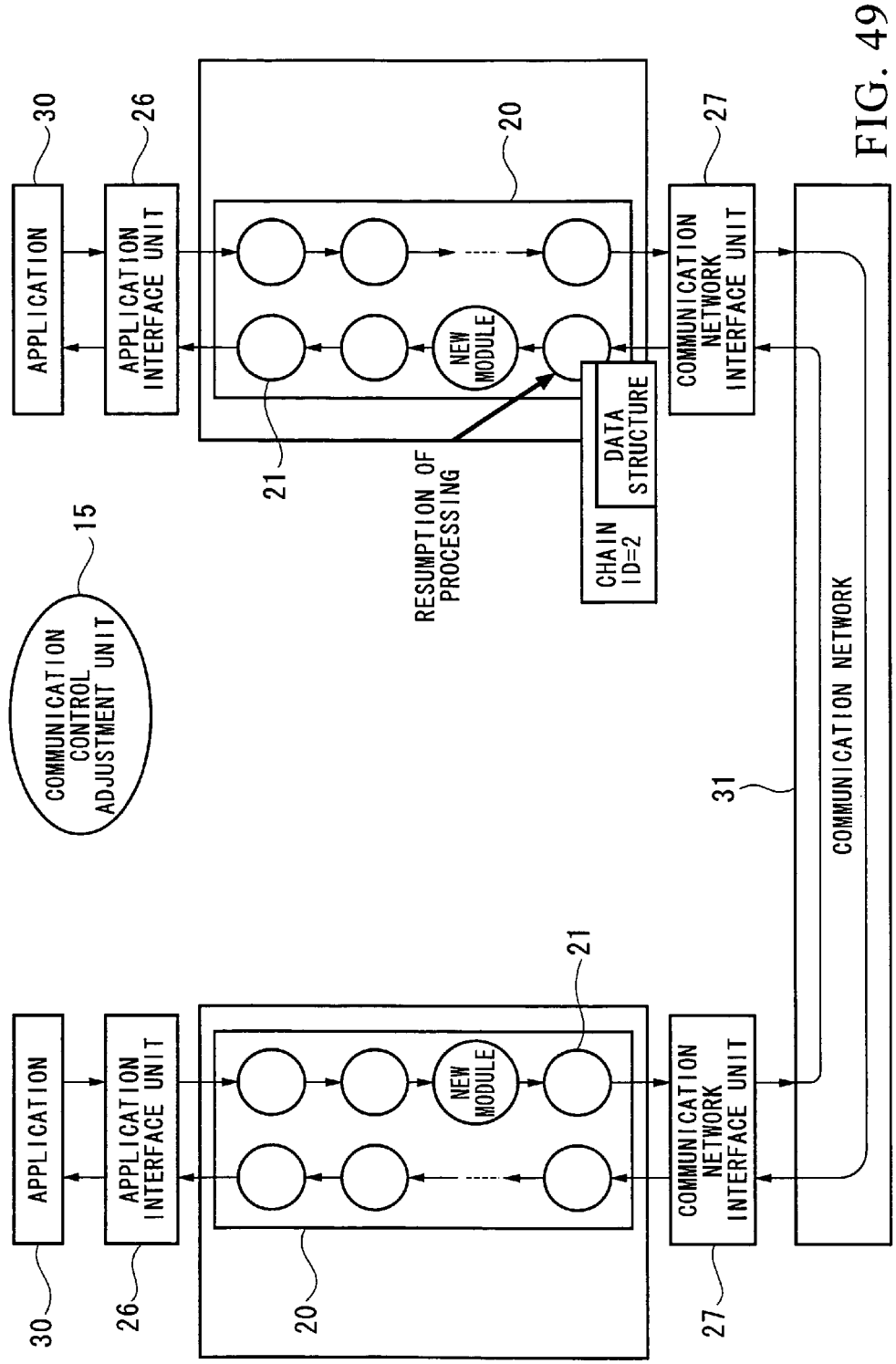
Figure 50:
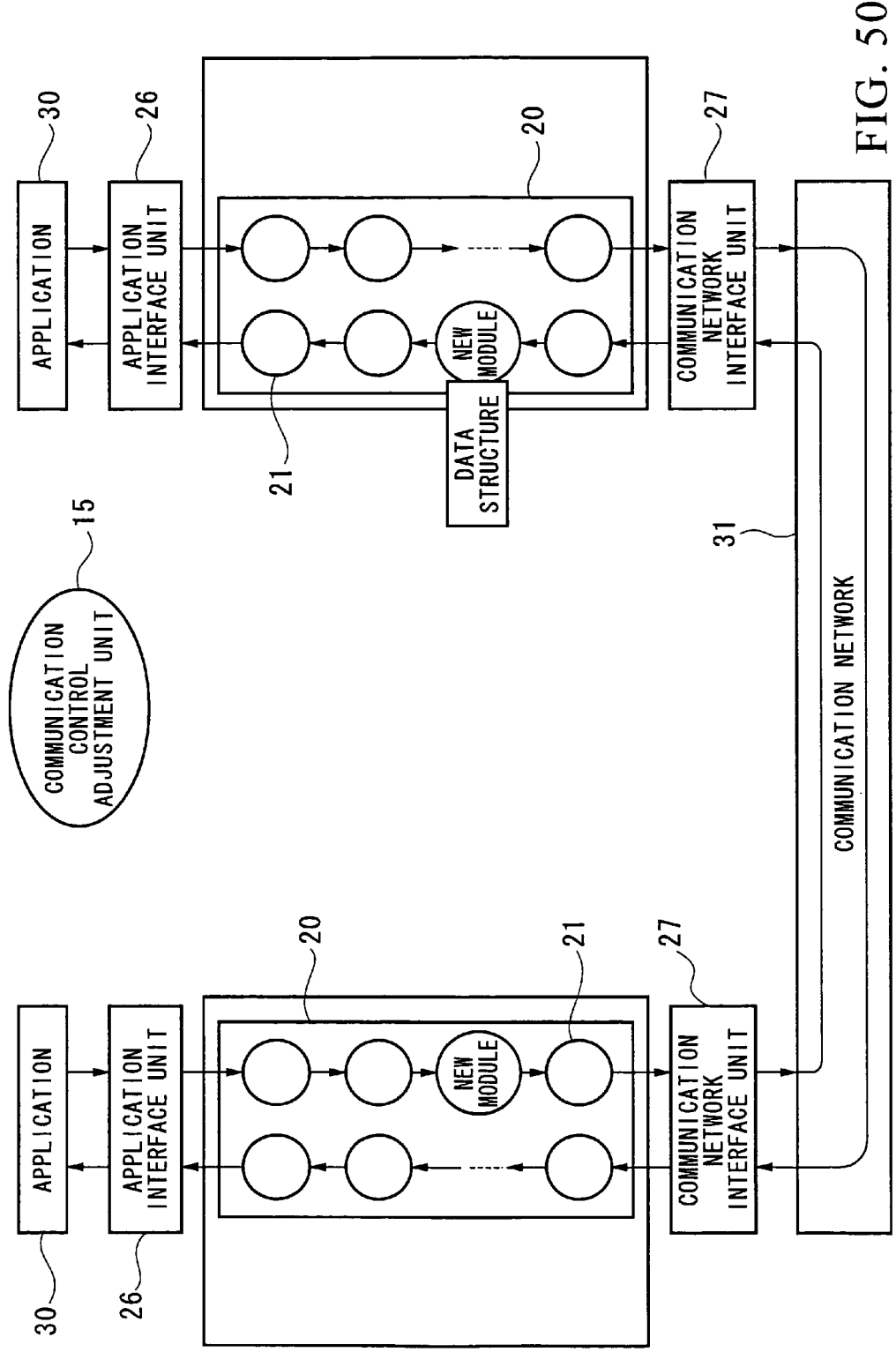
Figure 51:
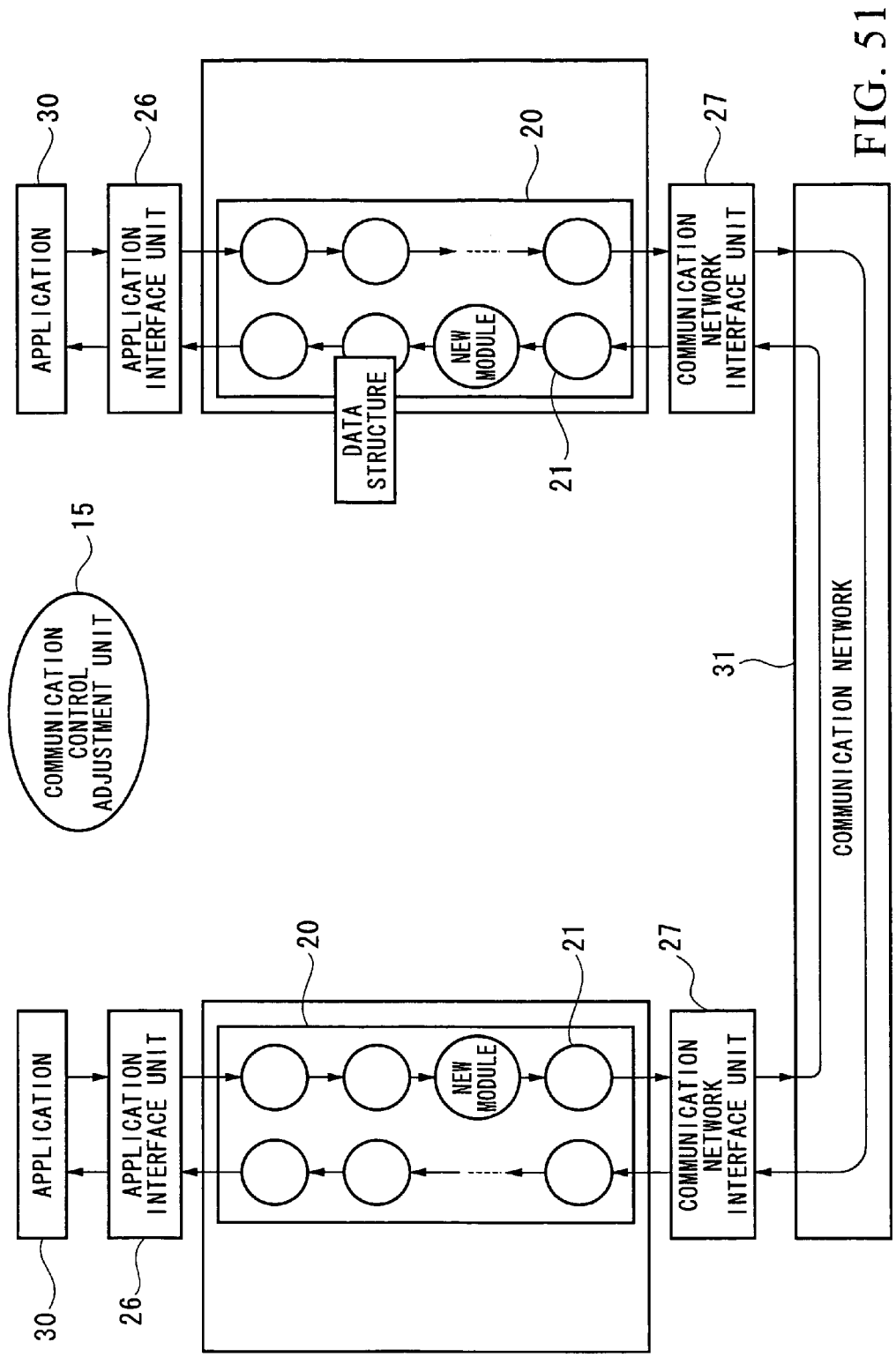
Figure 52:
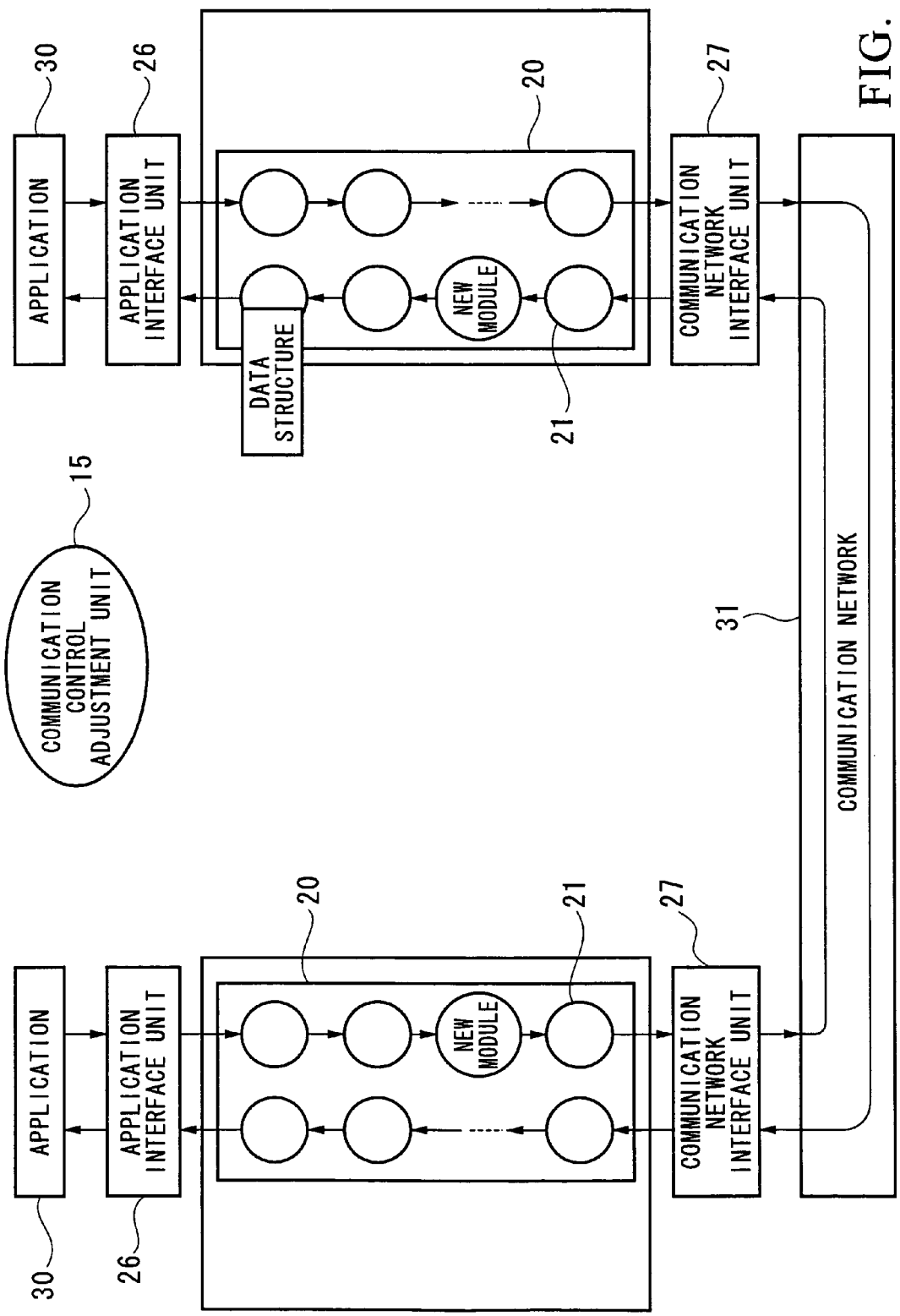

In a case in which instantiation of the communication signal control module 21 is performed in the procedure E, the communication signal control unit 11 inserts the communication signal control module 21 into a sequence of the communication signal control module 21 on the reception side (refer to FIG. 48). Then, the communication signal control unit 11 transmits a processing resumption request to the reception frame processing unit 700 to re-open communication (refer to S 714 and FIGS. 49-52). As mentioned above, the procedure of module insertion is completed.

D-6-2. Elimination of Module

Figure 16:
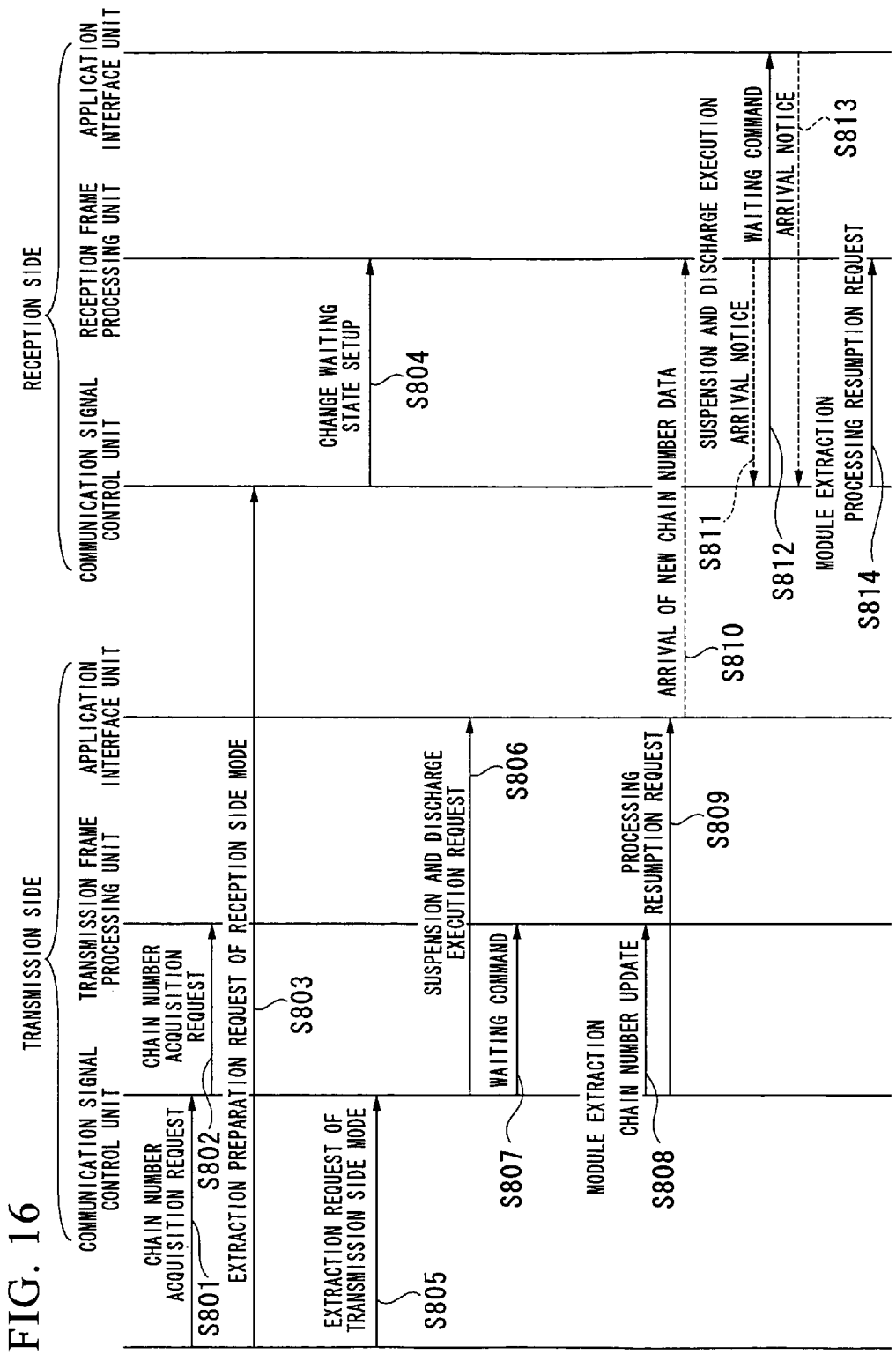
FIG. 16 is a sequential diagram showing procedures for eliminating modules of the third embodiment in accordance with the invention.

FIG. 16 is a sequential diagram showing procedures for eliminating modules. Since S 801-S 814 shown in FIG. 16 are almost the same as S 701-S 714 shown in FIG. 15, the explanation of S 801-S 814 is omitted. The differences between FIG. 16 and FIG. 15 are that the latter includes download, digital signature confirmation and instantiation, while the former does not; and that module insertion in FIG. 15 is replaced by module elimination in FIG. 16.

After the procedure of S 808, it is also possible to execute one of the following procedures. The execution of the procedure, in an application in which data is sent once in a while, enables a quick completion of the procedure for module elimination.

Where data has not arrived at the transmission frame processing unit 600 at a designated time, the transmission frame processing unit 600 performs frame assignment processing to 0 byte data to transfer to the communication signal control module 21.

E. Fourth Embodiment

E-1. Module Insertion (Guard Time System)

Figure 17:
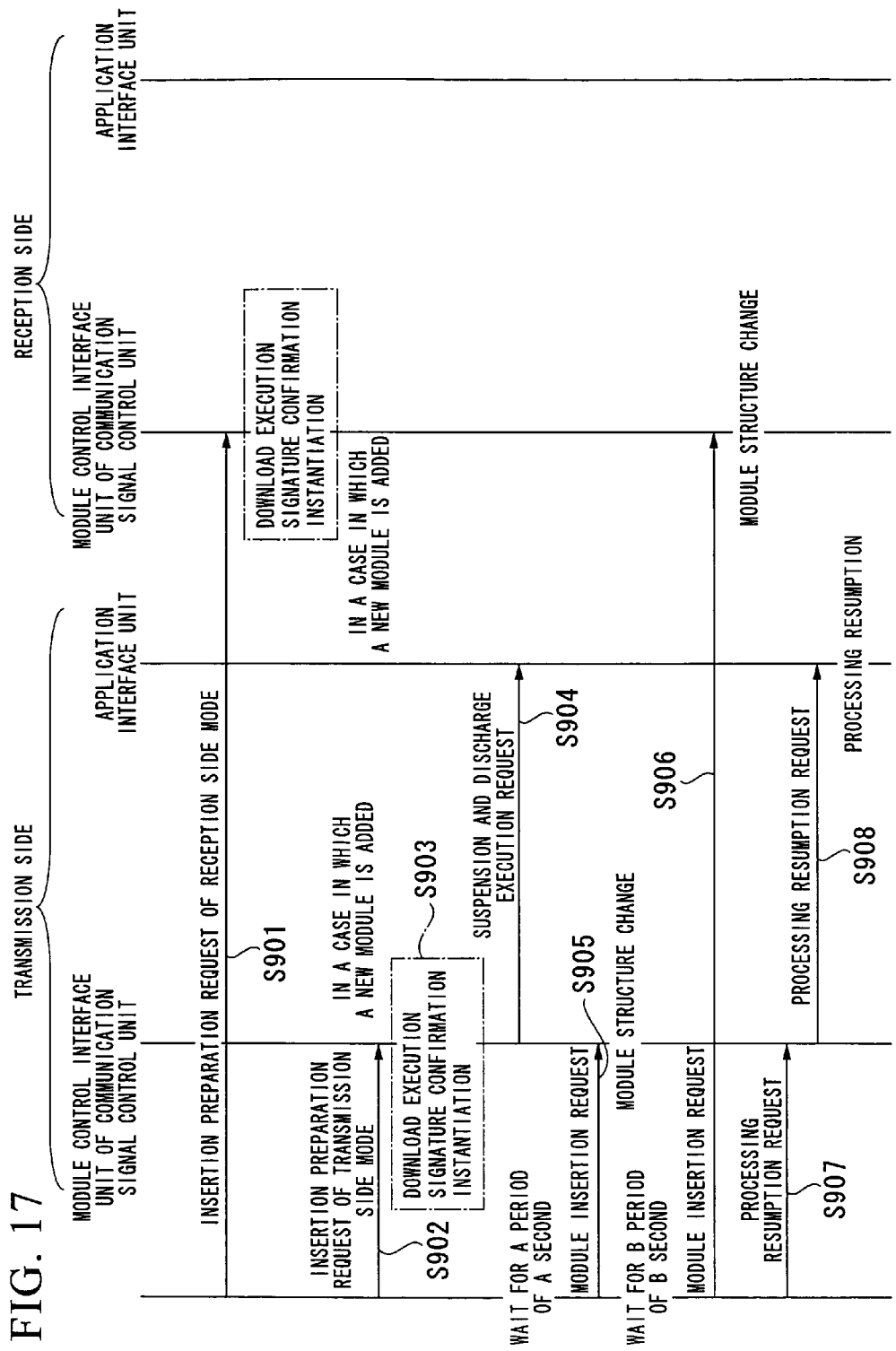
FIG. 17 is a sequential diagram showing procedures for inserting modules (guard time system) of a fourth embodiment in accordance with the invention.

FIG. 17 is a sequential diagram showing procedures for inserting modules (guard time system). An insertion preparation request of reception side mode is sent from the communication control adjustment unit 15 to the communication signal control unit 11 on the receiving side (S 901). At the communication signal control module download unit 24 of the communication signal control unit 11 on the receiving side, a module is downloaded from the module server 32 through a network. The digital signature written into the module is confirmed to decide whether or not the module can be reliable. When it is decided that the module cannot be reliable, the processing is suspended.

An insertion preparation request of transmission side mode is sent from the communication control adjustment unit 15 to the communication signal control unit 10 on the transmitting side (S 902). At the communication signal control module download unit 24 of the communication signal control unit 10 on the transmitting side, a module is downloaded from the module server 32 through a network (S 903). At the communication signal control module verification unit 60, the digital signature written into the module is confirmed to decide whether or not the module can be reliable. When it is decided that the module cannot be reliable, the processing is suspended.

When the processing is finished, the communication signal control unit 10 transmits a suspension and discharge execution request to the application interface unit 26 (S 904). In receiving this, the application interface unit 26 once suspends subsequent data processing and performs the aforementioned discharge request transmission processing.

The communication control adjustment unit 15 suspends the processing for a seconds, which is a sufficient time when at the communication signal control unit 10 on the transmitting side, the data, which is a transmission side data chain, is all processed for being sent out to a network. By making use of this time, it is guaranteed that the chain on the transmitting side has no remaining data being processed.

The communication control adjustment unit 15 delivers a module insertion request to the communication signal control unit 10 on the transmitting side (S 905). After having received the request, the communication signal control unit 10 on the transmitting side conducts a module insertion into the transmitting side chain. Following this, the communication control adjustment unit 15 suspends the processing for b seconds. This time is a sufficient time for network delay and for which data can be processed at the reception chain on the receiving side. By providing this time, it is guaranteed that no data is present in the communication network and the reception chain on the receiving side.

Furthermore, the communication control adjustment unit 15 send out a module insertion request to the communication signal control unit 11 on the receiving side (S 906). After having received the request, the communication signal control unit 11 conducts a module insertion.

After this, the communication control adjustment unit 15 delivers a processing resumption request to the communication signal control unit 10 on the transmitting side (S 907). After having received the request, the communication signal control unit 10 transmits a processing resumption request to the application interface unit 26 (S 908), which in turn resumes the data processing which was suspended.

F. Fifth Embodiment

A fifth embodiment (a counter system) in accordance with invention will be explained hereunder. The third embodiment described previously detects a chain change timing on the transmitting side using a frame, while the fifth embodiment detects a chain change timing on the transmitting side using the number of bytes transferred.

F-1. Transmission Counter Processing Unit

Figure 18:
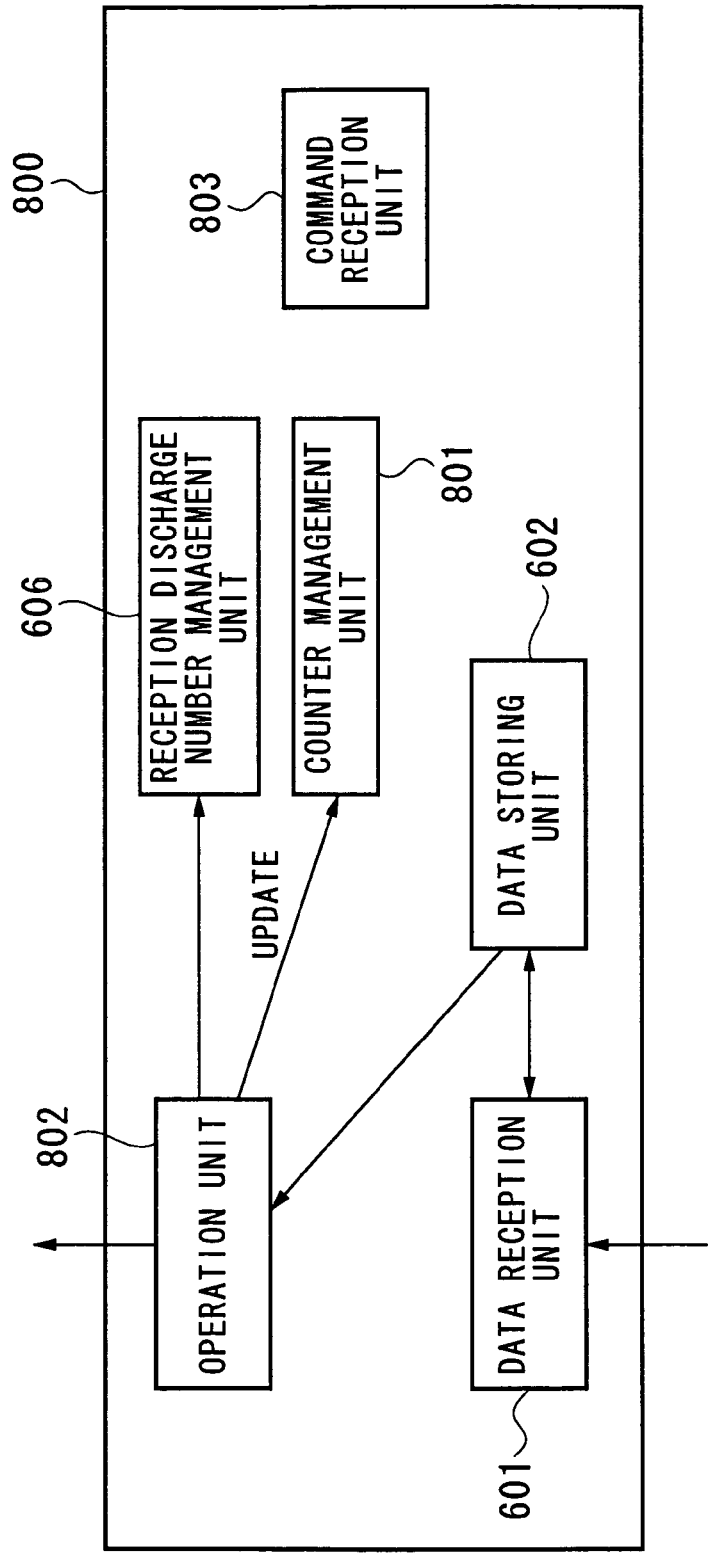
FIG. 18 is a block diagram showing a structure of a transmission counter processing unit of a fifth embodiment in accordance with the invention.

FIG. 18 is a block diagram showing a structure of a transmission counter processing unit of the fifth embodiment. The same reference numeral as that in FIG. 12 is assigned to each of the elements in FIG. 18, provided that those elements in FIG. 18 have the same function as the corresponding elements in FIG. 12 do. An explanation of the elements having the same numerals is omitted. The transmission counter processing unit 800 is one kind of communication signal control module. A counter management unit 801 manages a total of communication data that has passed the transmission counter processing unit 800. An operation unit 802 calculates data length of the data structure received in a communication data region to add to the values managed by the counter management unit 801. The operation unit 802 transfers the received data structure as it is, to the next the communication signal control module 21. A command reception unit 803 receives "a waiting command" and "a counter value acquisition request". In having received "a waiting command", the command reception unit 803 performs the processing of the waiting command. In having received "a counter value acquisition request", the command reception unit 803 returns to the requester the numerical values managed by the counter management unit 801.

F-2. Reception Counter Processing Unit

Figure 19:
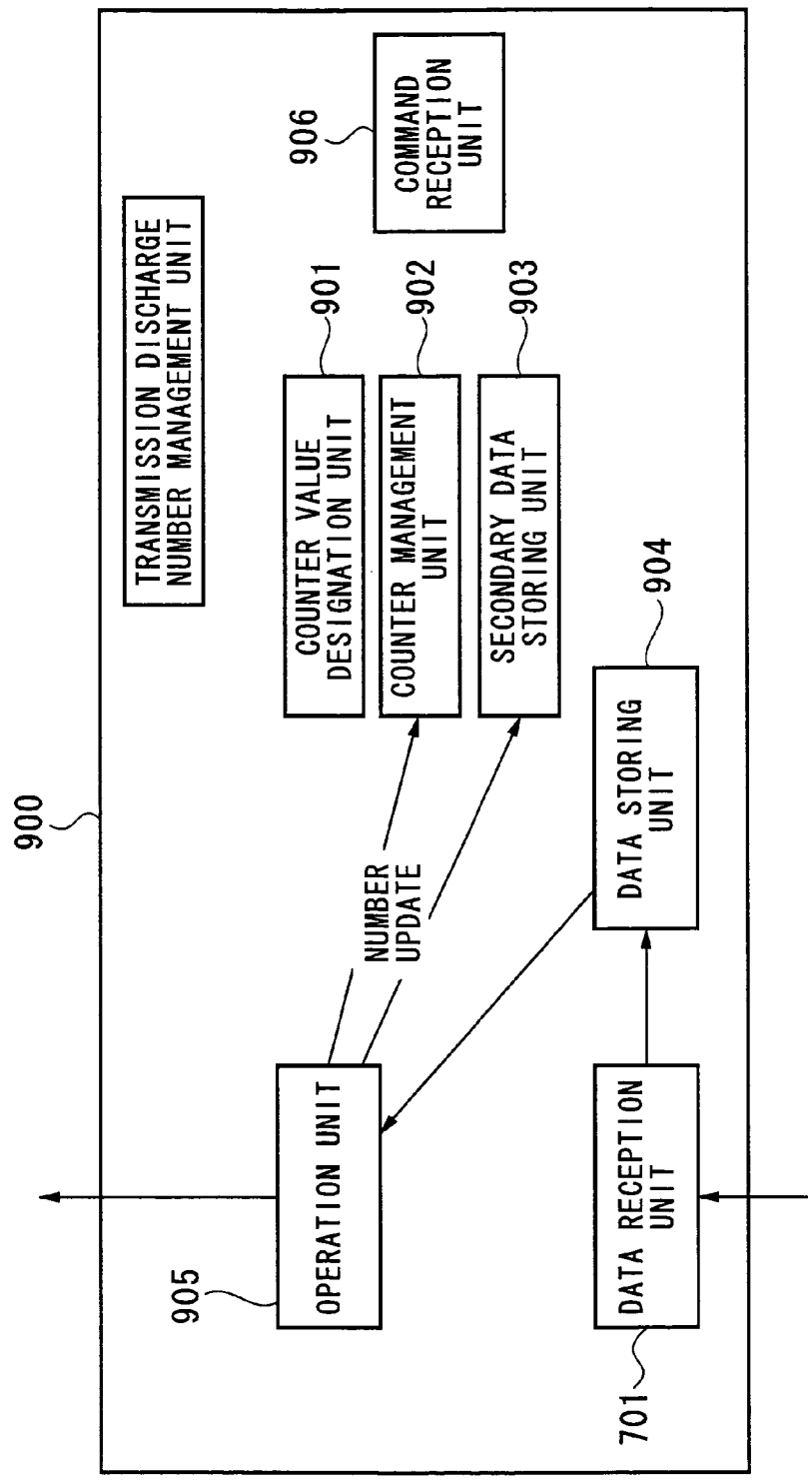
FIG. 19 is a block diagram showing a structure of a reception counter processing unit of a fifth embodiment in accordance with the invention.

FIG. 19 is a block diagram showing a structure of a reception counter processing unit 900 of a fifth embodiment. The reception counter processing unit 900 is one kind of communication signal control module. A counter value designation unit 901 manages numerical values, one of which is "0" at an initial state.

A counter management unit 902 manages a total of communication data that has passed the reception counter processing unit 900. When the data structure is stored in a secondary data storing unit 903, the reception counter processing unit 900 performs the processing first rather than the data structure of a data storing unit 904. Where a value "0" is designated in the counter value designation unit 901, an operation unit 905 calculates the data length of the data structure received in a communication data region, which is added to values managed by the counter management unit 902, and delivers the received data structure as it is, to the next communication signal control module 21.

Where a numerical value other than "0" is designated in the counter value designation unit 901, the operation unit 905, in receiving the data structure, performs the following processing.

Where L is the length of a received data structure in a communication data region, P is a value of the counter management unit 902, and T is a value of the counter value designation unit 901, in a case in which P+L<T, the value of P+L is stored and the data structure as it is is transferred to the next communication signal control module 21.

In a case in which P+L=T, the value of P+L is stored, the data structure as it is is transferred to the next communication signal control module 21, the processing of the operation unit 905 is suspended, and the aforementioned discharge request transmission processing is executed. "An arrival notice" is conveyed to the module control interface unit 25 of the communication signal control unit 10. In addition, "0" is allocated to the counter value designation unit 901.

In a case in which P+L>T and T>P, a byte sequence of (T−P) bytes is extracted from a head for the data of the received data structure in a communication data region to create a new data structure, and the byte sequence is written into the communication data region. The new data structure is transferred to the next communication signal control module 21. From an order number of (T−P) byte in a communication data region of the received data structure, a data structure is created where the data of an order number of L byte is written into the communication data region, which is stored in the second data storing unit 903. Then, the processing of the operation unit 905 is suspended, and the aforementioned discharge execution processing is performed. "An arrival notice" is conveyed to the module control interface unit 25 of the communication signal control unit 10. Moreover, "0" is set in the counter value designation unit 901.

The command reception unit 906 receives "a waiting command" and "a processing resumption request". "The waiting command" includes numerical value parameters. After having received "the waiting command," the command reception unit 906 writes the parameter values into the counter value designation unit 901. After having received "the processing resumption request," the command reception unit 906 resumes the processing of the operation unit 905.

F-3. Procedures for Module Structure Change

Figure 20:
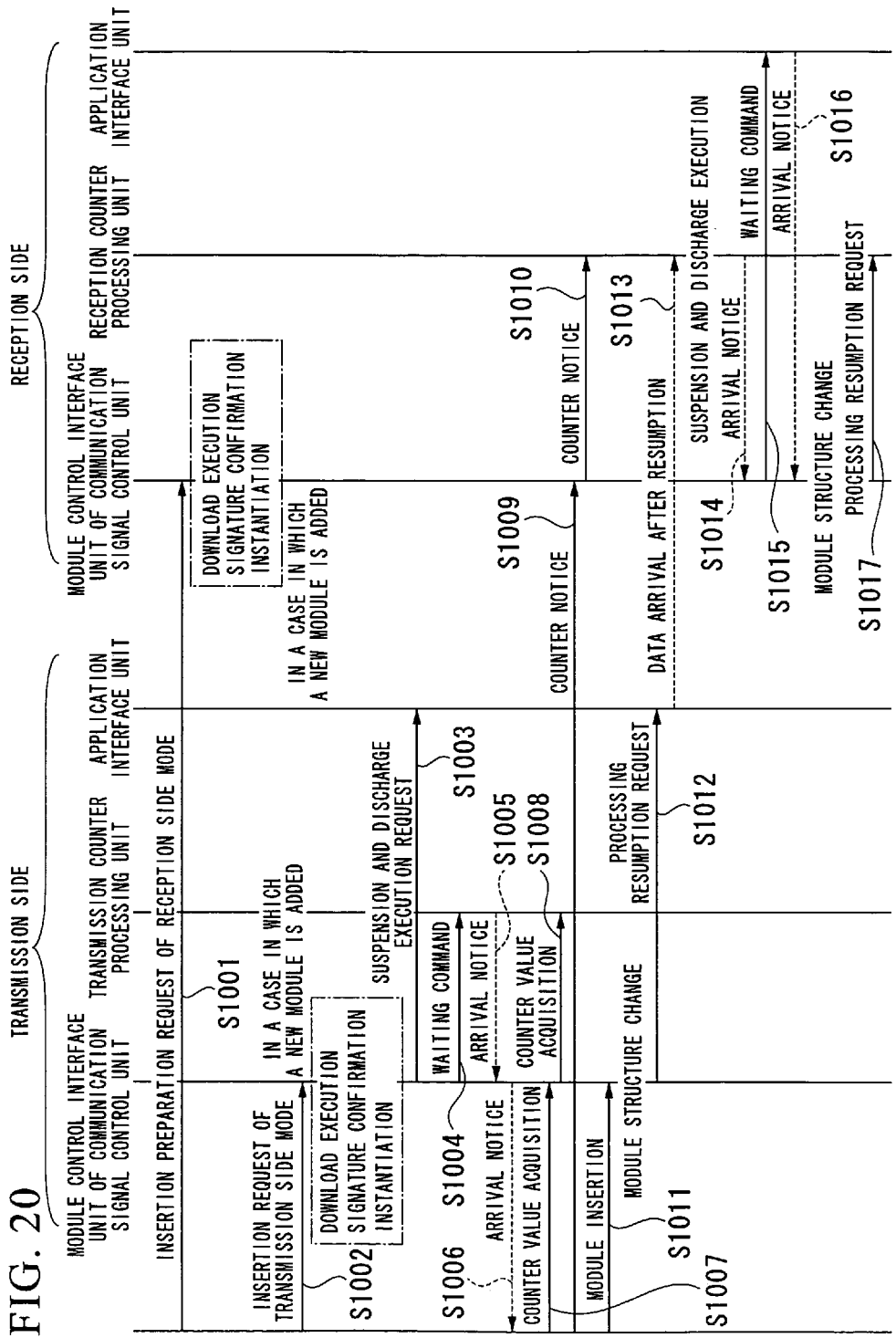
FIG. 20 is a sequential diagram illustrating a procedure of a module structure change of a fifth embodiment in accordance with the invention.

FIG. 20 is a sequential diagram illustrating a procedure of a module structure change of a fifth embodiment. Each operation of S 1001-S 1017 shown in FIG. 20 is almost identical to that of S 701-S 714 shown in FIG. 15, S 801-S 814 shown in FIG. 16, and S 901-S 908 shown in FIG. 17; therefore an explanation of the operations will be omitted. The differences are that the diagram of FIG. 20 has a counter value acquisition (S 1006 and S 1008) and a counter notice (S 1009 and S 1010), while the diagrams of FIGS. 15, 16 and 17 do not.

G. Sixth Embodiment

A sixth embodiment in accordance with the invention (a delimiter system) will be explained hereinbelow. The aforementioned third embodiment detects a chain change timing on the transmitting side using a frame. On the other hand, the sixth embodiment detects a chain change timing on the transmitting side employing a byte series (delimiter) that does not appear in a stream.

In the sixth embodiment, a transmission delimiter processing unit is placed in a transmission chain of the transmission terminal, and a reception delimiter processing unit is placed in a reception chain of the reception terminal. Because of this, between the transmission delimiter processing unit and the application interface unit and between the reception delimiter processing unit and the application interface unit, new modules can be inserted.

In the sixth embodiment, modules can be removed that are placed between the transmission delimiter processing unit and the application interface unit and between the reception delimiter processing unit and the application interface unit.

G-1. Transmission Delimiter Processing Unit

Figure 21:
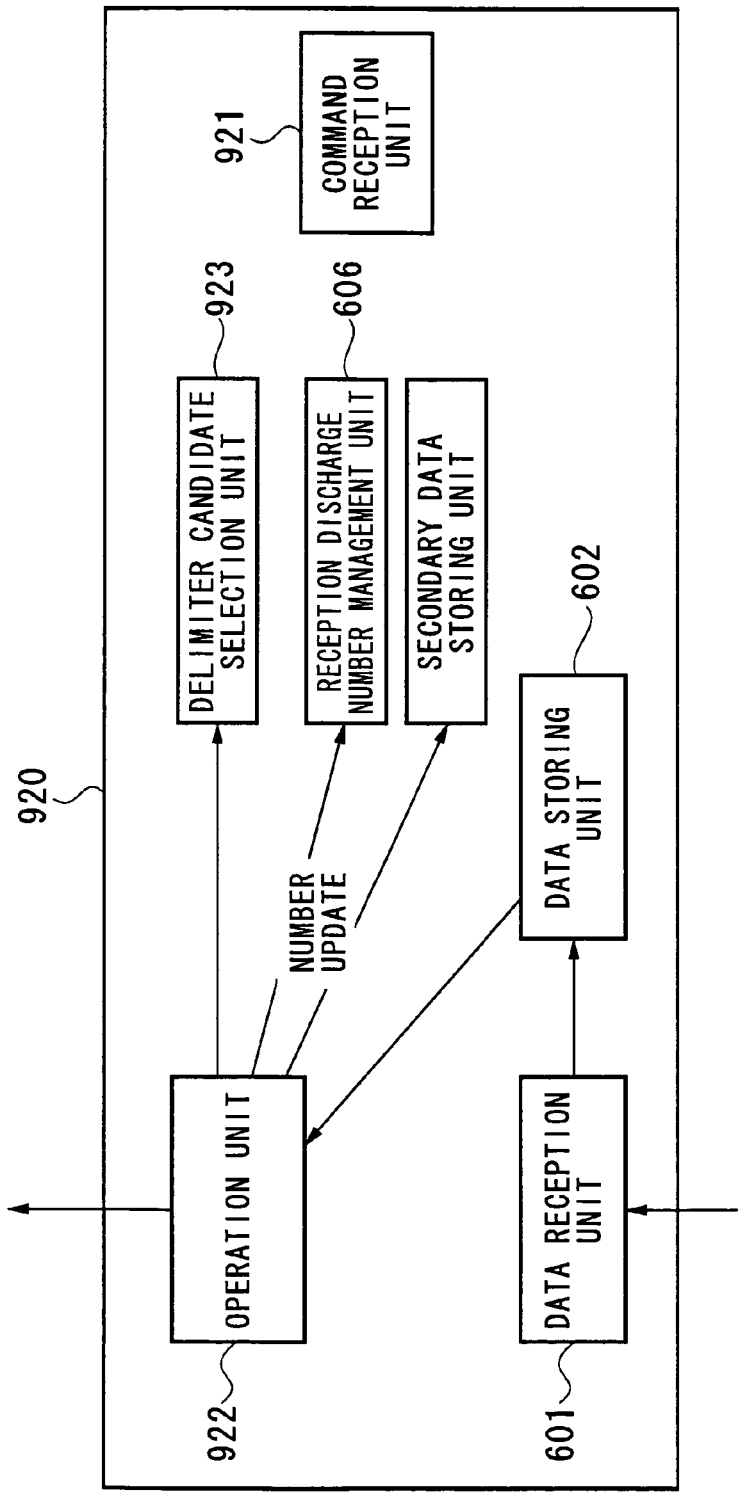
FIG. 21 is a block diagram showing a structure of a transmission delimiter processing unit of a sixth embodiment in accordance with the invention.

FIG. 21 is a block diagram showing a structure of a transmission delimiter processing unit 920 of the sixth embodiment. The transmission delimiter processing unit 920 belongs to one kind of the communication signal control module.

A command reception unit 921 receives "a processing resumption request," "a waiting command," and "a delimiter acquisition." In having received "a waiting command," the command reception unit 921 performs the processing of "the waiting command." After having received "a processing resumption request," the command reception unit 921 resumes the processing of an operation unit 922. After having received "a delimiter acquisition," the command reception unit 921 inquires of a delimiter candidate selection unit 923 about a byte sequence that is not used for communication or that has a low probability for being used, and returns the byte sequence.

The operation unit 922, in addition to the processing of an operation unit of a usual "a communication signal control module", transfers the received data to the delimiter candidate selection unit 923. The delimiter candidate selection unit 923 selects a delimiter based on the transferred data.

An example of the delimiter candidate selection unit 923 is described. A maximum length of a specified pattern in a certain communication is counted. If repeated by the maximum length plus one times, the pattern is a byte sequence that has not appeared in the communication and can be used as a delimiter.

The pattern includes, for example, a repetition of a value 0 byte (pattern length 1 byte), a repetition of a 0 and ff byte pattern (pattern length 2 bytes), and a repetition of a 0, 1, 2, and 3 byte pattern (pattern length 4 bytes).

G-2. Reception Delimiter Processing Unit

Figure 22:
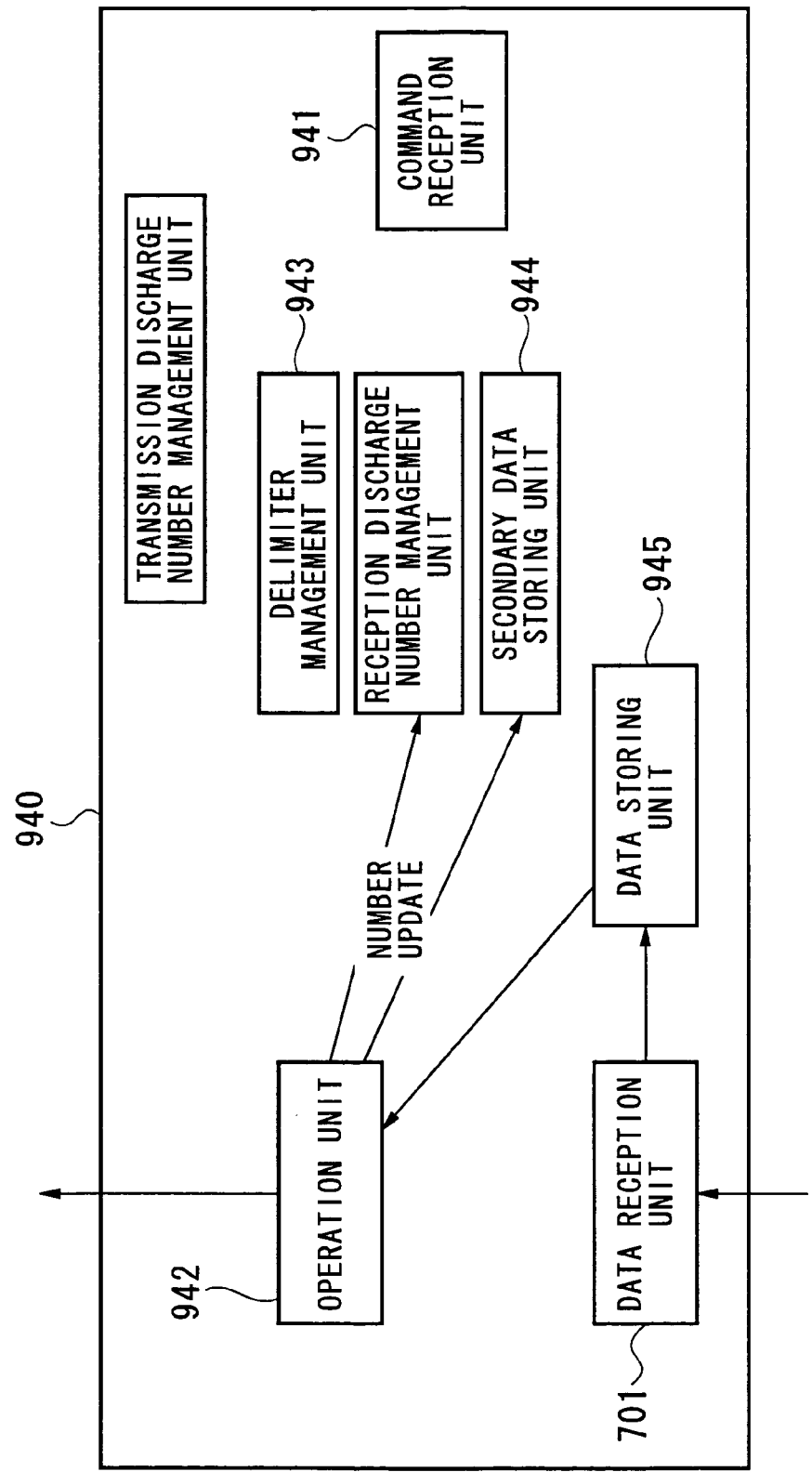
FIG. 22 is a block diagram showing a structure of a reception delimiter processing unit of a sixth embodiment in accordance with the invention.

FIG. 22 is a block diagram showing a structure of a reception delimiter processing unit 940 of a sixth embodiment. The reception delimiter processing unit 940 is one kind of the communication signal control module. In a case where delimiter data is set, when detecting a delimiter, the reception delimiter processing unit 940 performs predetermined operations, and discards the detected delimiter, which is not transmitted to the next communication signal control module.

A command reception unit 941 receives "a delimiter notice" and "a processing resumption request." After having received "a processing resumption request," the command reception unit 941 re-opens the processing of an operation unit 942. After having received "a delimiter notice," byte sequence data transferred in accordance with the request is stored in a delimiter management unit 943. When a byte sequence is not set in the delimiter management unit 943 (when a byte sequence of length "0" is set), the operation unit 942 transfers the received byte sequence to the next communication signal control module as it is.

When a byte sequence is set in the delimiter management unit 943, the operation unit 942 confirms that the received communication data does not include the byte sequence (delimiter hereinafter). After having received a delimiter, the operation unit 942 creates a data structure in which data prior to the delimiter is written into a communication data region, and transmits the data structure to the next communication signal control module. Then, the processing of the operation unit 942 is suspended, and a discharge processing is executed, which is notified to the module control interface unit 25 of the communication signal control unit 10. Subsequently, the byte sequence set at the delimiter management unit 943 is cancelled (a byte sequence of length "0" is set).

Where data subsequent to the delimiter data of the data in the received data structure still remains, a new data structure is created in which the remaining data is stored in a communication data region. The data structure is accumulated in a secondary data storing unit 944 (when data is stored in the secondary data storing unit 944, the operation unit 942 performs the processing in preference to a data storing unit 945).

When the operation unit 942 cannot decide whether or not the data structure the operation unit 942 has received is suitable for a delimiter since the data structure has short communication data, the data structure is stored in the secondary data storing unit 944 and the following data structure is received. The data structure that is decided not to be appropriate as a delimiter is transmitted to the next communication signal control module when decided.

Figure 23:
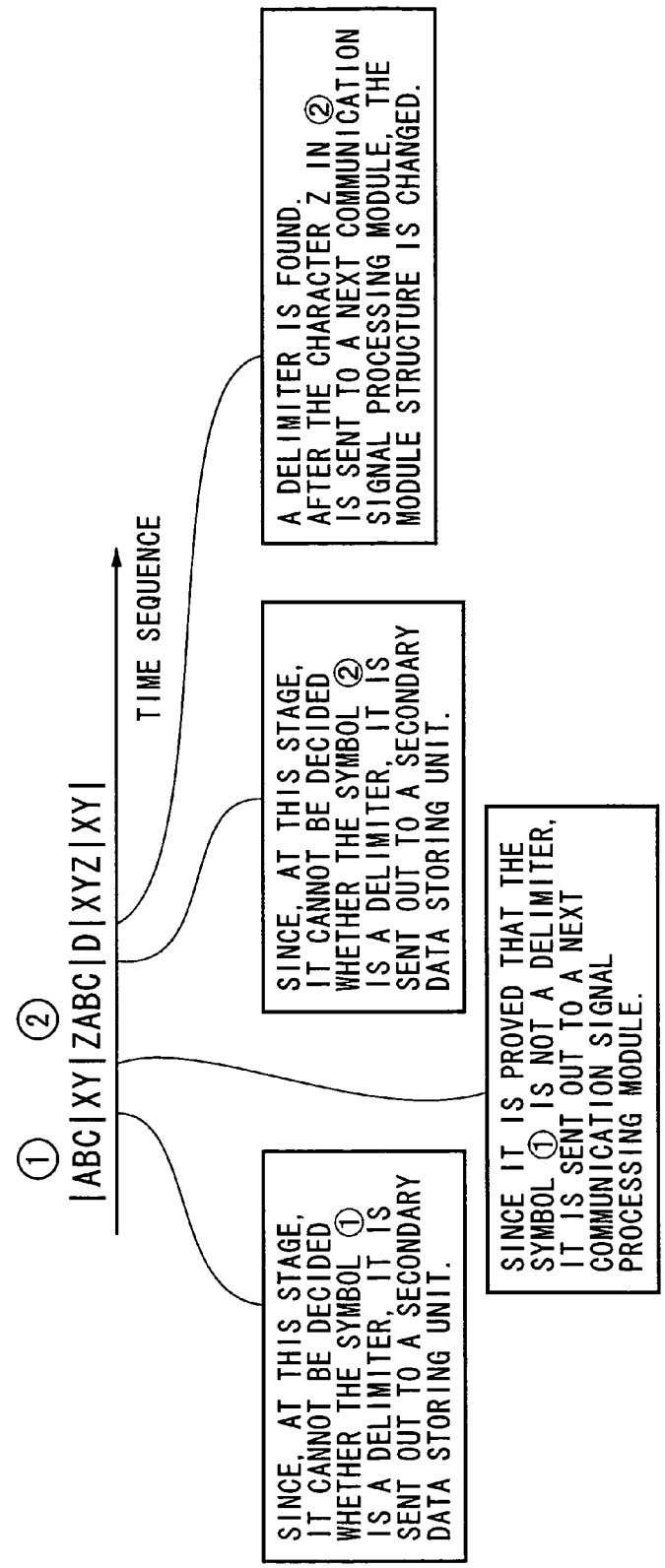
FIG. 23 is a conceptual diagram for complementing a function of the delimiter.

FIG. 23 is a conceptual diagram for complementing a function of the delimiter. Assuming that a delimiter is ABCD, since it cannot be decided that the data received is a delimiter at the stage where a sequence of ABC has first appeared, the received data is sent out to the secondary data storing unit 944. When XY has subsequently come in, it is decided that the aforementioned ABC is not a delimiter. Therefore, the data is sent out to the following communication signal control module 21. Then, when ZABC has come in, it is decided whether or not the data is a delimiter. Because of this, the data is transmitted to the secondary data storing unit 944. When D has come in, it is proved that the previous ABC and the present D constitute a delimiter, which, after delivering the previous "Z" to the following communication signal control module 21, changes a module structure.

Figure 24:
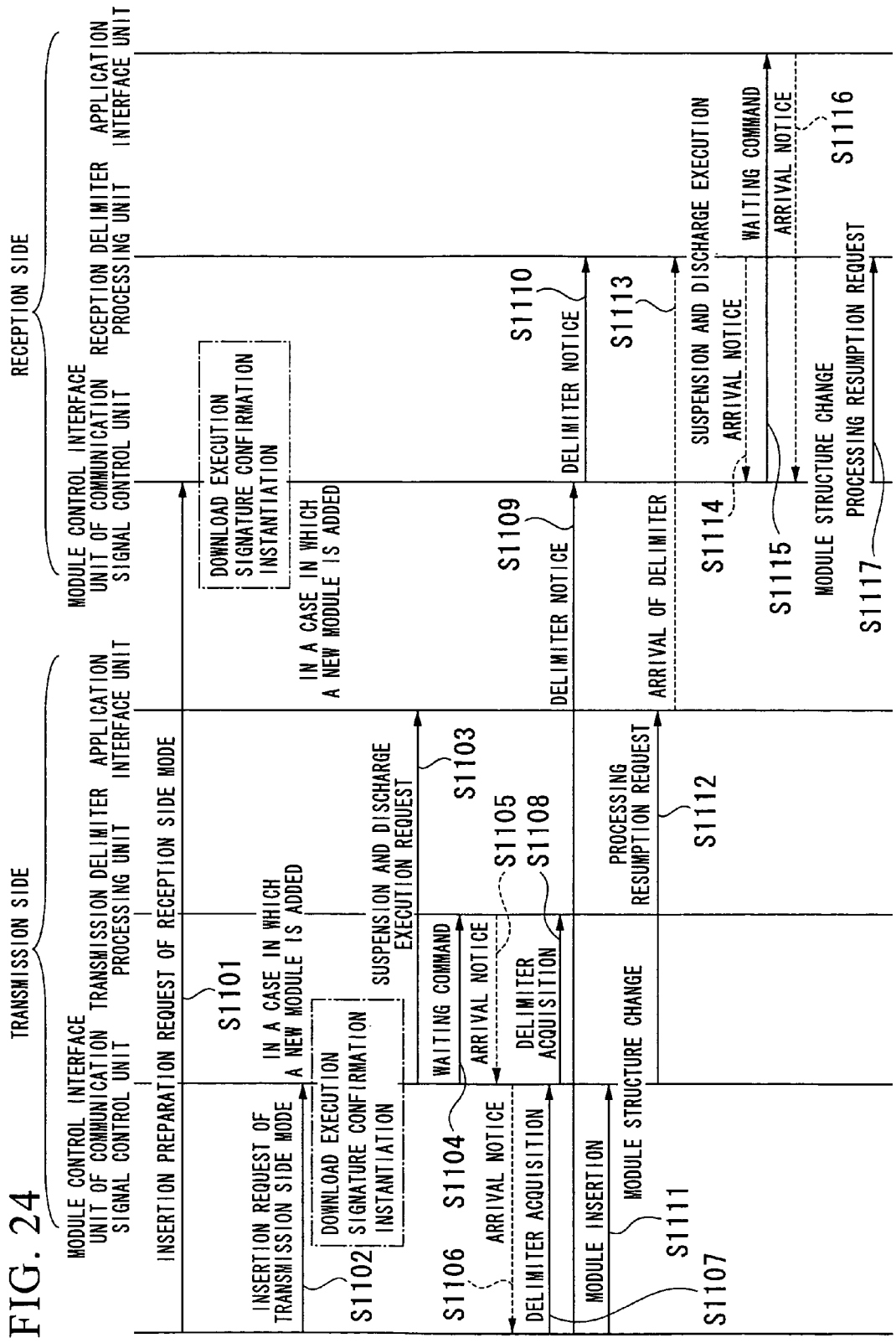
FIG. 24 is a sequential diagram illustrating a procedure of a module structure change of a sixth embodiment in accordance with the invention.

FIG. 24 is a sequential diagram illustrating a procedure of a module structure change of a sixth embodiment. Since the processing of S 1101-S 1117 shown in FIG. 24 is fundamentally the same as that of S 1001-S 1017 shown in FIG. 20, an explanation of S 1101-S 1117 will be omitted. The differences are that in FIG. 24 a delimiter value is acquired and notified, while in FIG. 20 a counter value is. To be specific, FIG. 24 includes a delimiter acquisition (S 1107 and S 1108) and a delimiter notice (S 1109 and S 1110).

INDUSTRIAL APPLICABILITY

As explained above, the communication control method, the communication control apparatus, and the communication control program in accordance with the invention, after controlling or observation processing a signal of the communication flow by a communication signal control module placed on the communication flow path, the processed signal is transmitted. Information regarding the communication flow is monitored based on requirement conditions about the communication flow provided by an application or an operator or automatically detected. A set of two kinds of modules is composed of a communication signal control module for controlling the communication flow in order to meet the requirement conditions when the flow state does not meet the requirement conditions provided by the application or the operator, and a communication control adjustment module for placing or eliminating the communication signal control module on the communication flow path. The communication signal control module and the communication control adjustment module are downloaded through a communication terminal and a communication device from a server in the network in which those modules are stored, and the downloaded communication signal control module and communication control adjustment module are activated to realize control of the communication flow and satisfy the requirement conditions.

Therefore, the advantage is obtained that the communication signal control module can be placed not only in a communication terminal but also in a communication device in a network. In addition, the communication signal control module can be operated and further dynamically changed depending on a variation of communication conditions or environmental situations. Since the communication terminal or the communication device can download a communication signal control module and/or a communication control adjustment module only when needed and can make use of the module, the terminals or devices do not always have to hold the modules that may be used in the future. The advantage is also obtained that the addition of a new module or the change of an existent module can be easily carried out by altering a module accumulated in a server.

According to the communication control method in accordance with the invention, the communication control adjustment module constitutes a communication signal control module that controls or observes a communication signal, includes a digital signature in the module, verifies the digital signature in the communication terminal and communication device that carry out the module, operates only the module about which identification of an author and nonexistence of module alteration are proved, and discards non-proved module or executes the non-proved module after asking a manager his opinion.

Accordingly, the advantage is obtained that the communication signal control module can be placed and operated so as to be dynamically changed depending on a variation of communication conditions or environmental situations in a communication device in a communication network.

According to the communication control method, the communication control apparatus, and the communication control program in accordance with the invention, an application interface unit, a transmission frame processing unit, and a reception frame processing unit are placed on the communication terminal. It is guaranteed that no data exists in the communication signal control module between the application interface unit on the communication terminal on the transmission side and the transmission frame processing unit. It is also guaranteed that no data exists in the communication signal control module between the application interface unit on the communication terminal on the reception side and the reception frame processing unit. A chain number for identifying a set of communication signal control modules is described in a frame on the transmission side, by performing a frame assignment processing at the transmission frame processing unit. Furthermore, a data boundary is detected in which the set of the communication signal control modules on the transmission side has changed, by monitoring the chain number at the reception frame processing unit, to insert or eliminate the communication signal control modules on the reception side at the timing. That guarantees that communication data sent by a transmission application is transferred to a reception application in the same form to insert or eliminate the communication signal control module.

Thus, the advantage is obtained that the communication signal control module can be placed and operated so as to be dynamically changed depending on a variation of communication conditions or environmental situations in a communication device in a communication network.

According to the communication control method, the communication control apparatus, and the communication control program in accordance with the invention, the communication signal control module on the communication terminal on the transmission side is requested to immediately perform processing of data. The processing of the data is suspended for a sufficiently long period of time compared with a delay time of the communication network in communication and notifying the reception side of the timing. It is guaranteed that no data concerning communication exists in the communication signal control module on the transmission side, in the communication signal control module on the reception side or in communication network. A data boundary is detecting at which a set of communication signal control modules on the transmission side has changed. In addition, it is also guarantee that communication data sent by a transmission application is transferred to a reception application in the same form to insert or eliminate the communication signal control module.

Thus, the advantage is obtained that the communication signal control module can be placed and operated so as to be dynamically changed depending on a variation of communication conditions or environmental situations in a communication device in a communication network.

According to the communication control method, the communication control apparatus, and the communication control program in accordance with the invention, a number of bytes of data is counted sent by communication from the communication terminal on the transmission side. The communication terminal on the reception side is notified of the number of bytes about which a set of communication signal control modules on the reception side has changed. A data boundary is detected at which a set of communication signal control modules on the transmission side has changed. It is also guaranteed that communication data sent by a transmission application is transferred to a reception application in the same form to insert or eliminate the communication signal control module.

Hence, the advantage is obtained that the communication signal control module can be placed and operated so as to be dynamically changed depending on a variation of communication conditions or environmental situations in a communication device in a communication network.

According to the communication control method, the communication control apparatus, and the communication control program in accordance with the invention, a specified byte sequence that an application does not use at all in communication or uses at a quite low probability is output on the communication network right after a set of communication signal control modules on the reception side has changed. A data boundary is detected at which a set of communication signal control modules on the transmission side has changed. Furthermore it is guaranteed that communication data sent by a transmission application is transferred to a reception application in the same form to insert or eliminate the communication signal control module.

Consequently, the advantage is obtained that the communication signal control module can be placed and operated so as to be dynamically changed depending on a variation of communication conditions or environmental situations in a communication device in a communication network.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A communication control method of controlling a communication flow by placing a module on a communication flow path for controlling the communication flow present through a network, the communication control method comprising:
    controlling or observation processing a signal of the communication flow by a communication signal control module placed on the communication flow path, and then transmitting the processed signal;
    monitoring a state regarding the communication flow, based on requirement conditions about the communication flow provided by an application or an operator or automatically detected;
    composing a set of two kinds of modules of a communication signal control module for controlling the communication flow in order to meet the requirement conditions when the communication flow state does not meet the requirement conditions provided by the application or the operator, and a communication control adjustment module for placing or eliminating the communication signal control module on the communication flow path; and
    downloading the communication signal control module and the communication control adjustment module through a communication terminal and a communication device from a server in the network in which those modules are stored, and activating the downloaded communication signal control module and communication control adjustment module to realize control of the communication flow and satisfy the requirement conditions,
    placing an application interface unit, a transmission frame processing unit, and a reception frame processing unit on the communication terminal;
    guaranteeing that no data exists in the communication signal control module between the application interface unit on the communication terminal on the transmission side and the transmission frame processing unit;
    guaranteeing that no data exists in the communication signal control module between the application interface unit on the communication terminal on the reception side and the reception frame processing unit;
    describing in a frame a chain number for identifying a set of communication signal control modules on the transmission side, by performing a frame assignment processing at the transmission frame processing unit;
    detecting a data boundary in which the set of the communication signal control modules on the transmission side has changed, by monitoring the chain number at the reception frame processing unit, to insert or eliminate the communication signal control modules on the reception side at the timing; and
    guaranteeing that communication data sent by a transmission application is transferred to a reception application in the same form to insert or eliminate the communication signal control module.

2. A communication control method as recited in claim 1, wherein the communication signal control module or the communication control adjustment module includes a digital signature in the communication signal control module or the communication control adjustment module, verifies the digital signature in the communication terminal and communication device, operates only the module about which identification of an author and nonexistence of module alteration are proved; and discards non-proved module or executes non-proved module after asking a manager his opinion.

3. A communication control method of controlling a communication flow by placing a module on a communication flow path for controlling the communication flow present through a network, the communication control method comprising:
controlling or observation processing a signal of the communication flow by a communication signal control module placed on the communication flow path, and then transmitting the processed signal;
monitoring a state regarding the communication flow, based on requirement conditions about the communication flow provided by an application or an operator or automatically detected;
composing a set of two kinds of modules of a communication signal control module for controlling the communication flow in order to meet the requirement conditions when the communication flow state does not meet the requirement conditions provided by the application or the operator, and a communication control adjustment module for placing or eliminating the communication signal control module on the communication flow path; and
downloading the communication signal control module and the communication control adjustment module through a communication terminal and a communication device from a server in the network in which those modules are stored, and activating the downloaded communication signal control module and communication control adjustment module to realize control of the communication flow and satisfy the requirement conditions,
requesting the communication signal control module on the communication terminal on the transmission side to immediately perform processing of data;
suspending processing of the data for a sufficiently long period of time compared with a delay time of the communication network in communication and notifying the reception side of the timing;
guaranteeing that no data concerning communication exists in the communication signal control module on the transmission side, in the communication signal control module on the reception side or in communication network;
detecting a data boundary at which a set of communication signal control modules on the transmission side has changed; and
guaranteeing that communication data sent by a transmission application is transferred to a reception application in the same form to insert or eliminate the communication signal control module.

4. A communication control method as recited in claim 3, wherein the communication signal control module or the communication control adjustment module includes a digital signature in the communication signal control module or the communication control adjustment module, verifies the digital signature in the communication terminal and communication device, operates only the module about which identification of an author and nonexistence of module alteration are proved, and discards non-proved module or executes non-proved module after inquiring of a manager about his judgment.

5. A communication control method of controlling a communication flow by placing a module on a communication flow path for controlling the communication flow present through a network, the communication control method comprising:
controlling or observation processing a signal of the communication flow by a communication signal control module placed on the communication flow path, and then transmitting the processed signal;
monitoring a state regarding the communication flow, based on requirement conditions about the communication flow provided by an application or an operator or automatically detected;
composing a set of two kinds of modules of a communication signal control module for controlling the communication flow in order to meet the requirement conditions when the communication flow state does not meet the requirement conditions provided by the application or the operator, and a communication control adjustment module for placing or eliminating the communication signal control module on the communication flow path; and
downloading the communication signal control module and the communication control adjustment module through a communication terminal and a communication device from a server in the network in which those modules are stored, and activating the downloaded communication signal control module and communication control adjustment module to realize control of the communication flow and satisfy the requirement conditions,
counting the number of bytes of data sent by communication from the communication terminal on the transmission side;
notifying the communication terminal on the reception side of the number of bytes about which a set of communication signal control modules on the reception side has changed;
detecting a data boundary at which a set of communication signal control modules on the transmission side has changed; and
guaranteeing that communication data sent by a transmission application is transferred to a reception application in the same form to insert or eliminate the communication signal control module.

6. A communication control method as recited in claim 5, wherein the communication signal control module or the communication control adjustment module includes a digital signature in the communication signal control module or the communication control adjustment module, verifies the digital signature in the communication terminal and communication device, operates only the module about which identification of an author and nonexistence of module alteration are proved, and discards non-proved module or executes non-proved module after inquiring of a manager about his judgment.

7. A communication control method of controlling a communication flow by placing a module on a communication flow path for controlling the communication flow present through a network, the communication control method comprising:
controlling or observation processing a signal of the communication flow by a communication signal control module placed on the communication flow path, and then transmitting the processed signal;
monitoring a state regarding the communication flow, based on requirement conditions about the communication flow provided by an application or an operator or automatically detected;
composing a set of two kinds of modules of a communication signal control module for controlling the communication flow in order to meet the requirement conditions when the communication flow state does not meet the requirement conditions provided by the application or the operator, and a communication control adjustment module for placing or eliminating the communication signal control module on the communication flow path; and downloading the communication signal control module and the communication control adjustment module through a communication terminal and a communication device from a server in the network in which those modules are stored, and activating the downloaded communication signal control module and communication control adjustment module to realize control of the communication flow and satisfy the requirement conditions, outputting on the communication network a specified byte sequence that an application does not use at all in communication or uses at a quite low probability, right after a set of communication signal control modules on the reception side has changed;

detecting a data boundary at which a set of communication signal control modules on the transmission side has changed; and guaranteeing that communication data sent by a transmission application is transferred to a reception application in the same form to insert or eliminate the communication signal control module.

8. A communication control method as recited in claim 7, wherein the communication signal control module or the communication control adjustment module includes a digital signature in the communication signal control module or the communication control adjustment module, verifies the digital signature in the communication terminal and the communication device, operates only the module about which identification of an author and nonexistence of module alteration are proved, and discards non-proved module or executes non-proved module after asking a manager his opinion.

9. A communication control apparatus of controlling a communication flow by placing a module on a communication flow path for controlling the communication flow present through a network, the communication control apparatus comprising:

a communication signal control module placed on the communication flow path for inputting a signal of the communication flow and, after controlling or observation processing the input signal, transmitting the processed signal;

a monitor unit for monitoring a state regarding the communication flow based on requirement conditions about the communication flow provided by an application or an operator or automatically detected;

a module composition unit composing a set of two kinds of modules of a communication signal control module for controlling the communication flow in order to meet the requirement conditions when the communication flow state monitored by the monitor unit does not meet the requirement conditions provided by the application or the operator, and a communication control adjustment module for placing or eliminating the communication signal control module on the communication flow path; and a module download unit for downloading the communication signal control module and the communication control adjustment module through a communication terminal and a communication device from a server in the network in which those modules are stored, and activating the downloaded communication signal control module and communication control adjustment module, an application interface unit, a transmission frame processing unit and a reception frame processing unit, placed on the communication terminal;

a first guarantee unit for guaranteeing that no data exists in the communication signal control module between the application interface unit on the communication terminal on the transmission side and the transmission frame processing unit;

a second guarantee unit for guaranteeing that no data exists in the communication signal control module between the application interface unit on the communication terminal on the reception side and the reception frame processing unit;

a chain number describing unit for describing a chain number in a frame to identify a set of communication signal control modules on the reception side by performing a frame assignment processing at the communication terminal on the reception side;

a detection unit for detecting a boundary of data in which the set of communication signal control modules has varied by monitoring the chain number at the communication terminal on the reception side; and an insertion and elimination unit for inserting or eliminating the communication signal control modules by guaranteeing that communication data which a transmission application has sent is transferred to a reception application in the same form.

10. A communication control apparatus of controlling a communication flow by placing a module on a communication flow path for controlling the communication flow present through a network, the communication control apparatus comprising:

a communication signal control module placed on the communication flow path for inputting a signal of the communication flow and, after controlling or observation processing the input signal, transmitting the processed signal;

a monitor unit for monitoring a state regarding the communication flow based on requirement conditions about the communication flow provided by an application or an operator or automatically detected;

a module composition unit composing a set of two kinds of modules of a communication signal control module for controlling the communication flow in order to meet the requirement conditions when the communication flow state monitored by the monitor unit does not meet the requirement conditions provided by the application or the operator, and a communication control adjustment module for placing or eliminating the communication signal control module on the communication flow path; and a module download unit for downloading the communication signal control module and the communication control adjustment module through a communication terminal and a communication device from a server in the network in which those modules are stored, and activating the downloaded communication signal control module and communication control adjustment module, an application interface unit placed on the communication terminal on the transmission side for immediately requesting a data processing to the communication signal control module on the transmission side;

a notification unit for suspending the data processing for a sufficiently long period of time compared with a delay time of a communication network in use and notifying the reception side of the timing;

a guarantee unit for guaranteeing that no data regarding communication exists in the communication signal control module on the transmission side and in the communication signal control module on the reception side and in the communication network; and a detection unit for detecting a boundary of data in which a set of communication signal control modules has varied at the communication terminal on the transmission side; and an insertion and elimination unit for inserting or eliminating the communication signal control modules by guaranteeing that communication data which a transmission application has sent is transferred to a reception application in the same form.

11. A communication control apparatus of controlling a communication flow by placing a module on a communication flow path for controlling the communication flow present through a network, the communication control apparatus comprising:

a communication signal control module placed on the communication flow path for inputting a signal of the communication flow and, after controlling or observation processing the input signal, transmitting the processed signal;

a monitor unit for monitoring a state regarding the communication flow based on requirement conditions about the communication flow provided by an application or an operator or automatically detected;

a module composition unit composing a set of two kinds of modules of a communication signal control module for controlling the communication flow in order to meet the requirement conditions when the communication flow state monitored by the monitor unit does not meet the requirement conditions provided by the application or the operator, and a communication control adjustment module for placing or eliminating the communication signal control module on the communication flow path; and a module download unit for downloading the communication signal control module and the communication control adjustment module through a communication terminal and a communication device from a server in the network in which those modules are stored, and activating the downloaded communication signal control module and communication control adjustment module, a transmission counter processing unit placed on the communication terminal on the transmission side for counting a number of data bytes sent on communication;

a notifying unit for notifying the communication terminal on the reception side of the number of data bytes about which a set of the communication signal control module on the transmission side has changed;

a reception counter processing unit placed at the communication terminal on the reception side for detecting a data boundary in which a set of the communication signal control modules on the transmission side has changed; and an insertion and elimination unit for inserting or eliminating the communication signal control modules by guaranteeing that communication data which a transmission application has sent is transferred to a reception application in the same form.

12. A communication control apparatus of controlling a communication flow by placing a module on a communication flow path for controlling the communication flow present through a network, the communication control apparatus comprising:

a communication signal control module placed on the communication flow path for inputting a signal of the communication flow and, after controlling or observation processing the input signal, transmitting the processed signal;

a monitor unit for monitoring a state regarding the communication flow based on requirement conditions about the communication flow provided by an application or an operator or automatically detected;

a module composition unit composing a set of two kinds of modules of a communication signal control module for controlling the communication flow in order to meet the requirement conditions when the communication flow state monitored by the monitor unit does not meet the requirement conditions provided by the application or the operator, and a communication control adjustment module for placing or eliminating the communication signal control module on the communication flow path; and a module download unit for downloading the communication signal control module and the communication control adjustment module through a communication terminal and a communication device from a server in the network in which those modules are stored, and activating the downloaded communication signal control module and communication control adjustment module, an output unit for outputting a predetermined sequence of bytes on the communication network immediately after a set of communication signal control modules on the transmission side has changed, the sequence of bytes being never used for communication by an application or having a sufficiently low probability in use;

a reception side delimiter synchronous processing unit placed on the communication terminal on the reception side for detecting a data boundary in which a set of the communication signal control module on the transmission side has changed; and an insertion and elimination unit for inserting or eliminating the communication signal control modules by guaranteeing that communication data which a transmission application has sent is transferred to a reception application in the same form.

\* \* \* \* \*